US006404434B1

(12) United States Patent
Shimada et al.

(10) Patent No.: US 6,404,434 B1
(45) Date of Patent: Jun. 11, 2002

(54) CURVE GENERATING APPARATUS AND METHOD, STORAGE MEDIUM STORING CURVE GENERATING PROGRAM, AND METHOD OF SETTING ASSOCIATE POINTS

(75) Inventors: Shigehiro Shimada; Makoto Kawamura, both of Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/388,773

(22) Filed: Sep. 2, 1999

(30) Foreign Application Priority Data

Sep. 4, 1998 (JP) .......................... 10-251492
Aug. 12, 1999 (JP) .......................... 11-228628

(51) Int. Cl.$^7$ ............................. G06T 11/20
(52) U.S. Cl. ................................ 345/442
(58) Field of Search .................. 345/441, 442

(56) References Cited

U.S. PATENT DOCUMENTS 5,852,447 A * 12/1998 Hosoya et al. ............. 345/468

OTHER PUBLICATIONS

SPIE Web Publication Abstracts [online], [retrieved on Aug. 30, 2001], Retrieved from http://www.spie.org/web/abstracts/3000/3034b.html, pp. 1,2, and 17, SPIE Proceedings vol. 3034, Medical Imaging 1997: Image Processing, Paper #'s 3034–32 and 3034–58.*

* cited by examiner

Primary Examiner—Almis R. Jankus
Assistant Examiner—G. F. Cunningham
(74) Attorney, Agent, or Firm—Frommer Lawrence & Haug LLP; William S. Frommer

(57) ABSTRACT

Sampling points are set on a first closed curve which represents the contour of an object contained in an image. Sampling points are also set on a second closed curve which represents the object contour to be obtained after lapse of a predetermined time. Associate points are set on the first and second closed curves to correlate these closed curves. Interpolations are performed between the sampling points on both curves, starting from the associate points, thereby generating a transient contour which is to be obtained in the course of transition from the first closed curve to the second closed curve. This method enables the transient contour to be obtained with high quality, even if the first and second closed curves are constituted by different numbers of segments which are to be used in the generation of the transient contour.

14 Claims, 36 Drawing Sheets

FIG. 17
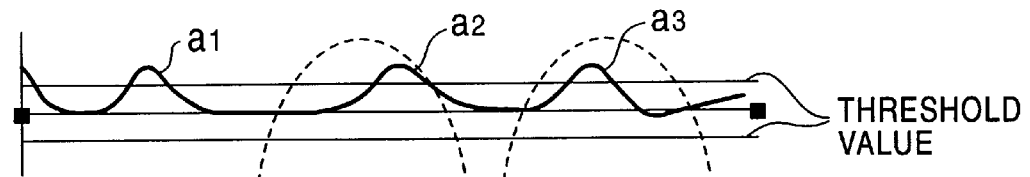
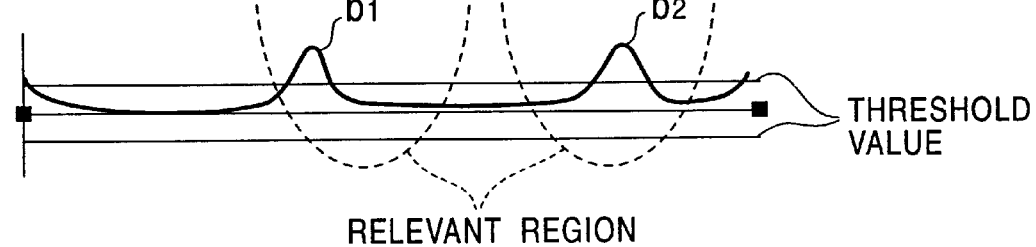
FIG. 18
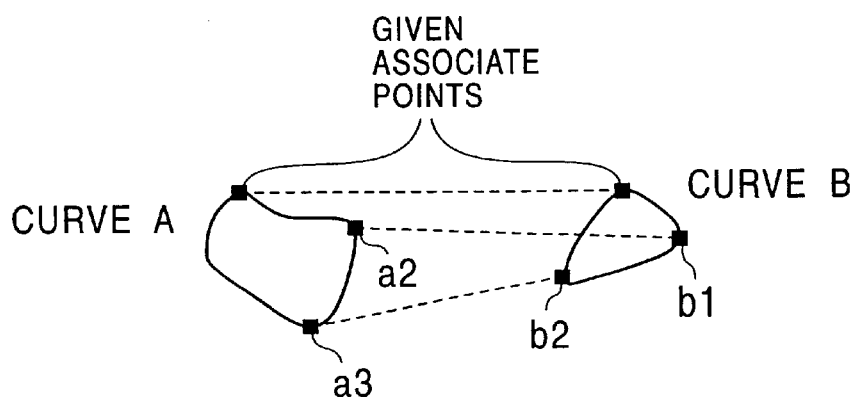

FIG. 55
(PRIOR ART)
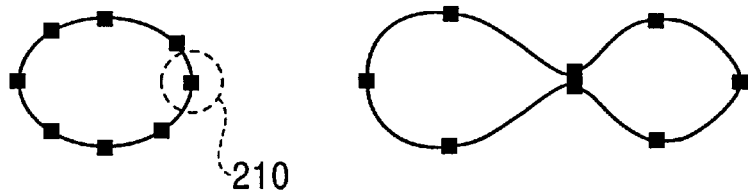
FIG. 56
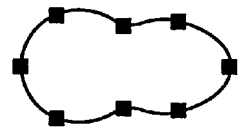
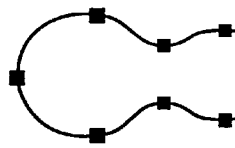
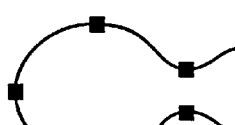
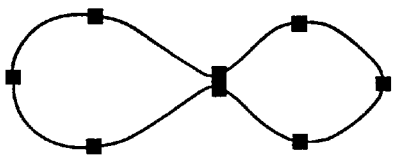

TRANSIENT CURVES

CURVE GENERATING APPARATUS AND METHOD, STORAGE MEDIUM STORING CURVE GENERATING PROGRAM, AND METHOD OF SETTING ASSOCIATE POINTS

BACKGROUND OF THE INVENTION

1. Field of the Invention

The present invention relates to a curve generating apparatus and method and to a storage medium storing a curve generating program, as well as to a method of setting associate points, suitable for use in a CAD (Computer Aided Design), computer graphics and image edition, for the purpose of enabling edition of curves representing contours of objects contained in images displayed on a computer.

2. Description of the Related Arts

A motion picture or moving image is composed of a plurality of frames of image data each of which contains an object. The profile or contour of such an object is extracted by a technique known as a contour extraction. Such a contour extraction technique is used mainly in the field of image processing technologies such as CAD, graphics, and so forth. Image synthesizing processing is one of such image processing technologies. The image synthesizing processing often requires contour extraction processing which generates a key signal from the contour of an object. When this technique is used, it is important that the key signal is correctly generated to enable generation of contour curves that exactly express the contour. The key signal provides information for scissoring or cutting out a foreground to be synthesized, and is referred to also as a "mask".

The above-described contour extraction processing includes a processing for forming a contour curve based on detailed information given by an operator in regard to the contour position and direction of an object and, hence, requires an interactive operation. Various types of contour extraction techniques have been known and proposed, such as a technique in which a plurality of points are appointed on the contour of an object so that contours of sections between adjacent points are formed, a technique which operates control points on parametric curves representing a contour outline, and a technique which permits a contour to be directly input by a user by means of a pointing device such as a mouse. For further detail and examples of the contour extraction techniques, a reference be made to Intelligent Scissors for Image Composition, Eric N. Mortensen and William A. Barrett, Computer Graphics Proceedings, Annual Conference Series, 1995, ACM SIGGRAPE, PP. 191–198., as well as to IMAGE CONTOUR DETECTION METHOD (Japanese Unexamined Patent Publication No. 4-152481 and METHOD OF AND APPARATUS FOR FORMING SCISSORING MASK (Japanese Unexamined Patent Publication No. 4-254854).

With the known contour extraction techniques mentioned above, it is necessary that contour curves be formed accurately on each of many elementary pictures or frames that constitute the moving image. For instance, movie or TV motion pictures lasting several seconds require several hundreds of key signals. Thus, the amount of data to be processed is enormous. Therefore, in the field of movies or TV, it is highly desirable that contour curves for the frames constituting a moving picture be generated as accurately as possible with minimal processing, in view of known contour extraction processing which requires much labor and time.

Under these circumstances, a simplified method for generating contour curves has been proposed which is based on an assumption that a contour curve contained in the starting frame of a continuous motion picture is progressively deformed with time into the contour curve in the ending frame of the motion picture. Thus, an intermediate curve which represents the contour curve of the object in a transient frame is generated by interpolation, based on the contour curve contained in the starting frame and the contour curve contained in the ending frame.

More specifically, in accordance with this interpolation method, each of points constituting the starting frame is correlated to corresponding one of points on the contour curve of the ending frame. It is assumed here that a contour contained in the starting frame is represented by a curve "a", while the contour contained in the ending frame is represented by a curve "b". The moment at which the starting frame is displayed is "0", and the moment at which the ending frame is displayed is "1". Assuming that the contour curve changes with time, it is understood that the contour represented by the curve "a" at the moment "0" has been changed to the curve "b" by the moment "1". The moment of a transient frame containing the contour to be formed by interpolation is expressed by "T". The coordinates of a point on the curve "a" is expressed as "A", while the coordinates of the corresponding point on the curve "b" is expressed by "B". The coordinates of the corresponding point on the curve in the transient frame is expressed by "C". With these definitions, the coordinates C is given by the following formula.

$$C = T \cdot A + (1-T) \cdot B$$

In the known interpolation techniques, the contour to be contained in an intermediate or transient frame is formed based on points determined by the described interpolation technique.

The contour curve contained in each frame is constituted by a plurality of cubic Bezier curves. The cubic Bezier curve is defined as follows, as described in a literature COMPUTER GRAPHICS PRINCIPLE AND PRACTICE SECOND EDITION in C (Foley, van Dam. Feiner. Hughes, ADDISON WESLEY, 1996, ISBN 0-201-84840-6.

$$Q(t) = ((1-t)^3)M + 3t((1-t)^2)N + 3(t^2)(1-t)O + (t^3)P$$

$$(0 \ t \ 1)$$

Symbols "M", "N", "O" and "P" indicate coordinates of points on a two-dimensional plane. More specifically, "M" and "P" represent coordinates of end points of a line, while "N" and "O" represent coordinates of control points. FIG. 52 shows an example of a line on a cubic Bezier curve expressed by the formula shown above. Referring to FIG. 52, a solid-line curve is the cubic Bezier curve. Points "M" and "P" indicated by solid circles are end points, while "N" and "O" indicated by white blank circles are control points.

In accordance with the aforesaid formula that defines the cubic Bezier curve, the locus of the Bezier curve, i.e., a configuration, can be expressed in terms of the coordinates of the end points "M" and "P", coordinates of the control points "O" and "N", and the change of the time "t".

The unit of the cubic Bezier curve shown in FIG. 52 constitutes a segment of a curve representing a contour curve. Thus, as shown in FIG. 53, a single curve representing a contour curve is composed of a plurality of segments 201. It will be seen that the train of segments forms the single contour line, with adjoining segments 201 commonly possessing an end point 202.

In this known contour extraction technique, an intermediate or transient contour is determined by interpolation based on the contour curve of the frame preceding the transient frame and the contour curve of the frame which trails the transient frame. In this technique, therefore, contour curves of different frames are correlated to each other by the end points and control points of each of the segments. This requires that the contour curves of different frames essentially have the same number of segments.

Actually, the number of segments varies in accordance with the degree of complication and size of the contour curve. However, according to the conventional interpolation technique, segments 201 of the same number are employed, even when significant differences in size and shape exist between the contour curve of the starting frame and that of the ending frame significantly differ as shown in FIG. 54.

Thus, in generating the contour curve of a transient frame by using the conventional interpolation technique, the user is obliged to unnecessarily add end points 203 to the frame containing the contour having fewer segments, in order to equalize the number of the segments 201 of the starting frame and that of the ending frame.

More specifically, referring to FIG. 54A, it is assumed that the contour curve of the starting frame has eight segments with eight associate points 202, while the contour curve of the ending frame has three segments with three associate points 202. In such a case, the user is obliged to edit the contour curve contained in the ending frame so as to add four points 203 as indicated by white blank squares in FIG. 54B, thus creating an ending frame contour curve having four segments 201.

This editorial work undesirably burdens the user. The burden of the editorial work for equalizing the numbers of segments is serious particularly when the contour is complicated.

It is also to be noted that, in the described known technique for generating the contour curve of a transient frame by interpolation, it is desirable that the number of the associate points on the contour curve in the starting frame and that in the ending frames are equal to each other, in order to correlate the contour curves of the starting and ending frames.

In some cases, however, a portion of the contour curve that covers only a small region of an image has been changed to cover a greater proportion of the image in the ending frame. For instance, referring to FIG. 55, only a right portion encircled by 210 expands with time while the major portion of the contour curve "a" remains unchanged, so as to form a contour "b". In such a case, formation of the contour curve of a transient frame by the known technique encounters with the following problem.

Namely, by the known interpolation technique, the major part of the contour "a" on the left side of the circle also is inevitably deformed significantly, as will be seen from FIG. 56.

FIG. 57 illustrates a process in which transient curves are determined based on a contour "a" composed of four segments and a contour "b" having eight segments, while suppressing as much as deformation of the portion of the contour "a" which is on the left side of the portion encircled by a circle 210. This process requires setting of a plurality of end points on the portion 210 of the contour "a", as will be seen from FIG. 58. This work is highly laborious and troublesome.

SUMMARY OF THE INVENTION

Accordingly, an object of the present invention is to provide a method and an apparatus for generating curves, as well as a storage medium storing a curve generating program, which enables generation of transient curves with high degree of quality, despite any difference in the number of segments between the starting contour and the ending contour.

It is also an object of the present invention to provide a method which is used in the generation of transient curves, for setting associate points on the respective curves.

To these ends, according to one aspect of the present invention, there is provided a curve generating apparatus for generating a curve, comprising: sampling means for setting sampling points on a first closed curve representing the contour of an object contained in an image, and for setting sampling points on a second closed curve which shows the contour of the object after lapse of a predetermined time; associate point setting means for setting associate points that correlate the first and second closed curves; and interpolating means for effecting interpolation between the sampling points set by the sampling means, starting from the associate points set by the associate points setting means, thereby generating a transient closed curve which is transient in the course of deformation of the first closed curve into the second closed curve.

The curve generating apparatus having the features set forth above sets sampling points on the first and second closed curves and sets also associate points on both closed curves. Interpolation is effected between the successive sampling points on the first closed curve and those on the second closed curve, starting from associate points set on these two closed curves, whereby a closed curve is generated to represent a transient contour which is transient in the course of deformation from the first closed curve to the second closed curve.

In accordance with another aspect of the present invention, there is provided a curve generating method comprising: a sampling step for setting sampling points on a first closed curve representing the contour of an object contained in an image, and for setting sampling points on a second closed curve which shows the contour of the object after lapse of a predetermined time; an associate point setting step for setting associate points that correlate the first and second closed curves; and an interpolating step for effecting interpolation between the sampling points set by the sampling means, starting from the associate points set in the associate points setting step, thereby generating a transient closed curve which is transient in the course of deformation of the first closed curve into the second closed curve.

In accordance with the curve generating method having the described features, sampling points are set on the first and second closed curves, as well as the associate points. Interpolation between the successive sampling points on the first closed curve and those on the second closed curve is performed starting from the associate points set on these closed curves, whereby a closed curve is generated to represent an intermediate contour which is transient in the course of deformation from the first closed curve to the second closed curve.

In accordance with still another aspect of the present invention, there is provided a storage medium storing a program which executes: a sampling step for setting sampling points on a first closed curve representing the contour of an object contained in an image, and for setting sampling points on a second closed curve which shows the contour of the object after lapse of a predetermined time; an associate point setting step for setting associate points that correlate the first and second closed curves; and an interpolating step for effecting interpolation between the sampling points set by the sampling means starting from the associate points set in the associate points setting step, thereby generating a transient closed curve which is transient in the course of deformation of the first closed curve into the second closed curve.

This storage medium, when used on a computer, loads the computer with the program. The program serves to set sampling points on the first and second closed curves, as well as associate points. The program executes interpolation between successive sampling points on the first closed curve and those on the second closed curve, starting from associate points set on these two curves, whereby a closed curve is generated to represent an intermediate contour which is transient in the course of deformation from the first closed curve to the second closed curve.

In accordance with a further aspect of the present invention, there is provided a method of setting associate points, comprising the steps of: detecting curvatures of a first closed curve representing the contour of an object contained in an image and detecting curvatures of a second closed curve representing the contour of the object after lapse of a predetermined time; comparing the peak values of the curvatures detected on the first closed curve and peak values of the curvatures detected on the second closed curve with a predetermined threshold, and extracting, as detected points, points on the first and second closed curves which exhibit curvature peak values not smaller than the threshold values; and setting, as associate points, one of the detected point on one of the first and second closed curves and one of the detected points on the other closed curve which is near to the above-mentioned one of the detected points on one of the first and second closed curves, when the curvatures at the detected points on both closed curves have the same sign of plus or minus.

According to this method, peak values of the curvatures of both the first and second closed curves are compared with a threshold value. Points on both closed curves where curvature peak values not smaller than the threshold value are exhibited are extracted as detected points. A pair of points, composed of a first point which is one of the detected points on one of two closed curves and a second point which is one of the detected points on the other closed curve and near the first point, are set as being associate points if the curvatures at these first and second points have the same sign of plus or minus.

These and other objects, features and advantages of the present invention will become clear from the following description of the preferred embodiment when the same is read in conjunction with the accompanying drawings.

BRIEF DESCRIPTION OF THE DRAWINGS

FIG. 17 is an illustration of a concept of setting of associate points based on the curvatures of the first contour curve "A" and the second contour curve "B";

FIG. 18 is an illustration of a process in which the processing unit adds a pair of associate points in addition to the associate points designated by the user;

FIG. 55 is an illustration of a contour "a" and a contour "b" to be relied upon in the generation of transient shapes;

FIG. 56 is an illustration of the transient shapes generated based on the contours "a" and "b" as shown in FIG. 55;

DESCRIPTION OF THE PREFERRED EMBODIMENTS

Preferred embodiments of the present invention will now be described with reference to the accompanying drawings.

Figure 1:
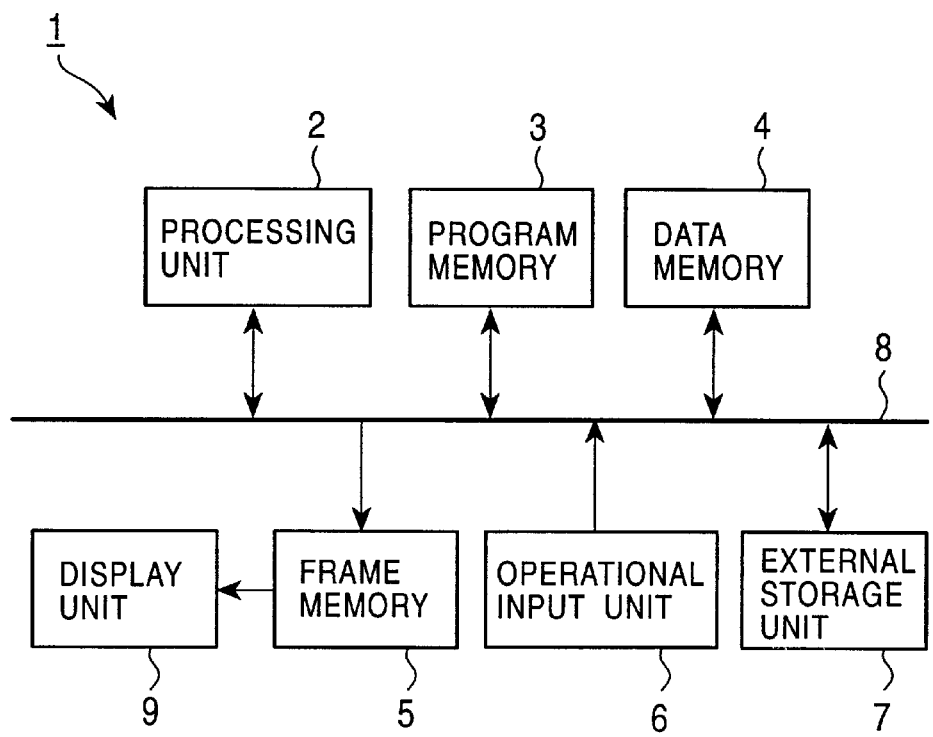
FIG. 1 is a block diagram showing the structure of a curve generating apparatus in accordance with the present invention.

The present invention can be embodied in the form of, for example, a curve generating apparatus 1 as shown in FIG. 1. The curve generating apparatus 1 has a plurality of units which are connected through a BUS 8 and which include a processing unit 2, a program memory 3, a data memory 4, a frame memory 5, an operational input unit 6, and an external storage unit 7.

The operational input unit 6 comprises a pointing device which generates an operational input signal upon being operated by a user and which may be, for example, a keyboard, a mouse, a digitizer (tablet), a track ball, or the like. The operational input signal generated by the operational input device 6 is delivered to the processing unit 2.

The pointing device enables the user to point a desired position on a display, so that the operational input signal is generated in accordance with the point which is pointed by the pointing device. Thus, the pointing device points a pattern, character or the like displayed on a display unit 9 and delivers a corresponding operational input signal to the processing unit 2. More specifically, the pointing device of the operational input unit 6 when operated by the user causes an arrow or a mark referred to as a "cursor" or a "pointer" to move up and down and to the left and right on the display screen. The user clicks a button or buttons of the pointing device when the cursor is steadily pointing a desired pattern or the like on the display, whereby an operational input signal corresponding to the pointed pattern or the like is generated.

The processing unit 2 generates various control signals for controlling various components of the apparatus, in accordance with the operational input signals given through the operational input unit 6. The control signals generated by the processing unit 2 are delivered to the respective components of the apparatus, whereby various operations are performed in accordance with the operational input signals. The processing unit 2 receives, through the program memory 3, a program for generating contour curves representing the contours of an object contained in a plurality of frames of a motion picture, based on image data of the motion picture stored, for example, in the external storage unit 7.

The program memory 3 stores various programs which describe various kinds of processing to be executed in accordance with the operational input signal given by the operational input unit 6. The programs are selectively read in accordance with a control signal given by the processing unit 2. The programs include, for example, a transient shape generating program that describes a process for generating transient frames to be obtained between a starting frame and an ending frame which lags behind the starting frame.

Image data to be processed by the transient shape generating program derived from the program memory 3 is stored in the external storage unit 7. The external storage unit 7 has a storage medium such as an optical disk. The external storage unit 7 delivers, in response to a control signal given by the processing unit 2, image data of a motion picture stored in the storage medium to the processing unit 2, data memory 4 and the frame memory 5. The external storage unit 7 also performs storage of image data into a storage medium.

Figure 2:
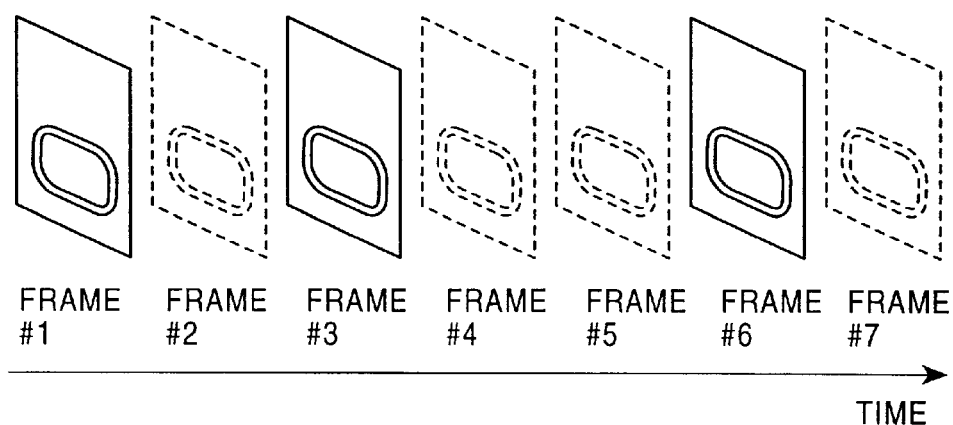
FIG. 2 is an illustration of a motion picture which is composed of a plurality of frames and which is to be processed by means of the curve generating apparatus shown in FIG. 1.

The image data stored in the external storage unit 7 has a plurality of frames of a motion picture, as shown in FIG. 2. The frame #1 is termed as a "starting frame", while the frame #3 is an "ending frame" which is linked with the starting frame #1. A frame #2 is an intermediate or "transient" frame which is intermediate between the starting frame #1 and the ending frame #3. The curve generating apparatus 1 of this embodiment generates a curve indicating the contour of an object in the transient frame #2, based on the contour curve of the object contained in the starting frame #1 and that contained in the ending frame #3.

The data memory 4 stores, for example, transient curves to be produced by the processing unit 2 in accordance with the transient shape generating program. The data memory 4 also receives various kinds of data which are generated in the course of the processing performed by the intermediate shape generating program.

The frame memory 5 receives, in accordance with a control signal given by the data memory 4 or the external storage unit 7, image data corresponding to one frame. The frame memory 5 also receives contour curves of a transient frame generated by the transient shape generating program. The frame memory 5 is connected to the display unit 9 which displays images, as well as contents of processings, for observation by the user. Thus, the display unit 9 displays images formed by image data received by the display unit 9 in accordance with a control signal.

Figure 3:
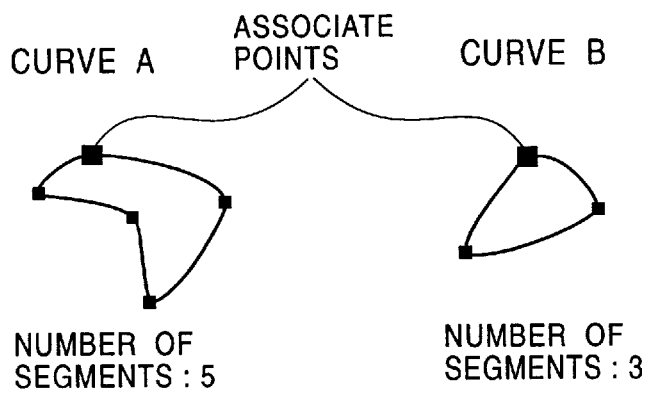
FIG. 3 is an illustration of a first contour curve "A" and a second contour curve "B" that are used as the basis for the generation of a transient curve by means of the curve generating apparatus shown in FIG. 1.

A description will now be given of a process performed by the curve generating apparatus 1, by way of example, for generating a transient curve which is to be used in forming a transient contour in the course of a change from the first contour curve "A" to the second contour curve "B" which are shown in FIG. 3. It is assumed here that a single segment is defined by end points, control points and a third-order Bezier curve. Thus, the first contour curve "A" is composed of five segments. The second contour curve "B" is composed of three segments. In order to generate a transient curve to be formed in the course of a change from the first contour curve "A" to the second contour "B" in a manner shown in FIG. 4, the curve generating apparatus 1 executes the transient shape generating program stored in the program memory 3. More specifically, the processing unit 2 executes a process which follows a flowchart shown in FIG. 5.

Figure 5:
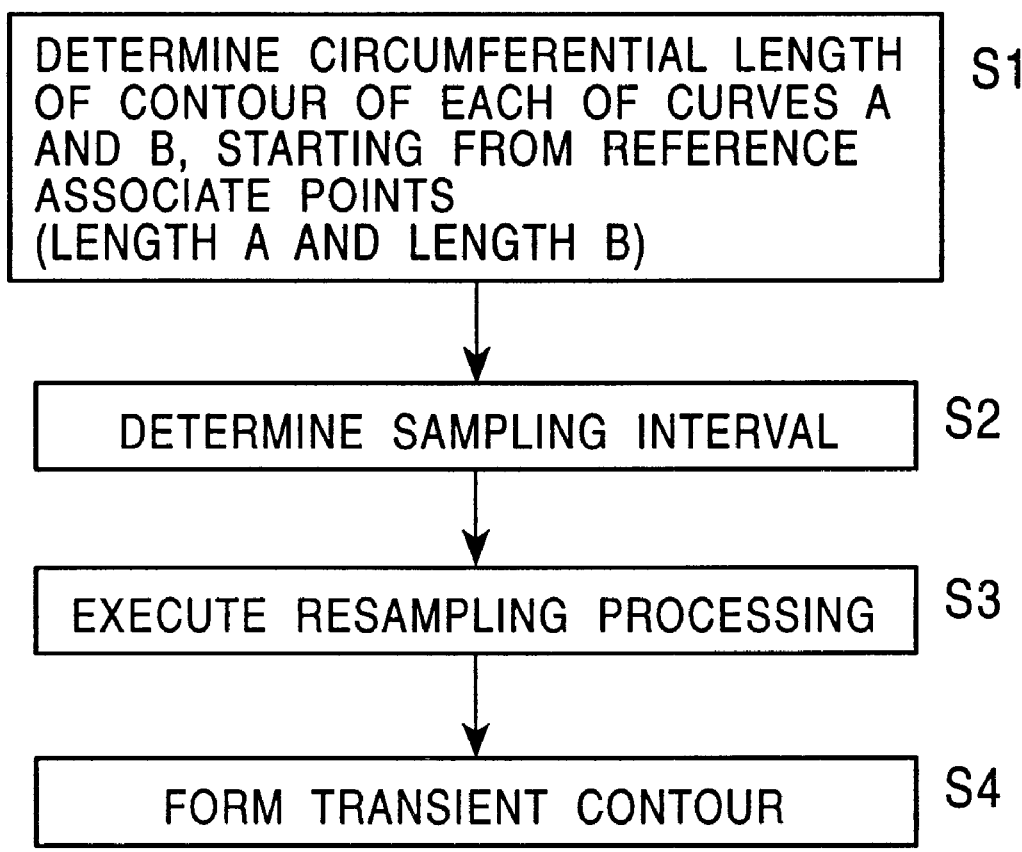
FIG. 5 is a flowchart showing a processing executed by a processing unit for generating the transient curve which is transient in the course of a change from the first contour curve "A" to the second contour curve "B"
Figure 6:
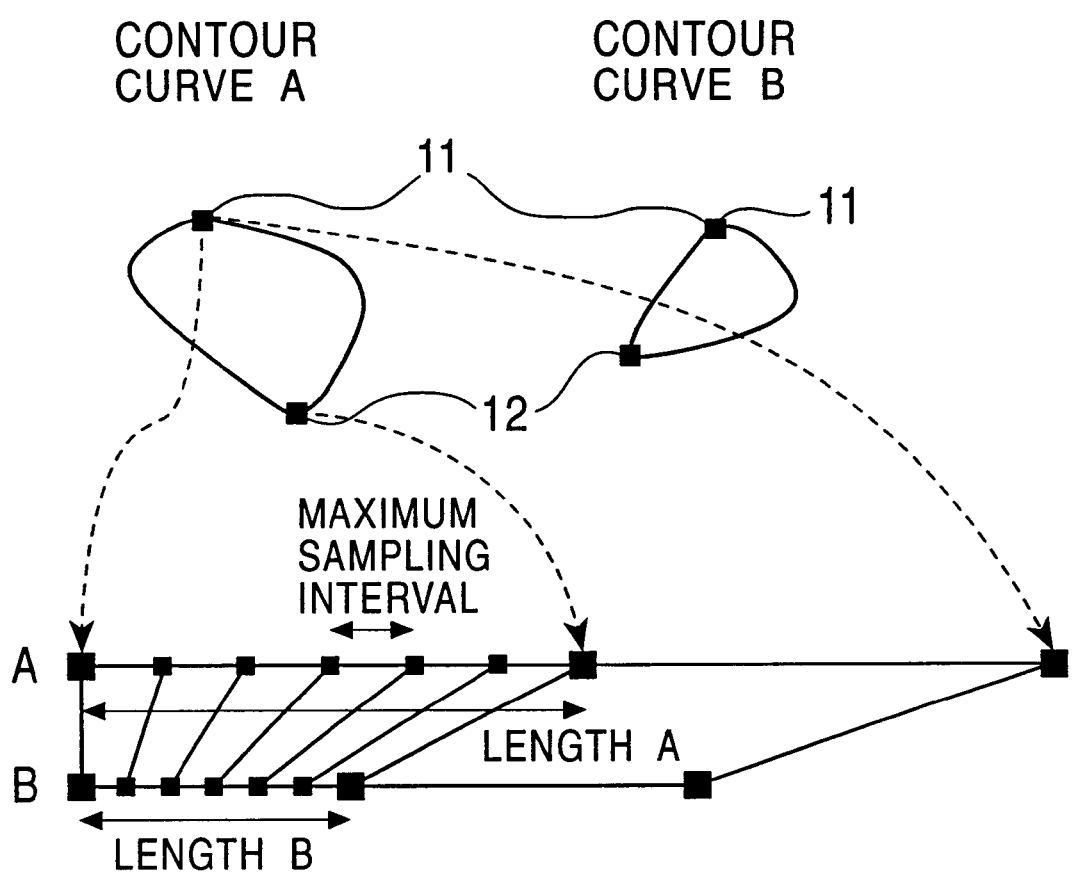
FIG. 6 is an illustration explanatory of the procedure for setting sampling points to determine a sampling interval.

Referring to FIG. 5, in Step S1, the processing unit 2 determines the overall circumferential length of each of the first contour curve "A" and the second contour curve "B", in accordance with an operational input signal which designates reference associate points on both contour curves "A" and "B". To perform this operation, the processing unit 2 determines the length of a segment of the first contour curve A as being "length A" and the length of a segment on the second contour curve "B" as being "length B".

In Step S2, the processing unit 2 determines a sampling interval for each of the first and second contour curves "A" and "B", based on the segment lengths expressed by length A and length B determined in Step S1. The processing performed by the processing unit 2 in Step S2 will be described later in more detail.

In Step S3, the processing unit 2 generates a point string for the transient frame, by effecting a re-sampling processing on both of the first and second contour curves "A" and "B", based on the sampling interval determined in Step S2. The processing performed by the processing unit 2 in Step S3 will be described later in more detail.

In Step S4, the processing unit 2 performs an interpolation processing in such a manner as to connect the points on the point string formed in Step S3, based on coordinate values of these points, thereby generating a transient curve. The processing performed by the processing unit 2 in Step S4 will be described later in more detail.

The detail of the processing performed by the processing unit 2 in Step S2 will now be described.

Figure 7:
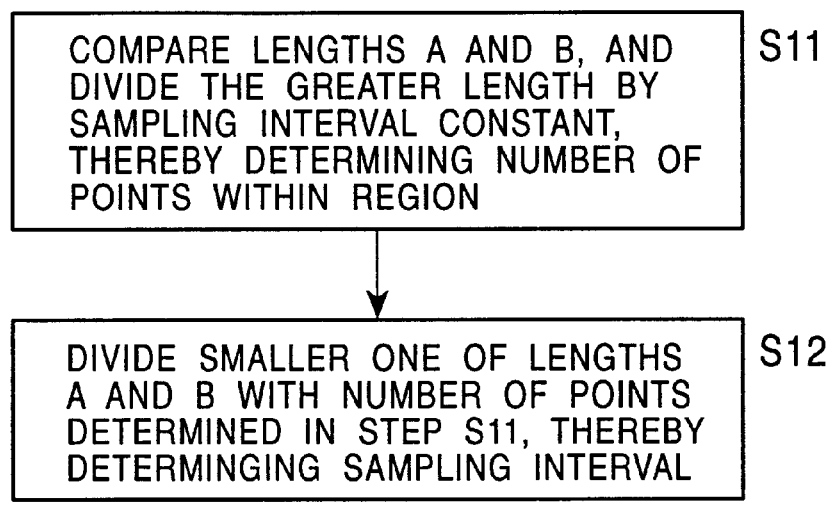
FIG. 7 is a flowchart showing the process for determining sampling intervals on the first and second contour curves "A" and "B".

The processing performed by the processing unit 2 for determining the sampling interval is performed in accordance with a flowchart shown in FIG. 7. Referring to this Figure, in Step S11, the processing unit 2 compares the segment length "length A" starting from an associate point 11 and ending at an associate point 12 on the contour curve "A" with the segment length "length B" starting from an associate point 11 and ending at an associate point 12 on the contour curve "B". Then, the processing unit 2 divides the circumferential length of the contour curve having the greater one of the two segment lengths by a constant of the sampling interval, thereby determining the number of points contained in the overall circumference. The constant of the sampling interval has a value which corresponds to the sampling interval that provides points of a number necessary for restructuring the transient curve in Step S4.

In Step S12, the processing unit 2 divides the overall circumference of the contour curve having the smaller segment length by the number of the points determined in Step S11, whereby a sampling interval is obtained for the contour curve having the smaller segment length. Consequently, sampling intervals smaller than those necessary for structuring the transient curve are set by the processing unit 2 both for the first and second contour curves "A" and "B".

A description will now be given of the detail of the processing performed by the processing unit 2 in Step S3.

Figure 8:
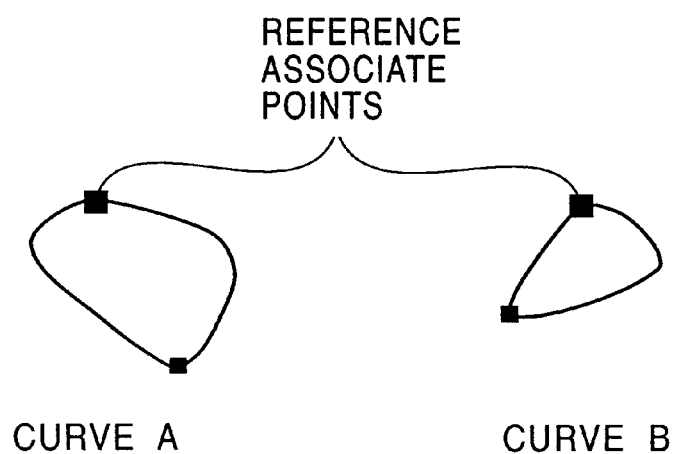
FIG. 8 is an illustration of the first and second contour curves "A" and "B" on which the sampling intervals have been determined.
Figure 9:
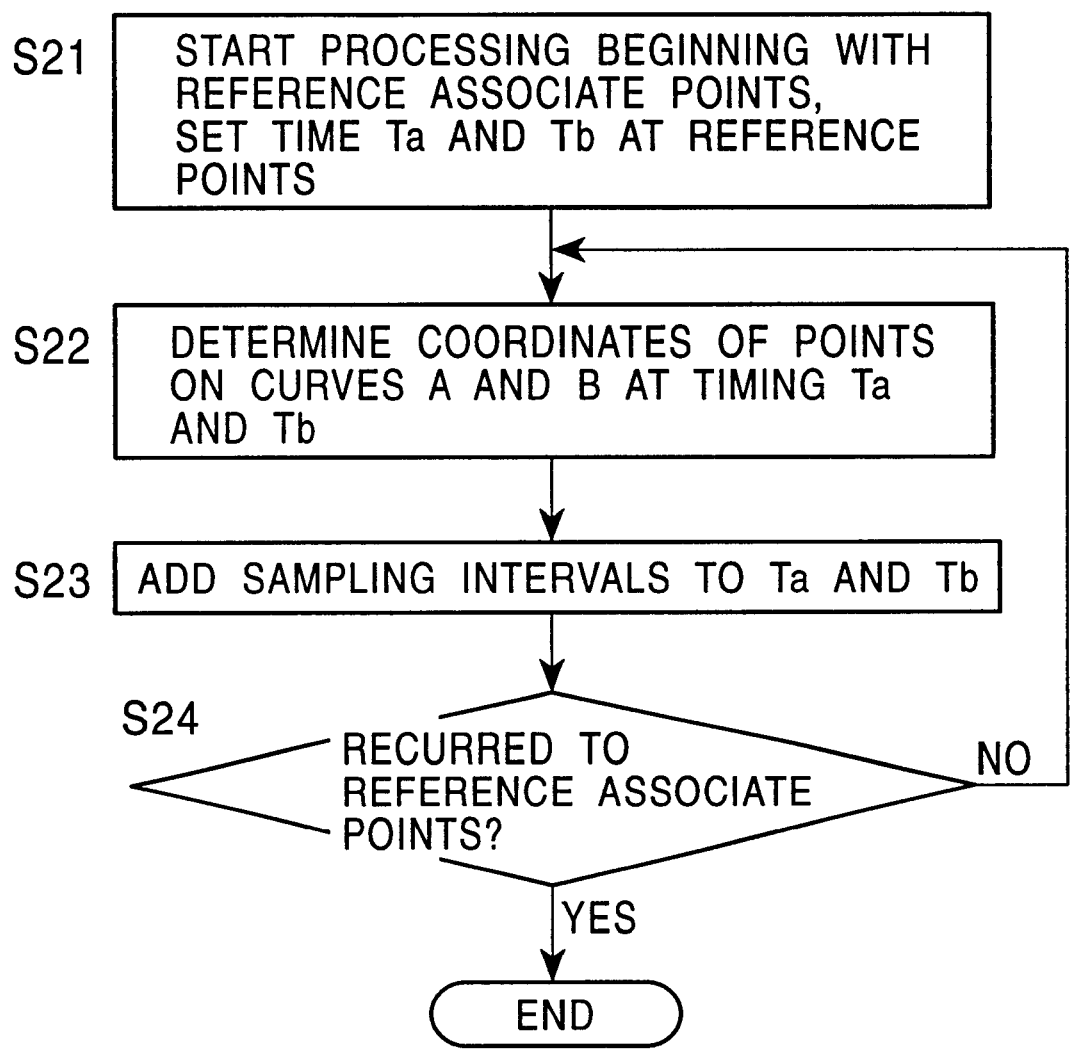
FIG. 9 is a flowchart illustrative of a sampling processing.

The processing unit 2 performs a sampling processing which is shown in FIG. 9, both on the first and second contour curves "A" and "B" which are shown in FIG. 8 and on which the sampling intervals have been set in Step S2.

A point on a segment of a Bezier curve can be expressed in terms of a function of time "t" as follows.

$$Q(t)=((1-t)^3)M+3t((1-t)^2)N+3(t^2)(1-t)O+(t^3)P(0t1)$$

Symbols "M", "N", "O" and "P" indicate coordinates of points on a two-dimensional plane. More specifically, "M" and "P" represent coordinates of end points of a line, while "N" and "O" represent coordinates of control points. The points on each of the first and second contour curves "A" and "B" composed of a plurality of segments connected one after another are expressed in terms of a function (t). The definition of the Bezier curve is expanded here such that the integer portion of the time "t" represents the serial number of each segment, while the decimal fraction of the same indicates a moment of time within the segment. For instance, a time t=3.45 means the coordinates of a point which is in the third segment and located at a position which is expressed by a moment 0.45. The processing unit 2 thus represents all the points on the first and second contour curves "A" and "B" in terms of the functions of the time "t".

The re-sampling processing is performed in accordance with a flowchart shown in FIG. 9. Referring to this Figure, in Step S21, the processing unit 2 expresses the positions of the reference associate points on the first and second contour curves "A" and "B" shown in FIG. 8 in terms of moments Ta and Tb.

In Step S22, the processing unit 2 determines the coordinates of the point "A" on the first contour curve "A" and the coordinates of the point "B" on the second contour curve "B" at the moments Ta and Tb. The coordinates of the points "A" and "B" thus determined determine the associate points on the contour curve "A" and the contour curve "B".

In the next step S23, the processing unit 2 adds to the respective moments Ta and Tb the sampling intervals that have been determined in Step S2. Thus, the processing unit 2 sets new sampling points which are ahead of the sampling points that were the points of interest in Step S22. It will be seen that the distances between the existing sampling points and the new sampling points on the respective contour curves correspond to the aforesaid sampling intervals. Thus, the processing unit 2 performs a re-sampling by setting the new sampling points.

Thus, Step S23 repeats addition of the sampling intervals to the sampling points on the contour curves "A" and "B". As a result of the repetition of addition of the sampling intervals, the moments Ta and Tb advance correspondingly and finally return to the starting associate points from which the sampling processing was commenced. Step S24 determines whether the moments Ta and Tb have returned to the starting associate points. The sampling processing is finished when the moments Ta and Tb have returned to the starting associate points, otherwise the process gets back to Step S22 to repeat Steps S22 through S24. Thus, the processing unit 2 sets sampling points again and again on the first and second contour curves "A" and "B", whereby strings of sampling points are formed. Consequently, point strings composed of plurality of sampling points spaced apart by the respective sampling intervals are formed on the respective contour curves through the operation performed by the processing unit 2 in Step S3.

A description will now be given of the content of the processing performed by the processing unit 2 in Step S4.

Figure 10:
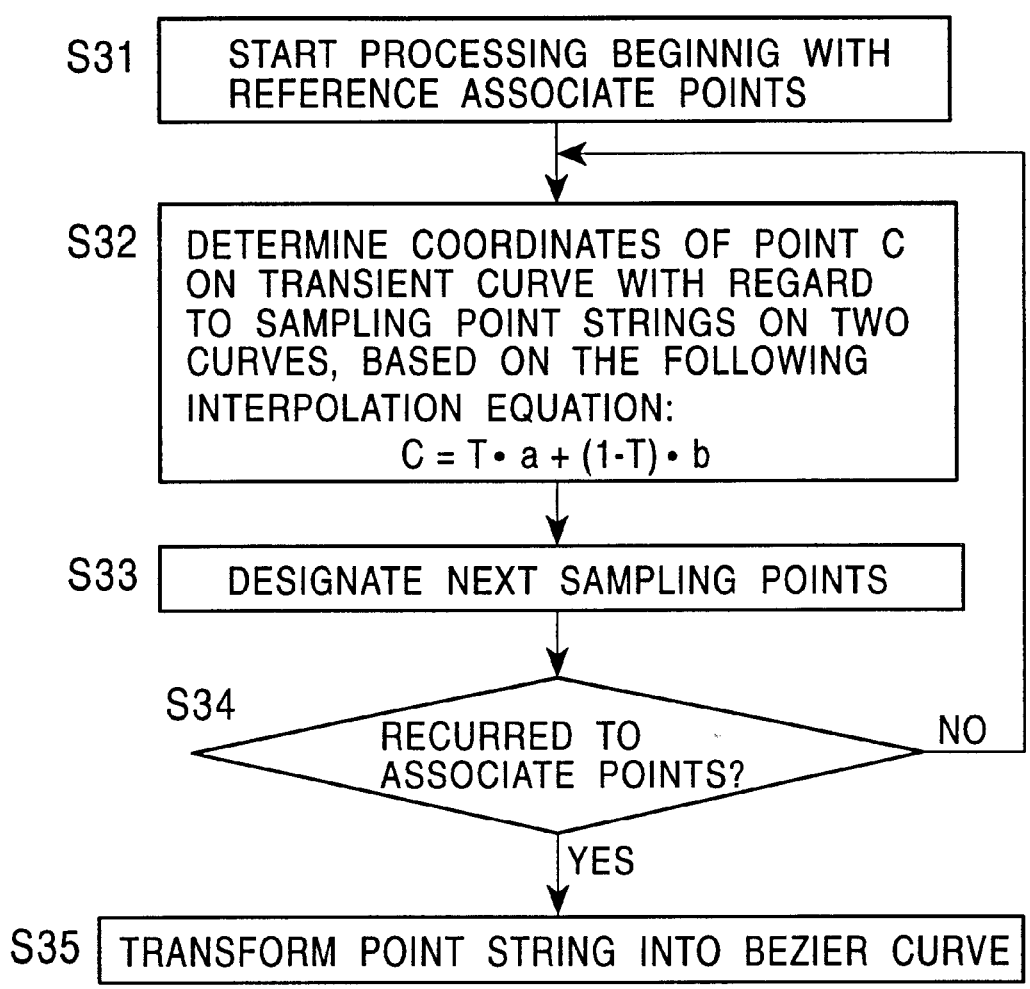
FIG. 10 is a flowchart illustrative of a process for generating a transient curve which shows a transient contour obtained in the course of change from the first contour curve "A" to the second contour curve "B" after determination of sampling points on these curves.

In Step S4, the processing unit 2 executes a routine shown by the flowchart of FIG. 10, so as to generate a transient curve which indicates the transient shape of the contour in the course of the change from the contour shown by the first contour curve "A" to the contour represented by the second contour curve "B".

Referring to FIG. 10, in Step S31, the point strings corresponding to the first and second contour curves "A" and "B", as determined by the re-sampling performed in Step S4, are supplied from the data memory 4 to the processing unit 2. The processing unit 2 then designates reference associate points on the point string corresponding to the first contour curve "A" and on the point string corresponding to the second contour curve "B", respectively.

In Step S32, the processing unit 2 determines, through an interpolation, the coordinates "C" of a point on the transient curve in accordance with the following formula (1).

$$C = T \cdot a + (1-T) \cdot b \qquad (1)$$

where, T represents the moment at which the interpolation is executed between the two curves represented by the point strings, "a" represents the coordinates of a point on the first contour curve "A", and "b" represents the coordinates of a point which is on the second contour curve "B" and which is associated with the point of the coordinates "a".

Thus, the processing unit 2 applies the formula (1) to the point strings corresponding to the first and second contour curves, thereby determining the coordinates of a point on the transient curve, based on the coordinates of a sampling point on the first contour curve "A" and the coordinates of the associate sampling point on the contour curve "B".

In the next step S33, the processing unit 2 executes a processing both on the point string corresponding to the first contour curve "A" and the point string corresponding to the second contour curve "B", for designating sampling points which are next to the sampling points processed under the formula (1) in Step S32.

In the next step S34, the processing unit 2 determines whether the sampling has returned to the reference associate points from which the transient curve generating process was commenced in Step S31, as a result of the designation of the next sampling points executed in Step S33. The processing unit 2 advances the process to Step S35 upon determining that the sampling has returned to the reference associate points, otherwise it executes the processing of Step S32 on the sampling pints designated in Step S33. Thus, the processing unit 2 executes the processing of Step S32 on all the sampling points which have been set in the re-sampling processing performed in Step S32, whereby the coordinates of a plurality of points on the transient curve are determined in accordance with the formula (1).

Figure 4:
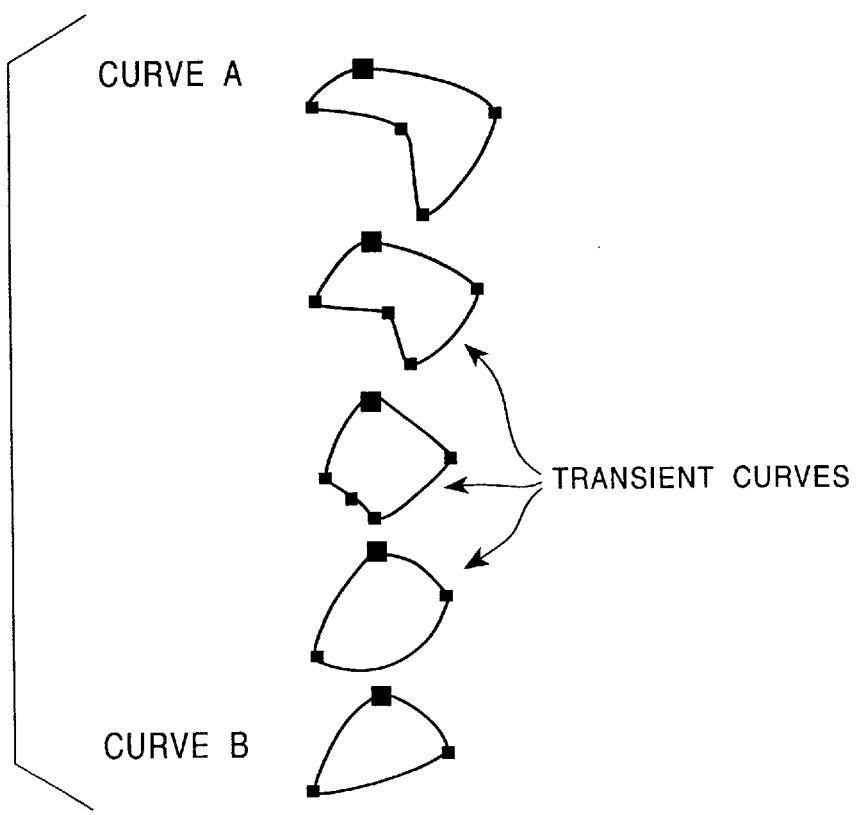
FIG. 4 is an illustration of a transient curve which is transient in the course of a change from the first contour curve "A" to the second contour curve "B" and which is generated by the curve generating apparatus shown in FIG. 1.

In Step S35, the processing unit 2 transforms the sampling points as determined in the processing of Step S3 and the coordinates "C" of the point on the transient curve determined in Step S32 into a Bezier curve, by using a technique disclosed in Japanese Unexamined Patent Publication No. 10-154436 and also in "Graphic Gems", (Andrew S. Glassner), in particular an article entitled "An Algorithm for Automatically Fitting Digitized Curves" (pp. 612–626). It is thus possible to generate a curve based on the sampling point string corresponding to the first contour curve A and the sampling point string corresponding to the second contour curve B. Consequently, curves are obtained which are transient in the course of the change from the first contour curve "A" to the second contour curve "B", as shown in FIG. 4.

The curve generating apparatus 1 of this embodiment performs a transient curve generating processing, so as to determine transient curves which are to be obtained in the course of a change from the first contour curve "A" to the second contour curve "B", as described heretofore. Transient curves of high quality levels as shown in FIG. 4 are easily obtainable even when the first contour curves "A" and "B" initially have different numbers of segments as shown in FIG. 3. This owes to the unique feature of this embodiment which, by employing sampling intervals not greater than a maximum sampling interval, sets the same number of sampling points on the first and second contour curves "A" and "B".

A description will now be given of another example of the procedure for generating a transient curve by the operation of the processing unit 2.

Figure 11:
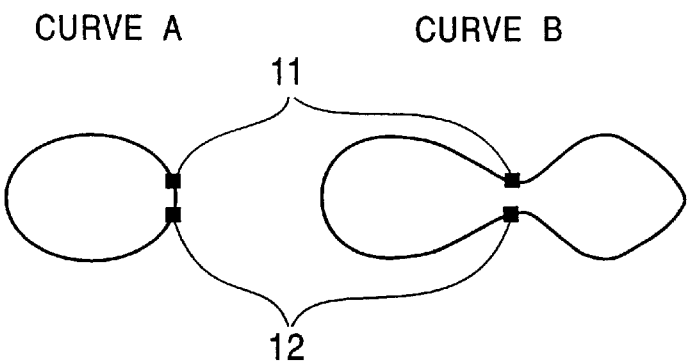
FIG. 11 is an illustration of a first contour curve "A" and a second contour curve "B" with plurality of associate points set thereon.
Figure 12:
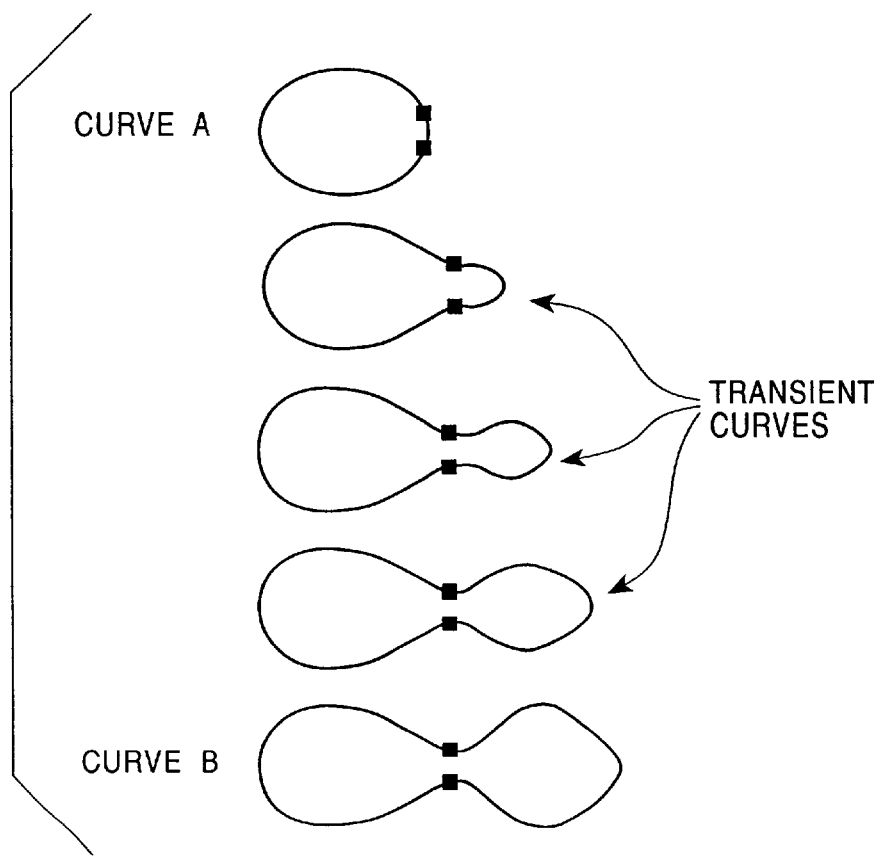
FIG. 12 is an illustration of an example of a transient curve which is generated based on the plurality of associate points given on the first and second contour curves "A" and "B"

Referring to FIG. 11, a plurality of sets of associate points 11, 11 and 12, 12 are given on the first and second contour curves "A" and "B". A transient curve as shown in FIG. 12 is generated by using these two sets of associate points. These associate points can be manually designated by the user through, for example, a keyboard.

Figure 13:
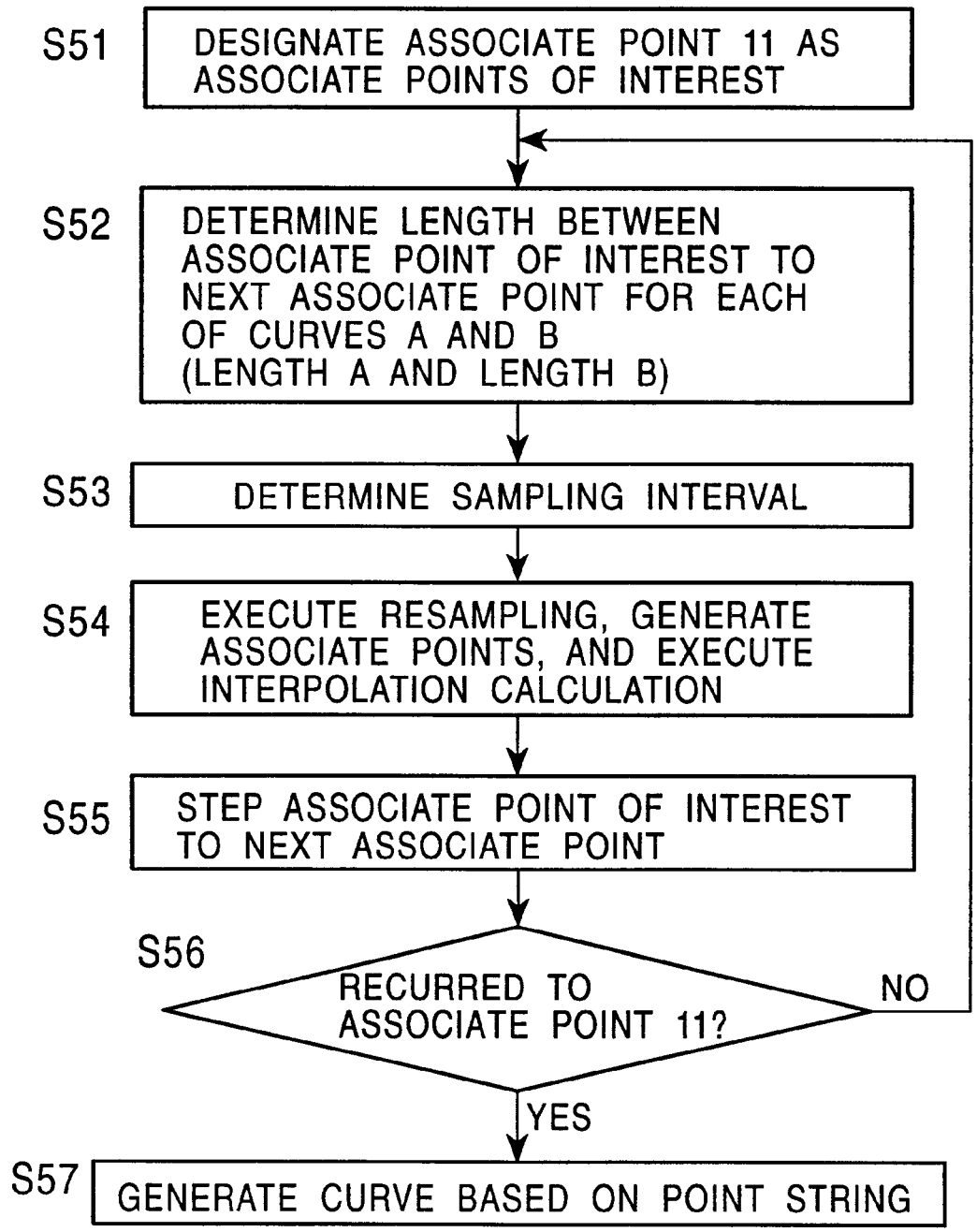
FIG. 13 is a flowchart showing a process executed by a processing unit for generating a curve transient in the course of a change from the first contour curve "A" to the second contour curve "B based on a plurality of associate points set on these curves.

In this example, the processing unit 2 generates a transient curve which is transient in the course of a change from the first contour curve "A" to the second contour curve "B" carrying the plurality of sets of associate points 11, 12, by executing a process which is shown in FIG. 13 by a flowchart.

In Step S51, the processing unit 2 selects a pair of associate points 11, 11 as associate points of interest, from among the two sets of the associate points 11, 11 and 12, 12 designated by the user.

In the next step S52, the processing unit 2 determines distances between the associate pints of interest to the next associate pints on the first and second contour curves "A" and "B", respectively. The processing unit 2 then determines the length between the associate point of interest and the next associate point on the first contour curve "A" as being a "length A". Similarly, the processing unit 2 determines the length between the associate point of interest and the next associate point on the first contour curve "B" as being a "length B".

In the next step S53, the processing unit 2 performs a processing which is the same as that explained before in connection with Step S2. Namely, the processing unit 2 compares the length A and the length B with each other and determines the sampling intervals.

In the next step S54, the processing unit executes a processing which is the same as that described before in connection with Step S3. Namely, the processing unit 2 executes a re-sampling processing on the first and second contour curves "A" and "B", thereby forming a point string corresponding to the first contour curve "A" and a point string corresponding to the second contour curve "B", both point strings having an equal number of sampling points. The processing unit 2 executes an interpolation by using coordinates of the point string corresponding to the first contour curve "A" and the coordinates of the point string corresponding to the second contour curve "B".

In Step S55, the processing unit 2 designates, as the new associate points of interest, the associate points which are next to the associate points of interest used in the processing of Step S51. This operation is repeated to successively designate new associate points of interest.

In Step S56, the processing unit 2 determines whether the new associate points of interest newly designated in Step S55 are the same as the associate points of interest designated before in Step S51. The processing unit 2, upon determining that the new associate points of interest newly designated in Step S55 are the same as the associate points of interest designated in Step S51, advances the process to Step S57, otherwise the process returns to Step S52, whereby the processings of Steps S52 through S55 are executed for regions between the new associate points of interest designated in Step S55 to the next associate points. That is to say, the processing unit 2 performs sampling and re-sampling processings over the entire circumferences of the first and second contour curves "A" and "B", thereby setting point strings composed of sampling points.

In the next step S57, the processing unit 2 generates a transient curve based on the above-mentioned point strings, by executing a processing which is the same as that explained before in connection with Step S4. More specifically, the processing unit 2 generates the intermediate curve by using the results of the interpolation processings conducted in Step S54. Consequently, the processing unit 2 generates transient curves as shown in FIG. 12, by using the first and second contour curves "A" and "B" which are shown in FIG. 11. Thus, the curve generating apparatus 1 can generate a transient curve which is transient in the course of a change from the first contour curve "A" to the second contour curve "B", even when the first and second contour curves "A" and "B" contain different number of segments.

Figure 14:
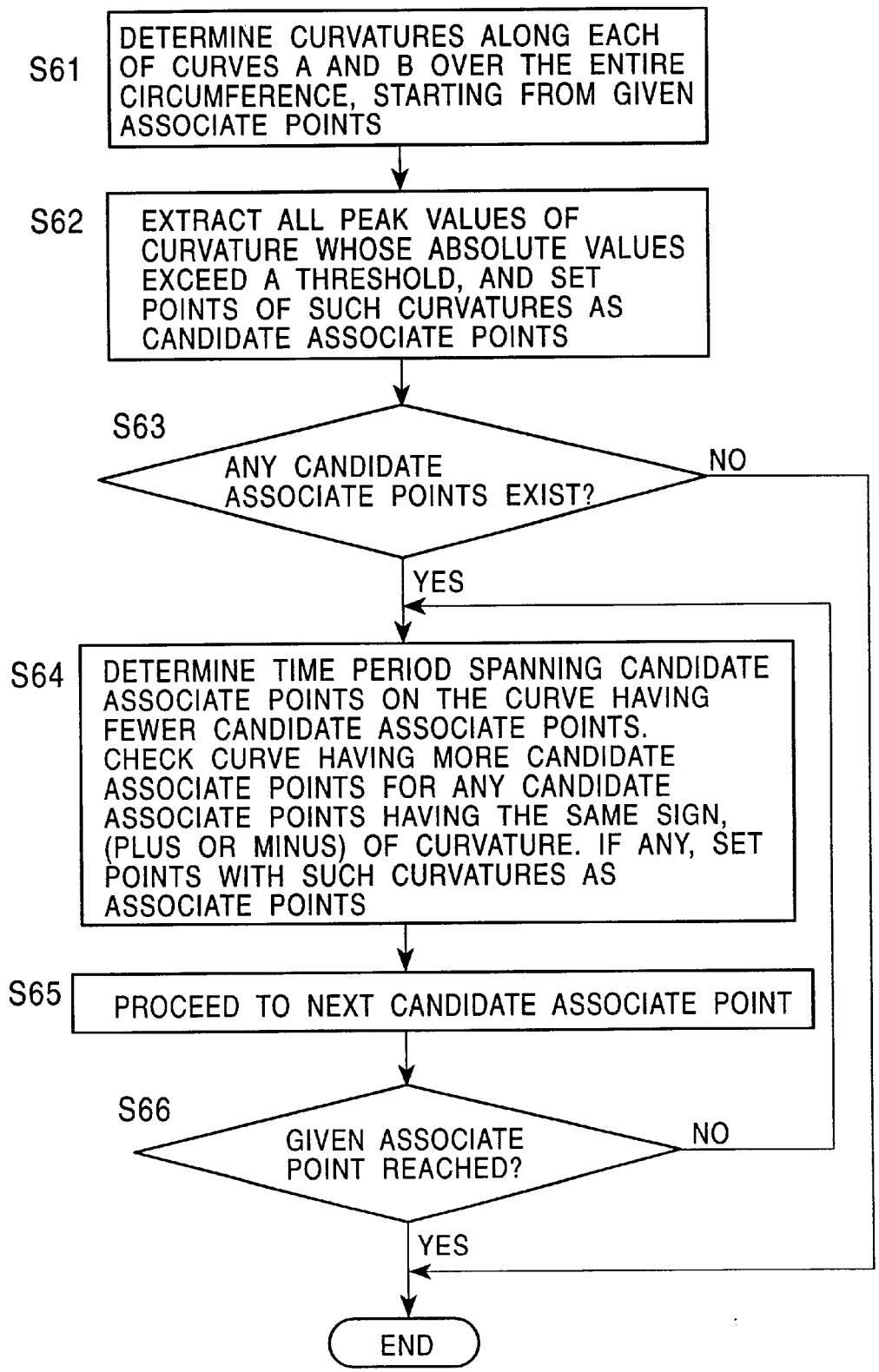
FIG. 14 is a flowchart showing a process performed by the processing unit for setting associate points based on curvatures of the first contour curve "A" and the second contour curve "B"

An example of the processing performed by the processing unit 2 for automatically setting associate points on the first and second contour curves "A" and "B" will be described by way of example, with reference to a flowchart shown in FIG. 14.

Figure 15:
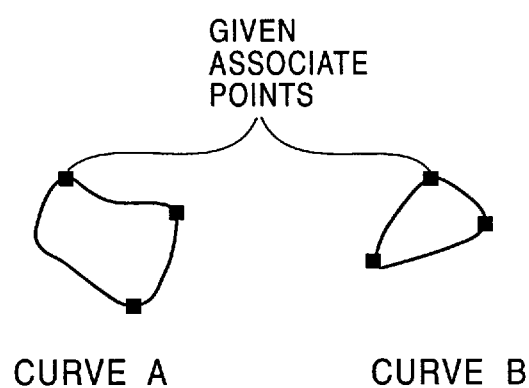
FIG. 15 is an illustration of the first contour curve "A" and the second contour curve "B" on which associate points are to be set based on the curvatures.
Figure 16:
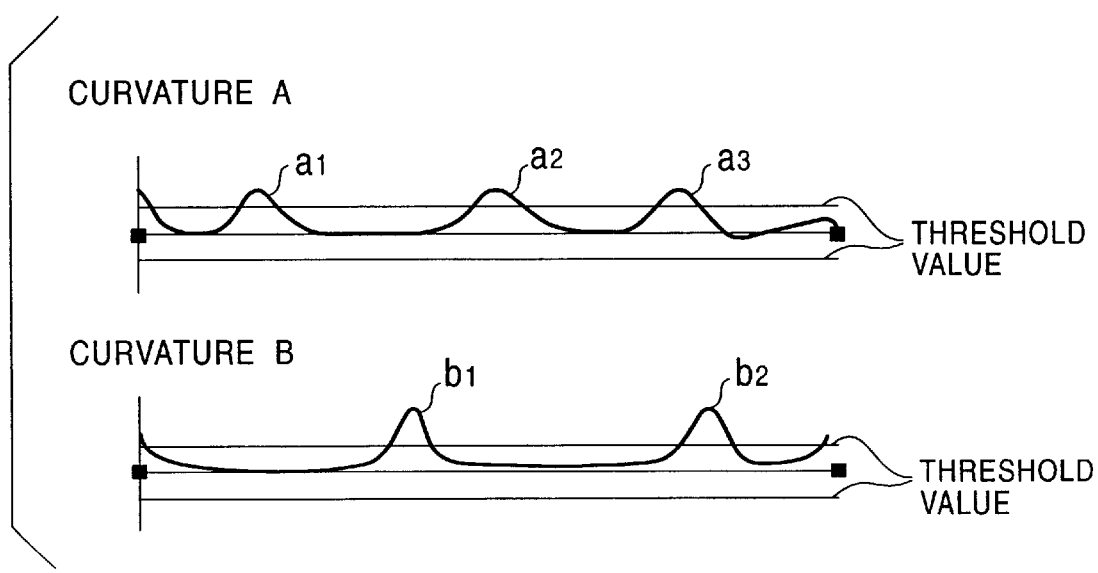
FIG. 16 is an illustration of curvatures of the first contour curve "A" and the second contour curve "B" over the entire circumferences of these curves, starting from associate points designated by a user.

Referring to this flowchart, in Step S61, the processing unit detects curvatures of both the first and second contour curves "A" and "B" shown in FIG. 15 over the entire circumferences of these curves. Thus, the processing unit 2 obtains, as shown in FIG. 16, curvatures along and over the entire circumferences of the first and second contour curves "A" and "B", starting from the associate points that are designated by the user.

In Step S62, the processing unit 2 detects, both on the first and second contour curves "A" and "B", points which exhibit peaks of curvatures whose absolute values exceed a predetermined threshold, and extracts coordinates of such detected points as being coordinates of candidate associate points. In other words, the processing unit 2 compares the absolute value of each of successive peaks of curvatures appearing along each of the first and second contour curves "A" and "B" with the threshold value. The processing unit 2 then extracts the coordinates of points on the first contour curve "A" where the curvature peaks of absolute values exceeding the threshold are exhibited, as well as the coordinates of points on the second contour curve "B" where the curvature peaks of absolute values exceeding the threshold are exhibited, and determines the extracted coordinates as being the coordinates of candidate associate points. For instance, the processing unit 2 determines three candidate associate points a1, a2 and a3 on the first contour curve "A" and two candidate associate points b1 and b2 on the second contour curve "B".

In Step S63, the processing unit 2 determines whether the preceding step S62 has determined any candidate associate pints. Upon confirming that candidate associate points have been extracted, the processing unit 2 advances the process to Step S64, otherwise the processing for setting the associate points is terminated. In the illustrated case, the process advances to Step S64 because Step S61 have extracted candidate associate points on the first and second contour curves "A" and "B".

In Step S64, the processing unit 2 compares the number of the candidate associate points obtained on the first contour curve "A" with that obtained on the second contour curve "B". The processing unit 2 then examines whether the candidate associate points on the contour curve having the greater number of candidate associate points include a point the moment of which is in the neighborhood of the moment at which one of the candidate points on the other contour curve was detected and which exhibits the same sign (plus or minus) of the curvature as the above-mentioned one of the candidate associate points on the contour curve having fewer candidate associate points. Such a candidate associate point existing on the contour curve having the greater number of candidate associate points, if any, is determined as being one of the counterpart of the associates points, while the above-mentioned candidate associate point on the contour curve having fewer candidate associate points is determined as being the other counterpart of the associate points.

More specifically, referring to FIG. 17, a candidate associate point b1 has been detected on the second contour curve "B" which is the curve having fewer candidate associate points. The processing unit 2 selects, on the first contour curve "A" which is the curve having the greater number of candidate associate points, the point a2 as being a point which is in the neighborhood of the moment of detection of the above-mentioned candidate associate b1 and which exhibits a peak of curvature having the same sign as that of the curvature peak exhibited at the point b1. Thus, the processing unit 2 determines those two points a2 and b1 as being associate points associated with each other: one a2 being on the first contour curve "A", while the other b1 is on the second contour curvature "B". Likewise, the processing unit 2 determines the candidate associate point a3 and the candidate associate point b2 as being associated points associated with each other, one a3 being on the first contour curve "A" and the other b2 on the second contour curve "B".

In Step S65, the processing unit 2 operates such that the above-described processing for setting associate points is executed on the next candidate associate point. Step S66 determines whether the associate point setting operation has been finished to reach the associate point designated by the user. The processing unit 2 terminates the associate point setting process upon confirming that the retrieval of the candidate associate point has reached the starting associate pint which has been given y the user. Otherwise, the process returns to Step S64.

Thus, the processing unit 2 performs the retrieval of the candidate associate points on the contour curve having fewer candidate associate points. This curve is determined through the comparison performed in Step S62. The processing unit 2 continues the retrieval along the contour curve having the fewer candidate associate points, until the retrieval recurs to the starting associate point designated by the user, while executing the processing of Step S64 on each of the successive candidate associate points on the contour curve having fewer candidate associate points. Consequently, the processing unit 2 sets a couple of associate points composed of the point a2 on the first contour curve "A" and the point b1 on the second contour curve "B", and another couple of associate points composed of the point a3 on the first contour curve "A" and the point b2 on the second contour curve "B".

Thus, the curve generating apparatus 1 executes the processings of Steps S61 to S66 when a single associate point is set in response to an operational input signal given by the user. After completing these processings, the curve generating apparatus 1 automatically sets a new associate point. Consequently, the curve generating apparatus 1 automatically sets a plurality of couples of associate points, thus relieving the user from the burden of repeating the manual setting of successive associate points.

With specific reference to FIG. 19, a description will now be given by way of example of a process in which the above-described processings for generating a transient curve and the processing for setting associate points are executed by the processing unit 2 in accordance with a manual operation of the user through the operational input unit 6.

Figure 19:
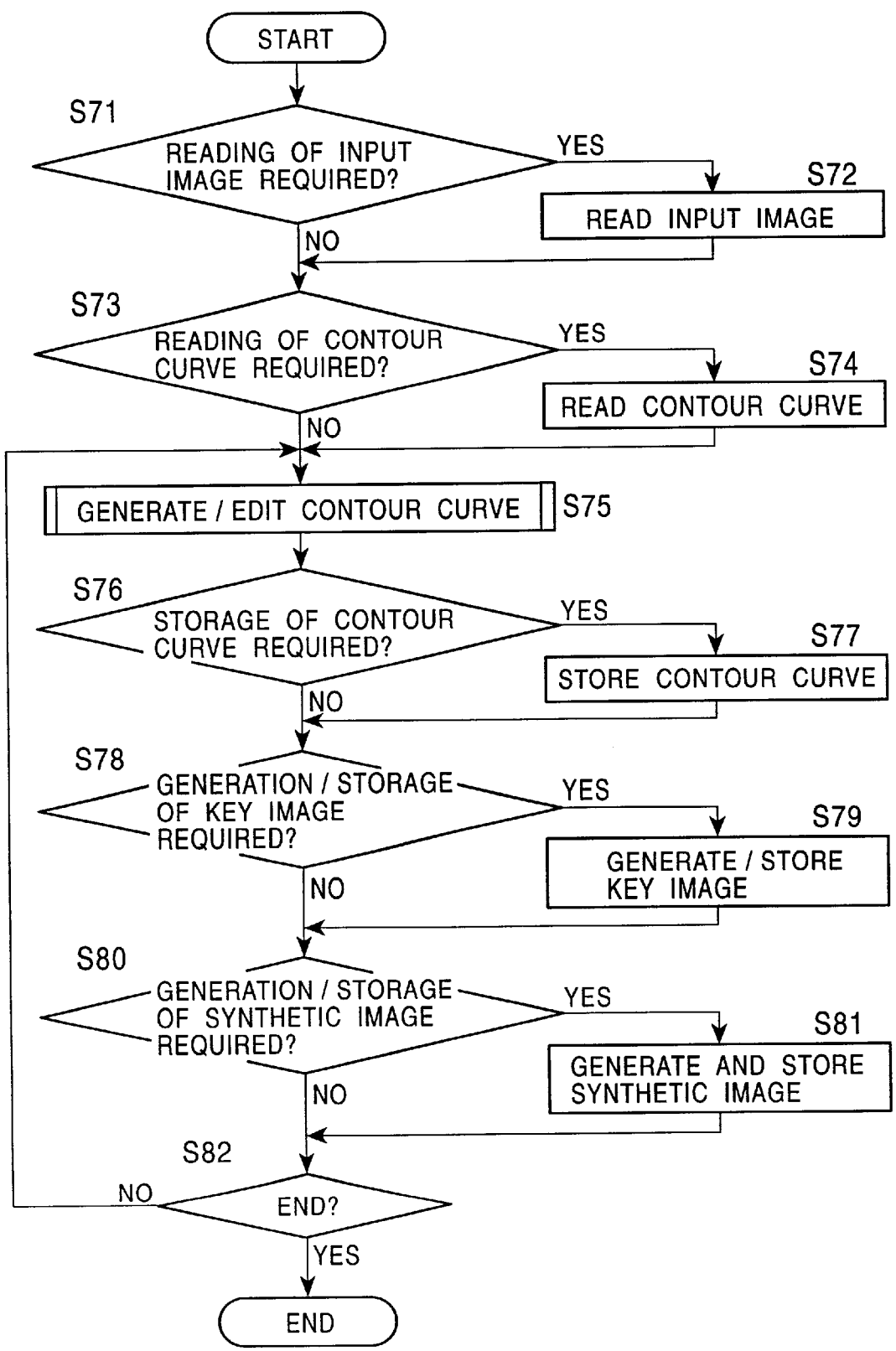
FIG. 19 is a flowchart showing a process in which the processing performed by the processing unit for generating a transient curve and for setting associate points are executed in accordance with an operational input signal which is generated by a user through the operation of an operational input unit.
Figure 20:
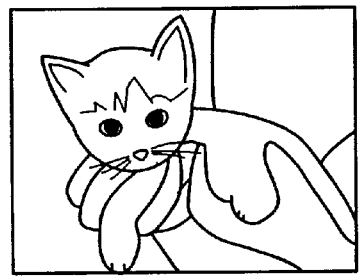
FIG. 20 is an illustration of an input image as a processing object.

Referring to FIG. 19, in Step S71, the processing unit 2 determines whether an operational input signal, indicating that reading of an input image as a processing object as shown in FIG. 20 is necessary, has been received through the operational input unit 6. Upon confirming receipt of the operational input signal indicative of the necessity of such reading, the processing unit 2 advances the process to Step S72, otherwise the process skips to Step S73.

In Step S72, the processing unit 2 executes a processing for reading the input image from the external storage unit 7, in response to the operational input signal given through the operational input unit 6. The process then advances to Step S73.

Figure 21:
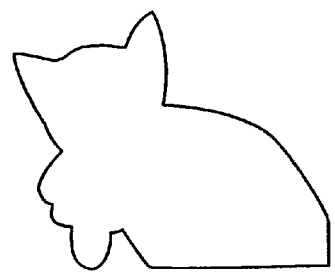
FIG. 21 is an illustration of a contour curve generated based on an input image.

In Step S73, the processing unit 2 determines whether an operational input signal, indicating that reading of a contour curve as a processing object as shown in FIG. 21 is necessary, has been received through the operational input unit 6. Upon confirming the receipt of the operational input signal indicative of the necessity of such reading, the processing unit 2 advances the process to Step S74, otherwise the process skips to Step S75.

In Step S74, the processing unit 2 executes a processing for reading the contour curve from the external storage unit 7, in response to the operational input signal given through the operational input unit 6. The process then advances to Step S75.

In Step S75, the processing unit 2 executes a processing in accordance with the aforesaid transient shape generating process. More specifically, the processing unit 2 executes a processing for generating contour information and an editorial processing.

In Step S76, the processing unit 2 determines whether an operational input signal, indicating that storage of the contour curve generated or edited in Step S75 is necessary, has been received through the operational input unit 6. Upon confirming the receipt of the operational input signal indicative of the necessity of such storage, the processing unit 2 advances the process to Step S77, otherwise the process skips to Step S78.

In Step S77, the processing unit 2 executes a processing for storing the contour information generated or edited in Step S75 in, for example, the external storage unit 7. The process then advances to Step S78.

Figure 22:
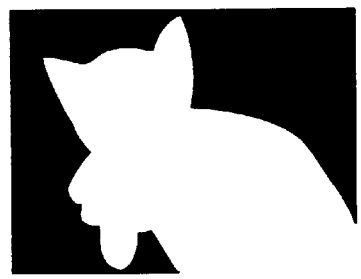
FIG. 22 is an illustration of a key image generated based on the contour curve.

In Step S78, the processing unit 2 determines whether an operational input signal, indicating that generation or storage of a key image as shown in FIG. 22 based on the contour curve generated or edited in Step S75 is necessary, has been received through the operational input unit 6. Upon confirming the receipt of the operational input signal indicative of the necessity of such generation or storage of the key image, the processing unit 2 advances the process to Step S79, otherwise the process skips to Step S80. The term "key image" is sued to mean an image in which a foreground and a background are bordered by a contour curve. In FIG. 22, the area inside the contour curve is the foreground, while the area outside the same is the background. For instance, the foreground is expressed by a level "1", while the background is expressed by a level "0".

In Step S79, the processing unit 2 executes a processing for generating the key image of FIG. 22 or a processing for storing the key image, by using, for example, a contour curve as shown in FIG. 21. The process then advances to Step S80.

In Step S80, the processing unit 2 determines whether an operational input signal, indicating that generation or storage of a synthetic key image composed by using the key image generated or edited in Step S75 is necessary, has been received through the operational input unit 6. Upon confirming the receipt of the operational input signal indicative of the necessity of such generation or storage of the synthetic key image, the processing unit 2 advances the process to Step S81, otherwise the process skips to Step S82.

In Step S81, the processing unit 2 executes a synthesizing processing for forming a synthetic key image by using the key image shown in FIG. 22, thus performing generation or storage of the synthetic image. The process then advances to Step S82.

In Step S82, the processing unit 2 determines whether an operational input signal indicating that the processing using the contour curve is to be terminated has been received. Upon confirming that the processing is not to be terminated, the process returns to Step S75, otherwise the processing is terminated.

As will be understood from the foregoing description, the processing unit 2 executes in Step S75 processing for generating or editing transient curves and so forth, based on contour curves. Thus, a plurality of consecutive contour curves are generated for successive frames and, based on such contour curves, key images are formed for successive frames of a motion picture. In this process, the processing unit 2 can generate and display the key images based on contour curves edited in accordance with the operational input signal given by the operational input unit 6, and can store such a key images in a file.

The processing unit 2 also can generate and display synthetic images synthesized from the foregrounds, backgrounds and the key images formed based on generated or edited contour curves, and can store such synthetic images in a file, in accordance with operational input signals given through the operational input unit 6.

As will be understood from the foregoing description, Step S75 of the process for generating or editing contour curves performs a processing for generating a transient curve in accordance with the aforesaid transient shape generating program or a processing for editing the transient curves. The described process, however, may be modified such that Step S75 further permits manual operations of the user through the operational input unit 6, so as to divide a segment of the contour curve of a designated frame into a plurality of segments thereby increasing the number of the segments, or to consolidate a plurality of segments into one segment thereby reducing the number of the segments.

The processing unit 2 may deal with two types of frames: a master frame on which a curve is edited in response to operational input signal input by the user through the operational input unit 6, and a non-master frame in which a transient curve is generated based on the curve on the master frame. In such a case, the processing unit 2 may have a function for designating a non-master frame to serve as a master frame, so as to enable edition of the image on this frame.

The processing unit 2 also may have a function for designating a master frame to serve as a non-master frame in response to an operational input signal, so as to enable a curve on this frame to be edited in accordance with the described transient shape generating program.

Further, the processing unit 2 may have a function to select, in response to an operational input signal, one of associate points on each of two successive master frames and to qualify these two associate points as being a couple of associate points, as well as a function for dismissing the association between two points that have been used as a couple of associate points.

As will be understood from the foregoing description, the processing unit 2 enables a contour curve to be generated on a non-master frame and permits such a contour curve to be displayed on the display unit 9. This enables an editorial processing to be performed for editing the configuration of a curve on a master frame in accordance with an operational input signal. The processing unit 2 also can perform an editorial processing of whole motion picture in accordance with an operational input signal. To this end, the processing unit 2 sets the shape of a contour curve to be contained in successive frames, and repeats the processing for setting the shape of the curve by a number corresponding to the number of the contour curves to be contained in the frames.

To enable such an editorial work on the contour curve, the processing unit 2 causes the display unit 9 to display elements of the operational input unit 6 such as buttons and sliders to be used in generating a contour curve to be processed and in generating the operational input signal. The user can input an operational input signal through the displayed operational input unit 6. The user operates the displayed operational input unit elements such as an icon on the display unit 9. The processing unit 2 permits the editorial processing by combining, in response to operational input signals, various kinds of elementary editorial processings such as shifting of a control point, division of a segment, reading of a file, changing of the frame to be edited, and so forth. There is no definite sequence of combination of these elementary editorial processings for generating or editing a single contour curve. Namely, these elementary editorial processings may be executed in an arbitrary order.

A description will now be given of various processing modes of the processing unit 2 in executing the editorial processing.

The processing modes used in the editorial processing are sorted into modes possessed by application programs to be executed by the processing unit 2, modes possessed by the contour curves for each frame, modes possessed by end points and modes possessed by the segments.

For instance, a mode possessed by an application program such as the aforesaid transient shape generating program is one of the modes possessed by the application programs. The mode possessed by each contour curve is a mode peculiar to each of closed curves. The mode possessed by the contour curve for each frame is a mode peculiar to each contour curve for each of the frames. The modes possessed by end points are modes each one of which is possessed by one end pint. The modes possessed by the segments are modes each one of which is possessed by one segment.

The modes possessed by application programs include a reproduction mode, a loop mode, a frame update mode, a cache mode, an interaction mode, a Bezier preference mode, a contour curve synthesizing mode, and a rendering mode.

Figure 23:
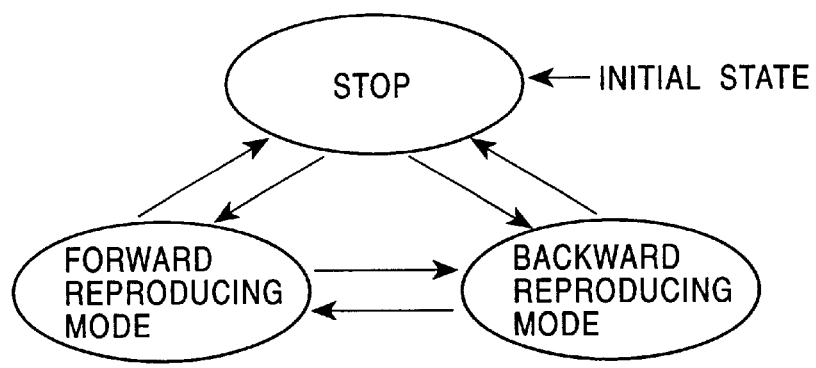
FIG. 23 is an illustration of a transient phase of a reproduction mode.
Figure 24:
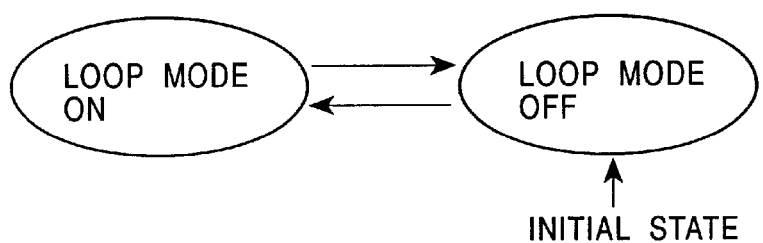
FIG. 24 is an illustration of a transient phase of a loop mode.

The reproduction mode is a mode which indicates whether a motion picture display is to be executed for an image. As shown in FIG. 23, there are three modes or states in the reproduction mode; namely, a forward reproduction mode, a reverse reproduction mode and a stop mode.

In the forward reproduction mode, the processing unit 2 refers to frame numbers attached to consecutive frames and displays an image or a pattern on the display unit 9 while automatically changing the frames one after another in the increasing order of the frame number. Thus, the processing unit 2 presents to the user a motion picture of the input image or an edited contour curve or a key image.

In the reverse reproduction mode, the processing unit 2 displays the input image, contour curve or the key image, while changing the frames automatically in a decreasing order of the frame numbers.

In the stop mode, the processing unit 2 does not execute any processing for automatically updating the frame number.

In the described curve generating apparatus 1, the processing unit 2 is held in the stop mode when the apparatus is in the initial state or in the steady state. The mode is then switched to the forward or reverse reproduction mode, in response to an operational input signal that is produced by the user operating the operational input unit 6.

In each of the forward reproduction mode and the reverse reproduction mode, update of the frame is performed regardless of the state of the frame update mode which will be described later.

The loop mode also is a mode which indicates whether the motion display of an image is to be performed. There are two states in this mode: namely, a loop-mode-ON state and a loop-mode-OFF state.

In the loop-mode-ON state, when reproduction and display of a motion picture in the forward reproduction mode has reached the ending frame, the processing unit 2 operates to repeat the forward reproduction again starting from the starting frame. Likewise, when reproduction and display of a motion picture in the reverse reproduction mode has reached the starting frame, the processing unit 2 operates to repeat the reverse reproduction again starting from the ending frame. When an operational input signal indicating that a later-mentioned frame forward-feed key has been selected is received while the ending frame is on display, the processing unit 2 operates to switch the frame to the starting frame so that the starting frame is displayed. Likewise, when an operational input signal indicating that a later-mentioned frame reverse-feed key has been selected is received while the starting frame is on display, the processing unit 2 operates to switch the frame to the ending frame so that the ending frame is displayed.

In the loop-mode-OFF state, when reproduction and display of a motion picture in the forward reproduction mode has reached the ending frame, the processing unit 2 operates to dismiss the forward reproduction mode and switches the mode automatically to the stop state. Likewise, when reproduction and display of a motion picture in the reverse reproduction mode has reached the starting frame, the processing unit 2 operates to dismiss the reverse reproduction mode and switches the mode automatically to the stop state. In the loop-mode-OFF state, the processing unit 2 operates to automatically start the display in the reverse reproduction mode, starting from the ending frame, even when an operational input signal indicating that the frame forward-feed key has been selected is received while the ending frame is on display. When an operational input signal indicating that the frame forward-feed key has been selected while the ending frame is on display, the processing unit 2 operates to switch the frame to the starting frame so that the starting frame is displayed. Likewise, when an operational input signal indicating that the frame reverse-feed key has been selected is received while the starting frame is on display, the processing unit 2 operates to switch the frame to the ending frame so that the ending frame is displayed.

Figure 25:
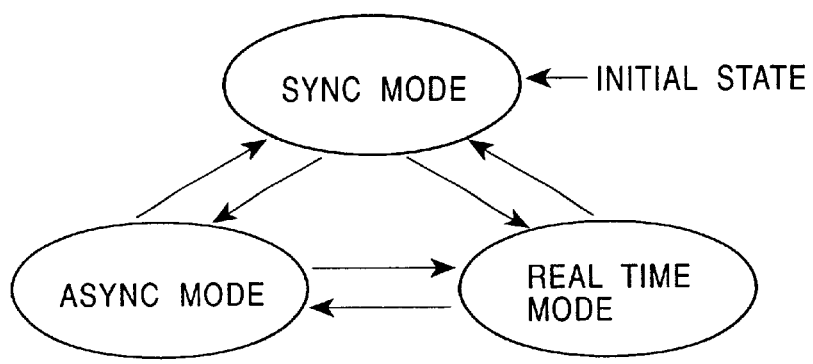
FIG. 25 is an illustration of a transient phase of a frame update mode.

The frame update mode is a mode which pertains to a method of updating frames when frames are shifted by means of a later-mentioned frame number setting slider. As shown in FIG. 25, there are three modes or states in this frame update mode: a real Time mode, a Sync mode and an ASync mode.

In the Real Time mode, the processing unit 2 operates such that, when the frame number setting slider 54 is being moved in response to an operational input signal, the frame number is updated to the number corresponding to the instant position of the frame number setting slider 54. When the frame number setting slider 54 is stopped in response to an operational input signal, the processing unit 2 updates the frame number to the number corresponding to the final position of the slider 54.

In the Sync mode, the processing unit 2 does not perform any processing for updating the frame number while the frame number setting slider is being moved in response to an operational input signal. When the frame number setting slider is stopped in response to an operational input signal, the processing unit 2 operates to update the frame number so that the frame number corresponds to the final position of the slider 54.

In the ASync mode, the processing unit 2 performs updating operation neither during the movement of the frame number setting slider 54 nor when the moving slider 54 is stopped. The processing unit 2 performs the updating operation so as to update the frame number to a number corresponding to the position at which the slider 54 is stopped, only upon receipt of an operational input signal indicating that a later-mentioned frame update button has been pressed.

The frame update mode is initially set to the Sync mode. The frame update mode can be set and changed independently of other modes and states.

Figure 26:
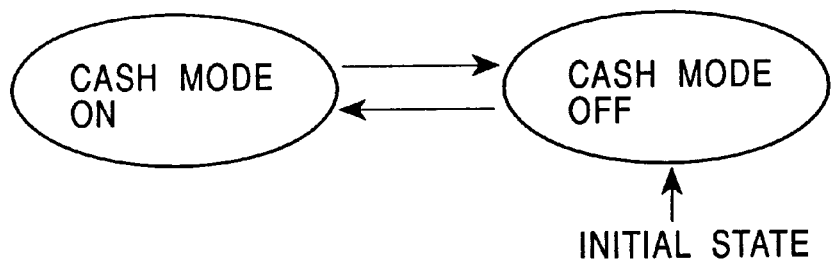
FIG. 26 is an illustration of a transient phase of a cache mode.

The cache mode is a mode pertaining the use of a later-mentioned cache technique. As shown in FIG. 26, there are two states or modes in this cache mode: namely, cache-ON mode and cache-OFF mode.

In the cache-ON mode, the processing unit 2 validates a cache memory. As a result, image data read from the external storage unit 7 is stored in the data memory 4. When a request is received for displaying the image, the image is read from the data memory 4. The image data stored in the data memory will be referred to as "cache data", hereinafter.

In the cache-OFF mode, the processing unit 2 invalidates the cache memory. Thus, the processing unit 2 operates such that the image is read from the external storage unit 7 each time a request is received for displaying the image.

Figure 27:
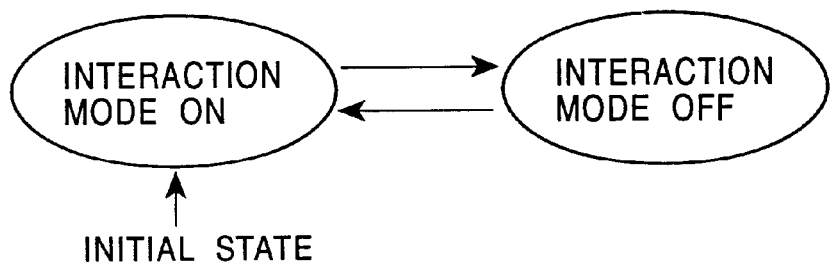
FIG. 27 is an illustration of a transient phase of an interaction mode.

The interaction mode is a mode for determining whether a curve which is being edited is to be displayed. As will be seen from FIG. 27, there are two states or modes in the interaction mode: an interaction-mode-ON state and an interaction-mode-OFF state.

In the interaction-mode-ON state, the processing unit 2 permits the contour curve which is being edited to be displayed.

In the interaction-mode-OFF state, the processing unit 2 does not permit the contour curve which is being edited to be displayed.

The interaction mode is initially set to the interaction-mode-ON state. The interaction mode can be set and changed independently of other modes and states.

Figure 28:
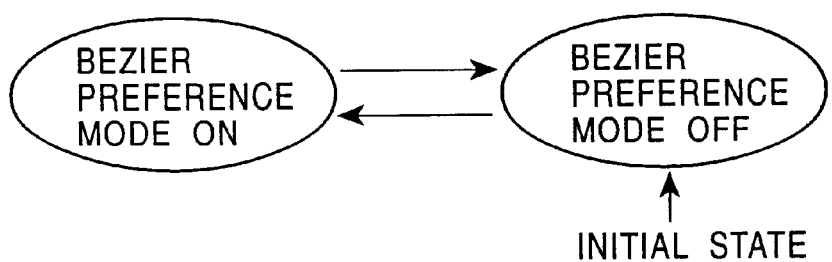
FIG. 28 is an illustration of a transient phase of a Bezier preference mode.
Figure 29:
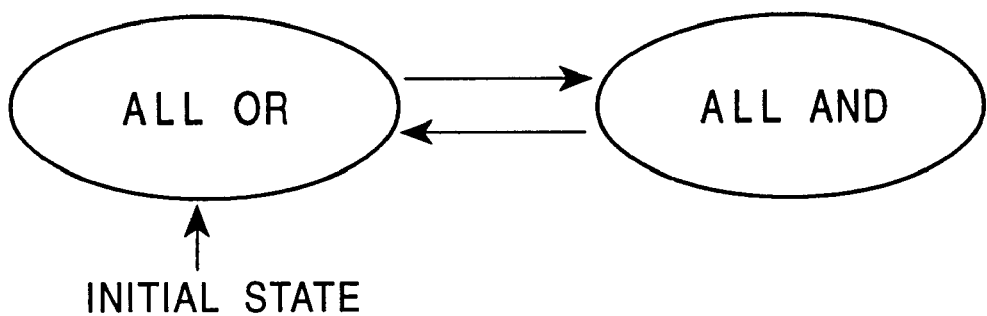
FIG. 29 is an illustration of a transient phase of a contour curve synthesis mode.

The Bezier preference mode pertains to determination as to preference between a mode for selecting later-mentioned control point and a mode for selecting other patterns. As will be seen from FIG. 28, there are two states in the Bezier preference mode: namely, a Bezier-preference-mode-ON state and a Bezier-preference-mode-OFF state.

In the Bezier-preference-mode-ON state, the processing unit 2 operates in accordance with an operational input signal so as to give preference to the selection of the control points for the purpose of editorial processing.

In the Bezier-preference-mode-OFF state, the processing unit 2 operates in accordance with an operational input signal so as to give preference to the selection of a pattern other than the control points for the purpose of editorial processing.

The Bezier preference mode is initially set to Bezier-preference-mode-OFF state. The Bezier preference mode can be set and changed independently of other modes and states.

The contour curve synthesizing mode pertains to the manner in which a plurality of contour curves are combined to form a key image. As will be seen from FIG. 2, there are two states in the contour curve synthesizing mode: namely, an AllOR mode and an AllAND mode.

In the AllOR mode, the processing unit 2 performs a processing for generating a key image over a region which is the logical sum of regions designated by a plurality of contour curves.

In the AllAND mode, the processing unit 2 performs a processing for generating a key image over a region which is the logical product of regions designated by a plurality of contour curves. Namely, the processing unit 2 performs the processing on a region where the plurality of contour curves overlap, i.e., over a region which is common to the plurality of contour curves.

The contour curve synthesizing mode is initially set to the AllOR mode. The contour curve synthesizing mode can be set and changed independently of other modes and states.

Figure 30:
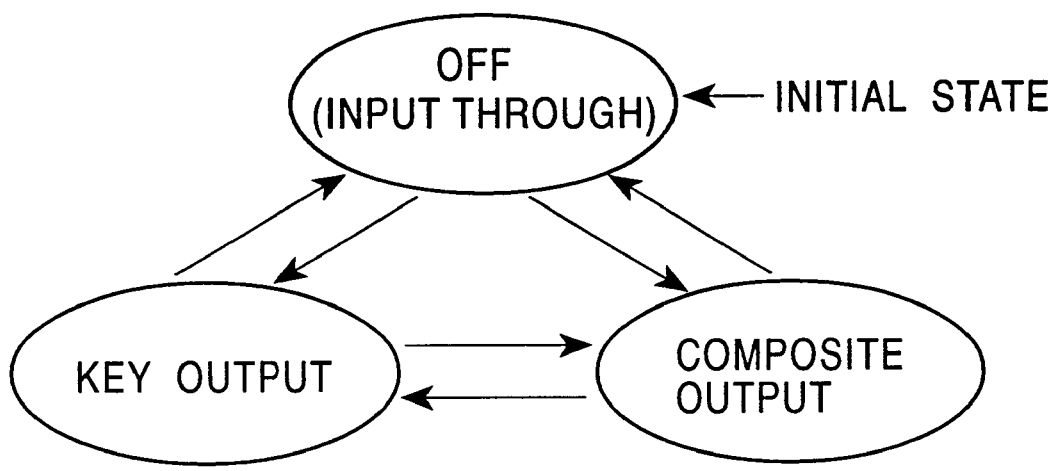
FIG. 30 is an illustration of a transient phase of a rendering mode.

The rendering mode is a mode for determining the data which is to be delivered from the processing unit 2 to the display unit 9 and which is to be output to an output click. As shown in FIG. 30, there are three states or modes in the rendering: an Off (Input Through) mode, a Key-Output mode and a Composite-Output mode.

In the off mode, the processing unit 2 operates so that a foreground image is output to the main panel and to the output click.

In the Key-Output mode, the processing unit 2 operates so that a key image is output to the main panel and to the output click.

In the Composite-Output mode, the processing unit 2 operates so that an image which is synthesized from a foreground image and a background image based on a key image is output to the main panel and to the output click.

The rendering mode is initially set to the Off mode when the processing unit 2 is started. The rendering mode can be set and changed independently of other modes and states.

A description will now be given of the mode possessed by each contour curve.

Each contour curve has a reverse mode which indicates whether a background is constituted by the area inside the contour curve, i.e., a closed curve, or by the area outside the contour curve. There are two states in this mode: namely, a normal state and a reverse state.

In the normal state, the processing unit 2 recognizes that the area inside the contour curve constitutes a foreground while the exterior area constitutes a background.

In the reverse state, the processing unit 2 recognizes that the area inside the contour curve constitutes a background while the exterior constitutes a foreground.

A description will now be given of the mode possessed by each contour curve for each frame.

The modes possessed by each contour curve for each frame include a master frame mode. This mode is a mode for showing whether a frame having a contour curve is a master frame mentioned before. There are two states in this mode: namely, a master frame state and a non-master frame state.

The master frame state indicates that the frame containing the contour curve which is being edited is a master frame.

The non-master frame state indicates that the frame containing the contour curve which is being edited is a non-master frame.

A description will now be given of the modes possessed by each end point.

There are two types of modes possessed by each end point: namely, an associate point mode and a selection mode.

The associate point mode is a mode for indicating whether an end point is an associate point, and has two states: namely, an associate-point state and a non-associate-point state. The associate-point state means that the end point has been set as being an associate point. The end point in the associate point state will be referred to as an "associate end point". The non-associate-point state means that the end point has not been set as an associate point. The end point in the non-associate-point state will be referred to as an "non-associate end point".

The selection mode is a mode for indicating whether an end point has been selected by an operational input signal, and has two states: namely, a select state and a non-select state. The select state means that the end point has been selected by the operational input signal. The end point in the select state will be referred to as a "selected end point". The non-select state means that the end point has not been selected by the operational input signal. The end point in the non-select state will be referred to as a "non-selected end point".

A description will now be given of the modes possessed by each segment.

Each segment has a select mode. The select mode is a mode for indicating whether a segment has been selected by the operational input signal. There are two states of the select mode: namely, select state and non-select state. The select state means that the segment has been selected by the operational input signal. The segment in the select state will be referred to as a "selected segment". The non-select state means that the segment has not been selected by the operational input signal. The segment in the non-select state will be referred to as a "non-selected segment".

A description will now be given of the contents of the processing performed in the processing unit 2 based on the modes possessed by the application program, contour curve, frame and end point.

Figure 31:
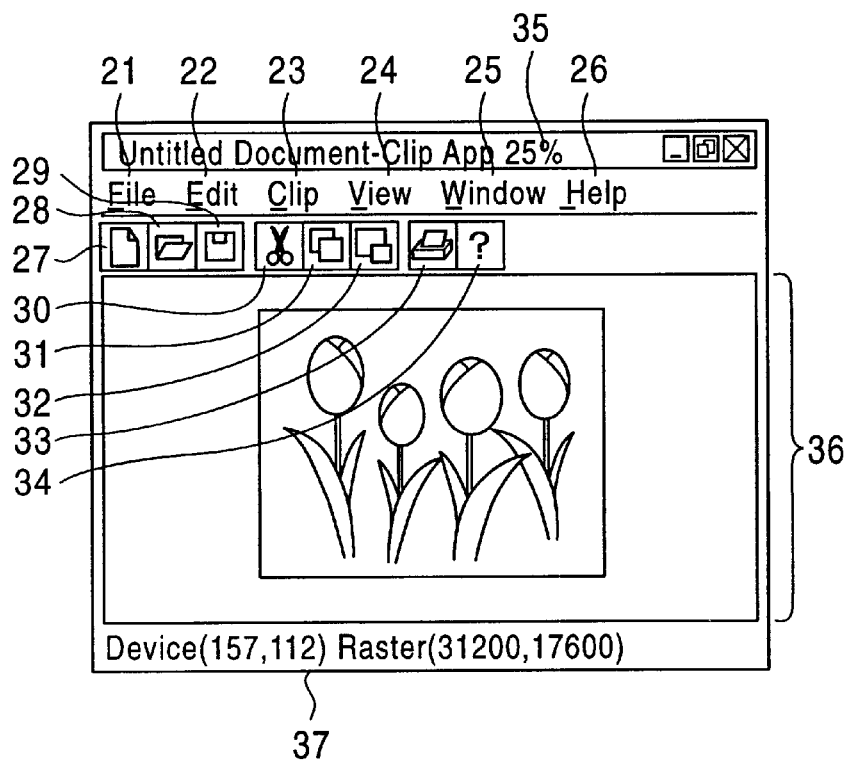
FIG. 31 is an illustration of a main panel which is displayed on a display unit during, for example, an editorial processing.

The processing unit 2 performs, when started up by a user, a processing for causing a main panel as shown in FIG. 31 to be displayed on the display unit 9. No image file is designated at the time of start-up of the processing unit 2, so that no image is actually displayed in the image display area 36 of the main panel shown in FIG. 31.

For the purpose of enabling a processing such as an editorial processing in accordance with the aforesaid transient shape generating program, the processing unit 2 causes the display unit 9 to display menus, buttons, sliders and text boxes to encourage the user to operate the operational input unit 6.

When an operational input signal indicating that a menu display position has been pointed, the processing unit 2 performs a processing for displaying a menu having one or more items to be selected. Upon receipt of an operational input signal indicating that an item has been selected on the menu, the processing unit 2 performs a processing which corresponds to the selected item.

The buttons are displayed for the purpose of enabling the processing unit 2 to execute a processing corresponding to a selected button. There are two types of buttons: namely, buttons which do not have any state and buttons which have states. Upon receipt of an operational input signal indicating that a button having no state has been selected, the processing unit 2 performs one cycle of processing. Upon receipt of an operational input signal indicating that a button having a state has been selected, the processing unit 2 performs an operation to change the state and to hold the new state until the same button is selected next time. Thus, the button having a state is intended to cause the apparatus to hold a specific state. The button having a state will also be referred to as a "toggle button".

The slider has a handle slidable along a scale having continuous or discrete values. The slider is displayed for the purpose of enabling generation of an operational input signal which indicates continuous or discrete values within a given range. The user operates the operational input unit 6 so as to click on a point on the slider by a pointing device such as a mouse or the like and drags a cursor along the slider to a different position by moving the mouse. Thus, the slider is displayed for the purpose of enabling generation of an operational input signal that designates such a different position and the value of such a different position.

The instructions given through the pointing device can also be achieved through pressing a specific key or a combination of specific keys on the keyboard. The operational input unit 6 generates an operational input signal when an item "New" is selected on the file menu 21 on the display. The operational input unit produces the same operational input signal when the user presses a Ctrl key and an "N" key simultaneously on the keyboard.

Thus, an operation equivalent to that achieved through operation of a pointing device can also be achieved through the operation of the keyboard. This facility is referred to as "keyboard shortcut" and is used for functions which are used frequently.

For the purpose of executing a processing such as an editorial processing, the processing unit 2 performs a processing for causing a main panel of FIG. 31 to be displayed in accordance with an application program which implements such an editorial processing.

The main panel contains a file menu 21, an edition menu 22, a clip menu 23, a view menu 24, a window menu 25, and a help menu 26. When one of these menu is designated through the operation of the operational input unit 6, an operational input signal is generated indicating that the menu has been selected. The main panel also displays new curve file button 27, a curve file open button 28, a curve file save button 28, a cut button 30, a copy button 31, a paste button 32, a print button 33 and a help button 34. When one of these buttons is designated by the user through the operation of the operational input device 6, an operational input signal indicating that the button has been pointed is generated and received by the processing unit 2.

The new curve file button 27, when selected by the user through the operational input unit 6, triggers a processing which is the same as that executed when an item "New" is selected in the file menu 21 which will be described later in detail.

The curve file open button 28, when selected by the user through the operational input unit 6, triggers a processing which is the same as that executed when an item "Open" is selected in the file menu 21.

The curve file save button 29, when selected by the user through the operational input unit 6, triggers a processing which is the same as that executed when an item "Save" is selected in the file menu 21.

The cut button 28, when selected by the user through the operational input unit 6, triggers a processing which is the same as that executed when an item "Cut" is selected in the edition menu 22 the detail of which will be described later.

The copy button 31, when selected by the user through the operational input unit 6, triggers a processing which is the same as that executed when an item "Copy" is selected in the edition menu 22.

The paste button 32, when selected by the user through the operational input unit 6, triggers a processing which is the same as that executed when an item "Pate" is selected in the edition menu 22.

The print button 33 is always invalidated because the transient curve generating program, for example, does not have any printing function. Thus, when the transient curve generating program runs, the print button 33 is displayed but cannot be pointed by the pointing device.

The help button 34, when selected by the user through the operational input unit 6, triggers a processing which is the same as that executed when an item "About" is selected in the help menu 26.

The main panel also has a zoom ratio displaying portion 35. When an image is displayed on the image display area 36, the zooming ratio or magnification of the displayed image is indicated by percent in the zoom ratio displaying portion 35.

The main panel also has a cursor coordinates displaying portion 37 which displays the position of the cursor of the pointing device in terms of a device coordinate system and a raster coordinate system.

The relationship between the device coordinate system and the raster coordinate system will be described in detail with reference to FIG. 32 which shows the relationship.

Figure 32:
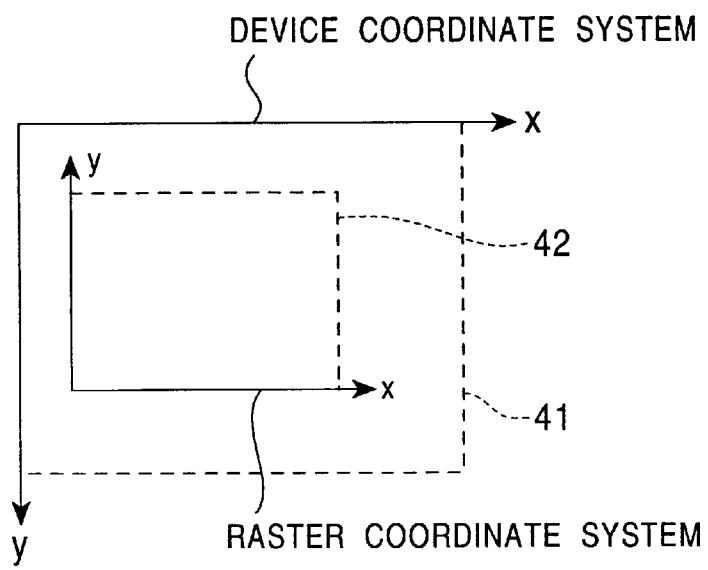
FIG. 32 is an illustration of the relationship between a device coordinate system and a raster coordinate system.

Referring to FIG. 32, the device coordinate system is a coordinate system which is defined on the image area 41 of the display unit 21. The left upper corner of the image area 41 of the display unit 9 is determined as the origin of this coordinate system. The coordinate system has an x-axis which extends to the right from the origin. Thus, points on the right side of the origin have positive X coordinate values. The coordinate system has a y-axis which extends downward from the origin. Thus, points on the lower side of the origin have positive y coordinate values. The x and y axes are scaled on the unit of one pixel displayed by the display unit 9.

The raster coordinate system is a coordinate system which is defined on the image area 42 stored in the image file. The left lower corner of the image area 42 stored in the image file is determined as the origin of this coordinate system. The coordinate system has an x-axis which extends to the right from the origin. Thus, points on the right side of the origin have positive x coordinate values. The coordinate system has a y-axis which extends upward from the origin. Thus, points on the upper side of the origin have positive y coordinate values. The x and y axes are scaled on the unit of one pixel of the image stored in the image file.

As described before, the main panel has an image display area 36 which can display an input image, contour curve which is being edited and a generated key image.

Figure 33:
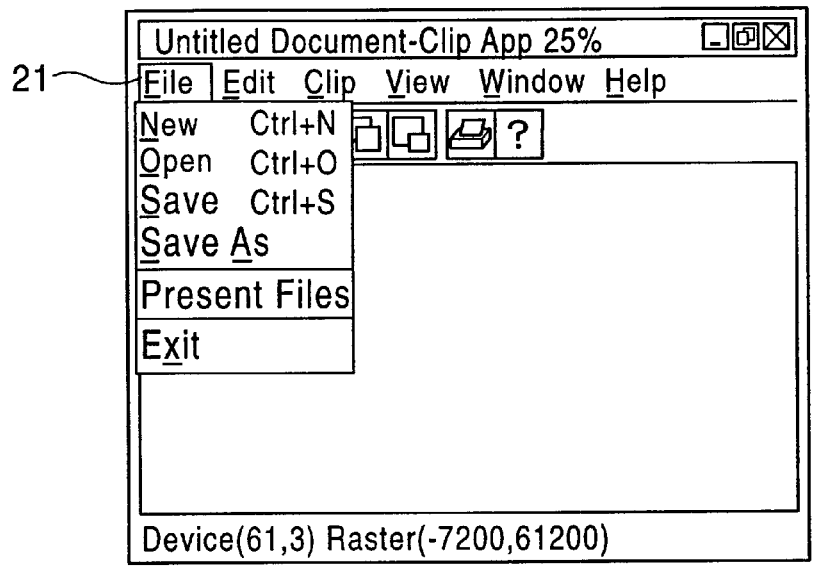
FIG. 33 is an illustration of a file menu in the main panel.

A description will now be given of the file menu in the main panel, with specific reference to FIG. 33.

The file menu 21 has five items for selection: namely, "New", "Open", "Save", "Save" As, and "Exit".

In response to selection of the item "New" by the user through the operational input unit 6, the processing unit 2 discards the contour curve which is being edited and commences an editorial processing on a new contour curve. The "New" processing performed by the processing unit 2 may be triggered not only by the selection of the item "New" by means of the pointing device but also by a keyboard operation. By way of example, in the described embodiment, the same "New" processing is performed by the processing unit 2 also in response to simultaneous pressing of a Ctrl key and an "N" key on the keyboard.

In response to selection of the item "Open" by the user through the operational input unit 6, the processing unit 2 operates so that a panel (not shown) listing files. One of the files is selected by the user through the operational input unit 6. The processing unit 2 reads the contour curve from the selected file. The "Open" processing performed by the processing unit 2 may be triggered not only by the selection of the item "Open" by means of the pointing device but also by a keyboard operation. By way of example, in the described embodiment, the same "Open" processing is performed by the processing unit 2 also in response to simultaneous pressing of a Ctrl key and an "O" key on the keyboard.

In response to selection of the item "Save" by the user through the operational input unit 6, the processing unit 2 operates so that the contour curve which is being edited is stored in an overwriting manner in the file that is saved last of all. When the save is performed for the first time, if the item "Open" has been selected, the contour curve is stored in an overwriting manner in the file designated in the "Open" processing. If the item "Open" has not been selected, the processing unit 2 operates so that the aforesaid panel (not shown) which lists files is displayed to enable the user to select one of these files. The contour curve is then stored in the selected file. The "Save" processing performed by the processing unit 2 may be triggered not only by the selection of the item "Save" by means of the pointing device but also by a keyboard operation. By way of example, in the described embodiment, the same "Save" processing is performed by the processing unit 2 also in response to simultaneous pressing of a Ctrl key and an "S" key on the keyboard.

Selection of the item "Save As" by the user through the operational input unit 6 causes the processing unit 2 to perform an operation for presenting the above-mentioned panel (not shown) to enable the user to select one of the files. The contour curve is stored in the file designated by the user through the operational input unit 6.

Selection of the item "Exit" by the user through the operational input unit 6 causes the processing unit 2 to terminate the processing.

Figure 34:
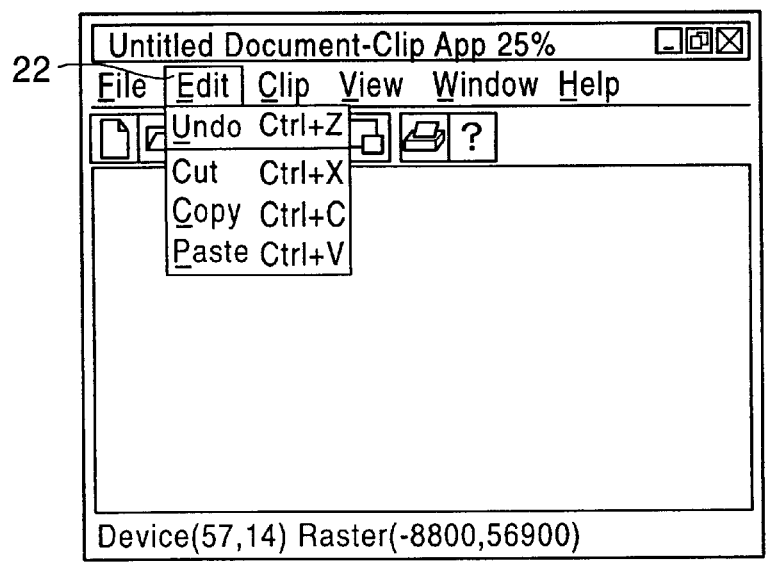
FIG. 34 is an illustration of an editorial menu in the main panel.

A description will now be given of the edition menu 22 contained in the main panel, with specific reference to FIG. 34.

The edition menu 22 includes four items for selection: namely, "Undo", "Cut", "Copy" and "Paste". The application program for implementing the display screen shown in FIG. 34 does not have the "Undo" function. The item "Undo", therefore, has been invalidated. Namely, the item "Undo" does not trigger any processing even when selected by the user through the operational input unit 6. The "Undo" function is not described in detail because this function does not constitute any critical portion of the present invention.

Selection of the item "Cut" by the user through the operational input unit 6 causes the processing unit 2 to operate so that the contour curve which has been selected is stored in a specific area referred to as a "cut buffer" in the data memory 4, while being deleted from the selected contour curve from the data which is being edited. When no contour curve has been selected, the processing unit 2 does not perform the above-described "Cut" processing. The "Cut" processing performed by the processing unit 2 can be triggered not only by the selection of the item "Cut" by means of the pointing device but also by a keyboard operation. For instance, the "Cut" operation is triggered also when the Ctrl key and an "X" key are simultaneously pressed on the keyboard.

Selection of the item "Copy" by the user through the operational input unit 6 causes the processing unit 2 to operate so that the contour curve which has been selected is stored in a specific area referred to as a "cut buffer" in the data memory 4. Unlike the case of the "Cut" processing, the selected contour curve is not deleted from the data which is being edited. When no contour curve has been selected, the processing unit 2 does not perform the above-described "Cop" processing. The "Copy" processing performed by the processing unit 2 can be triggered not only by the selection of the item "copy" by means of the pointing device but also by a keyboard operation. For instance, the "Copy" operation is triggered also when the Ctrl key and a "C" key are simultaneously pressed on the keyboard.

Selection of the item "Paste" by the user through the operational input unit 6 causes the processing unit 2 to operate so that a contour curve stored in the cut buffer of the data memory 4 is added to the content which is being edited. When no contour curve has been stored in the cut buffer, the processing unit 2 does not perform the above-described "Paste" processing. The "Paste" processing performed by the processing unit 2 can be triggered not only by the selection of the item "Paste" by means of the pointing device but also by a keyboard operation. For instance, the "Paste" processing is triggered also when the Ctrl key and a "V" key are simultaneously pressed on the keyboard.

Figure 35:
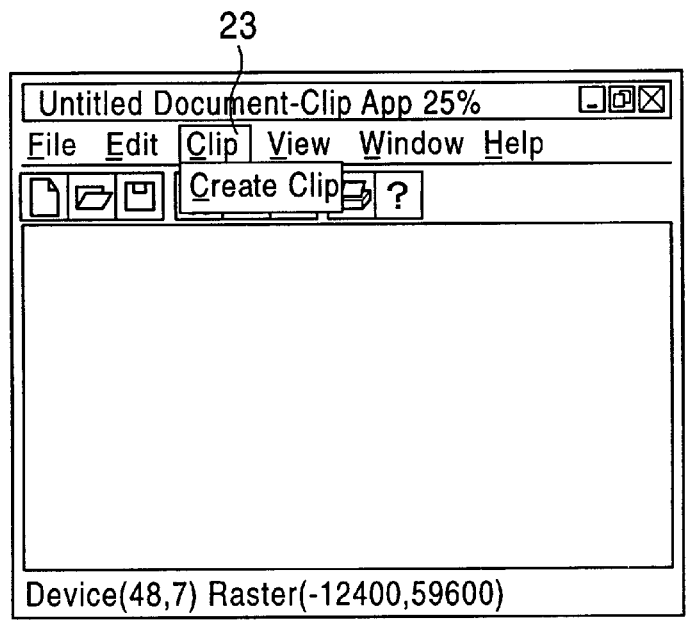
FIG. 35 is an illustration of a clip menu in the main panel.

A description will now be given of the clip menu 23 in the main panel, with specific reference to FIG. 35.

The clip menu has a single item "Create Clip". The application program for implementing the display screen of FIG. 35 is not provided with "Create Clip" function. Therefore, the selection item "Create Clip" has been invalidated and does not trigger any operation of the processing unit 2 even when pointed by the user through the operational input unit. The "Create Clip" function is not described in detail, because this function does not constitute any critical portion of the present invention.

Figure 36:
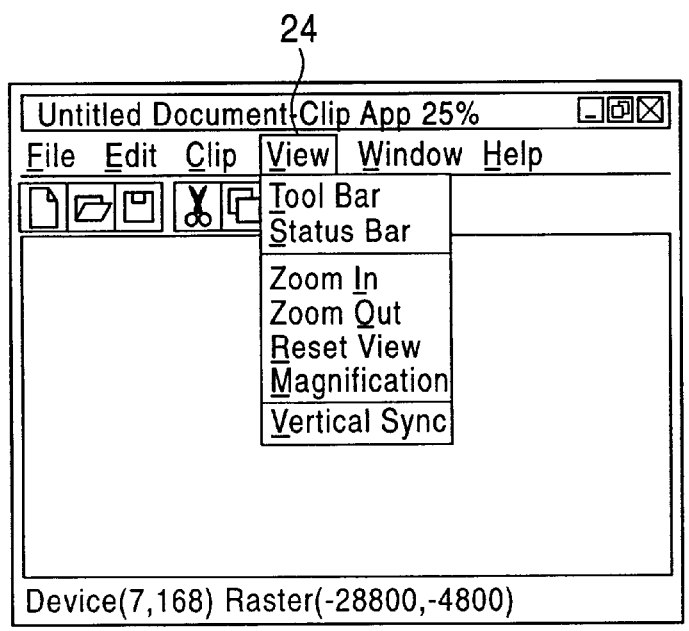
FIG. 36 is an illustration of a view menu in the main panel.

A description will now be given of the view menu 24 in the main panel, with specific reference to FIG. 36.

The view menu 24 has seven items for selection: namely, "Tool Bar", "Status Bar", "Zoom In", "Zoom Out", "Reset View", "Magnification" and "Vertical Sync".

Selection of the item "Tool Bar" by the user through the operational input unit 6 causes the processing unit 2 to perform an operation so that various buttons on the main panel are put on display, if these buttons have not been displayed. These buttons are the new curve button 27, the curve file open button 28, the curve file save button 29, the cut button 30, the copy button 31, the paste button 32, the print button 33 and the help button 34. If these buttons have been displayed, the processing unit 2 operate to erase these buttons in response to an operational input signal.

Selection of the item "Status Bar" by the user through the operational input unit 2 causes the processing unit 2 to operate so that the cursor coordinate display portion 37 is put on display on the main panel, if the cursor coordinate display portion 37 has not been displayed. If this portion has been displayed, the processing unit 2 operates to erase this portion from the display, in response to an operational input signal.

Selection of the item "Zoom In" by the user through the operational input unit 6 causes the processing unit 2 to operate so that the magnification of the image displayed in the image display area 36 of the main panel is increased, thus magnifying the displayed image. Conversely, selection of the item "Zoom Out" by the user through the operational input unit 6 causes the processing unit 2 to operate so that the magnification of the image displayed in the image display area 36 of the main panel is decreased, thus de-magnifying the displayed image. The "Zoom In" processing performed by the processing unit 2 can be triggered not only by the selection of the item "Zoom In" by means of the pointing device but also by a keyboard operation, e.g., by simultaneous pressing of the Ctrl key and a "U" key on the keyboard. Likewise, the "Zoom Out" processing performed by the processing unit 2 can be triggered not only by the selection of the item "Zoom Out" by means of the pointing device but also by a keyboard operation, e.g., by simultaneous pressing of the Ctrl key and an "I" key on the keyboard.

Selection of the item "Reset View" by the user through the operational input unit 6 causes the processing unit 2 to operate so that the display magnification of the image displayed on the image display area 36 of the main panel is reset to 1.0 and that the image is displayed at the center of the image display area 36. Selection of the item "Magnification" by the user through the operational input unit 6 causes the processing unit 2 to operate so that a menu for selection of magnification appears on the display to permit the use to select the magnification, so that the displayed image is magnified or de-magnified into a desired scale. The "Reset View" processing performed by the processing unit 2 can be triggered not only by the selection of the item "Reset View" by means of the pointing device but also by a keyboard operation, e.g., by simultaneous pressing of the Ctrl key and a "Home" key on the keyboard.

When the user has selected the item "Vertical Sync" through the operational input unit 6, the processing unit 2 operates to turn on and off the VSync mode. Namely, if the VSync mode has been turned off, the processing unit turns the VSync mode on, whereas, if the VSync mode has been set on, the processing unit 2 turns this mode off.

Figure 37:
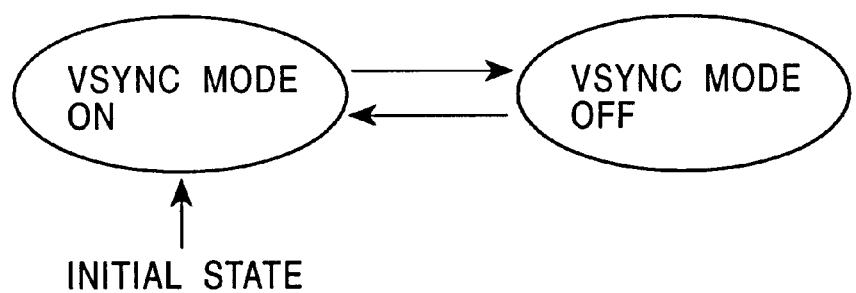
FIG. 37 is an illustration of a transient phase of a Vsync mode.

A description will now be given of the VSync mode, with reference to FIG. 37 which shows the change f the state of the VSync mode. There are two states of the VSync mode: namely, a VSync-mode-ON state and a VSync-mode-OFF state.

In the VSync-mode-ON state, the processing unit 2 operates so that rewriting of the display screen is performed in synchronization with the vertical sweeping period of the CRT of the display unit 9, so as not to cause disturbance of the image during reproduction of the clip. In contrast, in the VSync-mode-OFF state, the processing unit 2 performs the rewriting of the display screen at an arbitrary timing. The VSync mode is initially set to a Stop mode in response to a start-up of the processing unit 2. The Vsync mode can be set and changed independently of other modes and states.

A description will now be given of the window menu 25 in the main panel, with reference to FIG. 38.

The window menu 25 presents three items for selection: namely, "Clip Control", "Properties" and "Status".

Selection of the item "Clip Control" by the user through the operational input unit 6 causes the processing unit 2 to operate so that a clip control panel is put on the display if this panel has not been displayed. When the clip control panel has been already displayed, the processing unit 2 does not perform any processing. The "Clip Control" displaying processing performed by the processing unit 2 can be triggered not only by the selection of the item "Clip Control" by means of the pointing device but also by a keyboard operation. For instance, the "Clip Control" operation is triggered also when the Ctrl key and a "G" key are simultaneously pressed on the keyboard.

Figure 40:
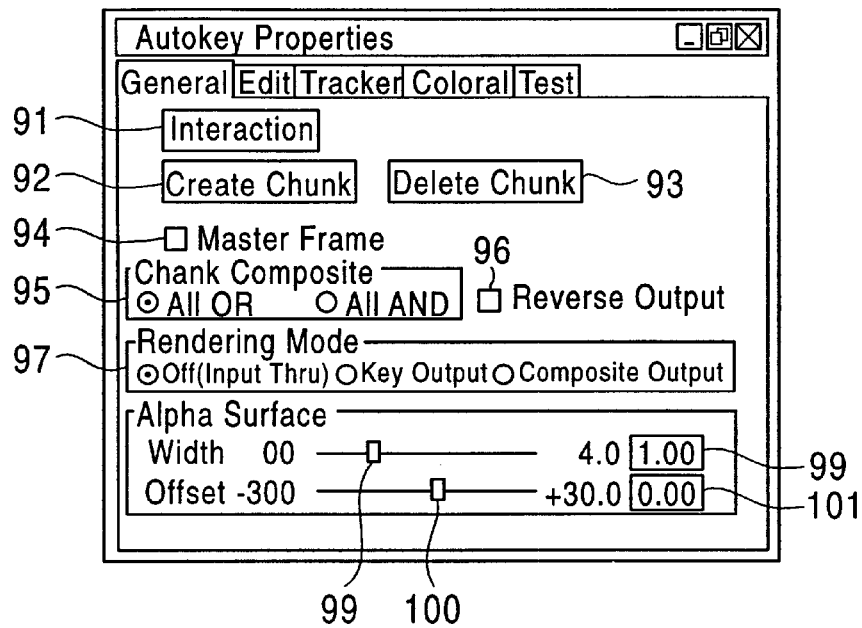
FIG. 40 is an illustration of an AutoKey property panel.

Selection of the item "Properties" by the user through the operational input unit 6 causes the processing unit 2 to operate so that an Autokey property panel shown in FIG. 40 is put on the display if this panel has not been displayed. When the Autokey property has been already displayed, the processing unit 2 does not perform any processing. The " Properties" displaying processing performed by the processing unit 2 can be triggered not only by the selection of the item "Properties" by means of the pointing device but also by a keyboard operation. For instance, the "Properties" displaying operation is triggered also when the Ctrl key and an "H" key are simultaneously pressed on the keyboard.

Figure 38:
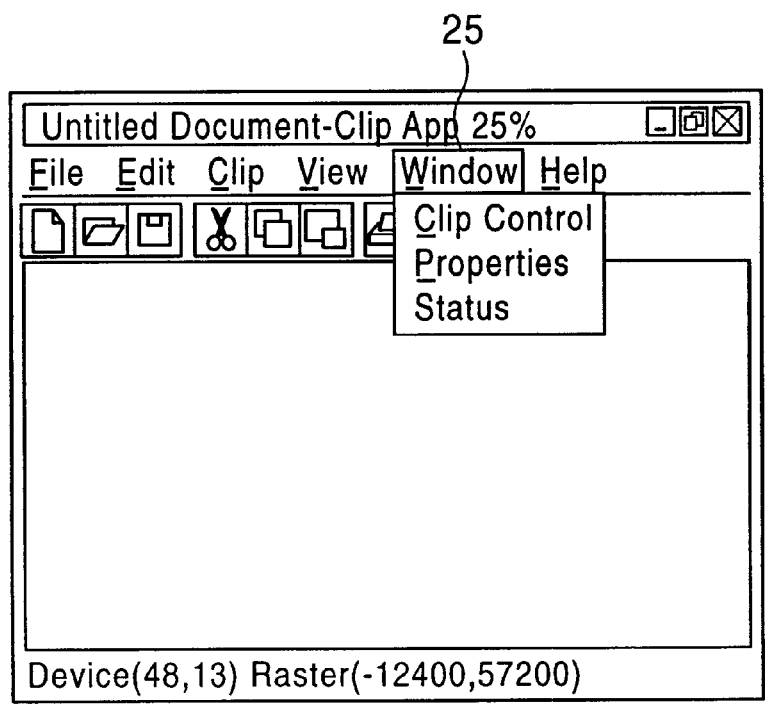
FIG. 38 is an illustration of a window panel in the main panel.

The application program for implementing the display screen shown in FIG. 38 does not have the "Status" function, so that the item "Status" has been invalidated. Thus, the processing unit 2 does not perform any operation even when the item "Status" is selected by the user through the operational input unit 6. The "Status" function is not described in detail because this function does not constitute any critical portion of the present invention.

Figure 41:
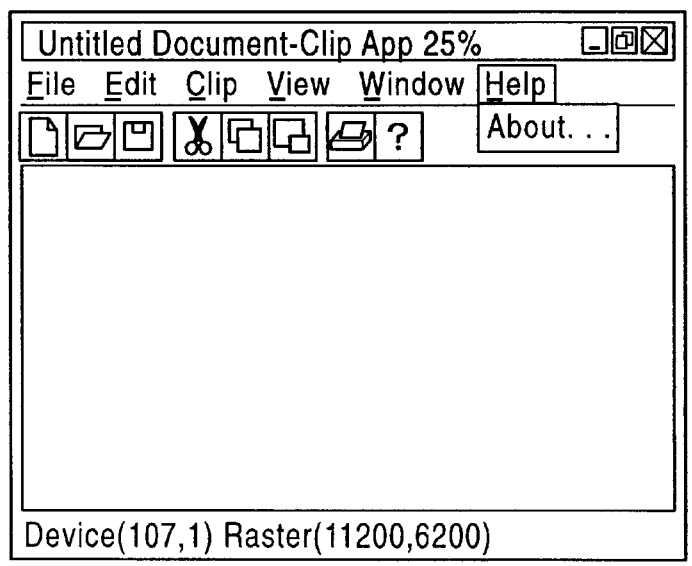
FIG. 41 is an illustration of a help menu in the main panel.

A description will now be given of the help menu 26 in the main panel, with specific reference to FIG. 41.

Figure 42:
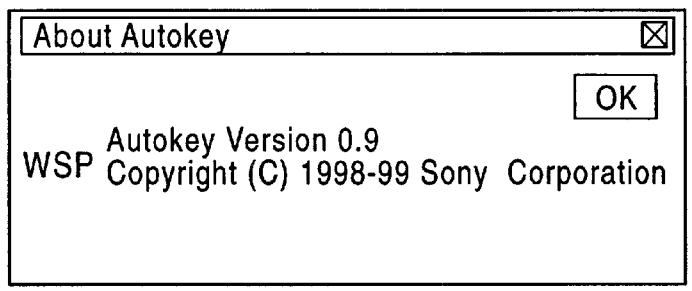
FIG. 42 is an illustration of a help panel.

The help menu 26 has a single item "About" which, when selected by the user through the operational input unit 6, causes a help panel shown in FIG. 42 to be displayed. The help panel displays various kinds of information such as the name of the application software, version No. of the application software, name of the developer, and the name of the copyright holder.

The image display area 36 contained in the main panel displays an input image, a contour curve under an editorial processing, and a key image. Edition of the curve configuration of the contour curve is made possible when the contour curve is selected by the operational input unit 6. A detailed description will be given later in regard to the method of editing the curve configuration.

A description will now be given of a processing which uses a click control panel displayed as a result of the aforesaid clip control panel displaying processing and which is performed by the processing unit 2 in response to an operational input signal generated by the user through the operation of the operational input unit 6.

Figure 39:
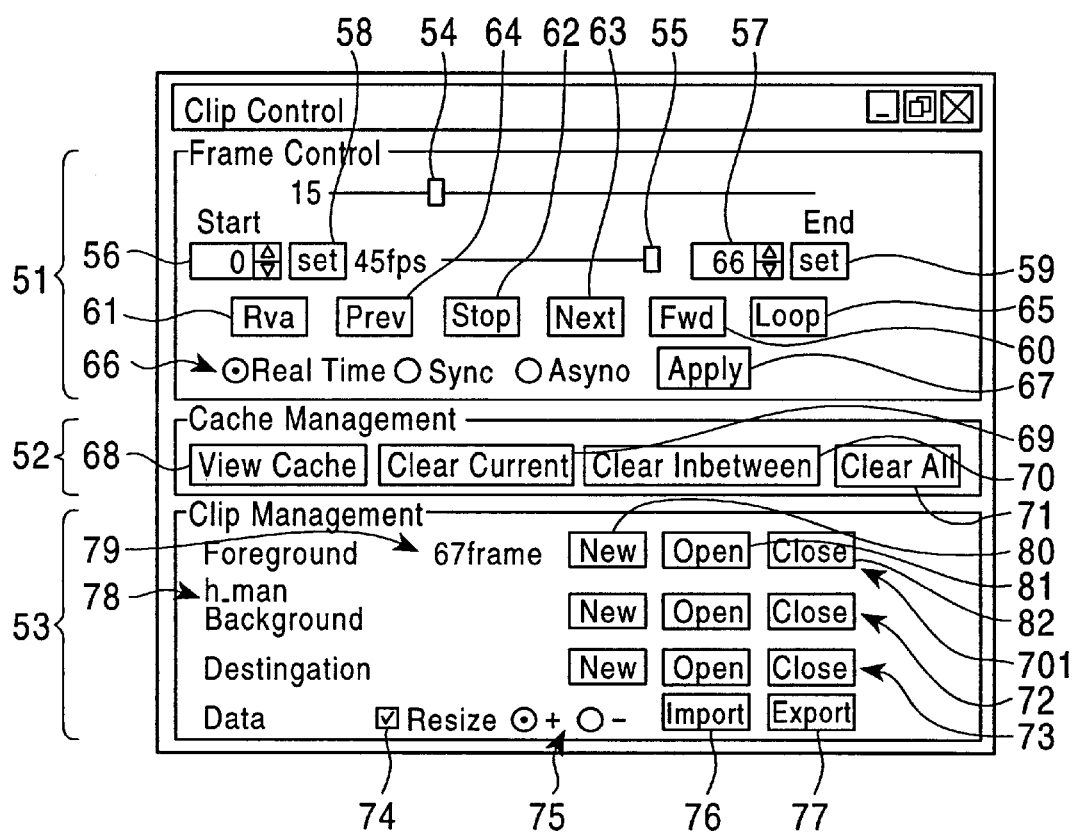
FIG. 39 is an illustration of a clip control panel.

As will be seen from FIG. 39, the click control panel contains a plurality of buttons, sliders, text boxes and so forth.

The area on the clock control panel is divided into three sections: an upper frame operating section 51, an intermediate cache operating section 52, and a lower file operating section 53.

The frame operating section 51 of the click control panel includes the following elements: a frame number setting slider 54, a reproduction rate setting switch 55, a starting frame text box 56, a ending frame text box 57, a starting frame setting button (Start Set) 58, a ending frame setting button (End Set) 59, a forward reproduction button (Fwd) 60, a reverse reproduction button (Rvs) 61, a stop button (Stop) 62, a frame forward-feed button (Next) 63, a frame reverse-feed button (Prev) 64, a loop mode button (Loop) 65, a frame update mode setting radio button 66, and a frame update button (Apply) 67.

The frame number setting slider 54 is displayed to enable changing of the frame on display from one to another. The user selects the frame number setting slider 54 by means of the operational input unit 6 and drags the pointing device while keeping the selection to move the slider to a new position. The user then dismisses the selection at the new position. In response to this operation, the processing unit 2 changes the frame on display to a new frame having the frame number which corresponds to the above-mentioned new position of the slider. At the same time, the processing unit 2 operates so that the frame number of the newly set frame is displayed on the left end of the frame number setting slider 54.

The reproduction rate setting slider 55 is displayed for the purpose of enabling change of the rate of reproduction which will be described later. The user selects the reproduction rate setting slider 54 by means of the operational input unit 6 and drags the pointing device while keeping the selection to move the slider to a new position. The user then dismisses the selection at the new position. In response to this operation, the processing unit 2 changes the reproduction rate to a rate which corresponds to the above-mentioned new position of the slider. The processing unit 2 expresses the reproduction rate in terms of fps (frame per second). The processing unit 2 operates so that the newly set reproduction rate is displayed on the left end of the reproduction rate setting slider 54 in terms of fps.

The starting frame text box 56 and the ending frame text box 57 are intended to show the smallest and greatest frame numbers of a series of frames to be edited and to enable the user to change the frame number. The processing unit 2 recognizes the series of frames between the smallest and greatest frame numbers as the frames which can be set by the above-mentioned frame number setting slider and which are to be subjected to an editorial processing.

The starting frame setting button (Set) 58 and the ending frame setting button (Set) are displayed to enable the user to change the above-mentioned smallest and greatest frame numbers that defines the series of frames to be edited. When the user selects the starting frame setting button 58 or the ending frame setting button 59, the processing unit 2 operates so that the frame which is being processed is set to be a starting frame or a ending frame.

When the user selects the forward reproduction button (Fwd) 60 by means of the operational input unit 6, the processing unit 2 operates so that the above-described forward reproduction mode is executed. Similarly, when the user selects the reverse reproduction button (Rvs) 61 by means of the operational input unit 6, the processing unit 2 operates so that the above-described reverse reproduction mode is executed. When the user selects the stop button (Stop) 62 by means of the operational input unit 6, the processing unit 2 operates to stop the reproduction.

The frame forward-feed button (Next) 63 and the frame reverse-feed button (Prev) 64 are displayed for the purpose of changing the frame to be edited. When the user selects the frame forward-feed button 63 by means of the operational input unit 6, the processing unit 2 increments the frame number of the frame under the processing by one. Likewise, when the user selects the frame reverse-feed button 64 by means of the operational input unit 6, the processing unit 2 decrements the frame number of the frame under the processing by one.

Selection of the loop mode button (Loop) 65 by the user through the operational input unit 6 causes a switching between the two states of the loop mode. Namely, if the loop mode has been in the loop-mode-OFF state, the processing unit 2 changes the state to the loop-mode-ON state, and vice versa. The processing unit 2 operates such that the loop mode button is displayed in a posture pressed down from the normal position, when the loop mode is in the loop-mode-ON state.

The frame update mode setting radio button 66 includes buttons which are used for effecting change-over of the frame update mode over three modes of the Real Time mode, Sync mode and the ASync mode. There are three buttons corresponding to the Real Time mode, Sync mode and the ASync mode, respectively. When the user selects one of these buttons, the frame update mode is changed to the mode corresponding to the selected button.

When the user selects the frame update button 67 by means of the operational input unit 6, if the frame update mode has been set to the ASync mode, the processing unit 2 change the frame under the editorial processing to another frame. More specifically, the selection of the frame update button 67 under the ASync mode causes the processing unit 2 causes the frame which is being processed to move to a position indicated by the frame number corresponding to the position where the frame number setting slider 54 is located at the time of selection of the frame update button. The processing unit 2 does not perform any processing despite the selection of the frame update button 67, unless the frame update mode is the ASync mode.

The following buttons are arranged in the cache operation section 52 of the clip control panel: a cache on/off toggle button (View Cache) 68, a current frame cache clear button (Clear Current) 69, a regional cache clear button (Clear Inbetween) 70, and an all cache clear button (Clear All) 71.

For the purpose of displaying an image in the image display area of the main panel, the processing unit 2 reads the image from the external storage unit 7 on frame basis. The term "cache" means a function in which the data read from the external storage unit 7 is stored in a data memory 4 and, when a request for reading the same data, the data is read from the data memory 4 rather than from the external storage unit 7.

The external storage unit 7 has a large storage capacity but reading data therefrom takes a considerable time, whereas the data memory 4 permits rapid reading of data therefrom, although the storage capacity is limited. Since the data memory 4 is used also for other kinds of editorial processings, it is normally not preferred to store image data in this data memory 4. In addition, if the image data stored in the external storage unit 7 has been updated through an edition, the corresponding image data stored in the data memory 4 also has to be updated. Thus, the use of the cache function is not preferred when an editorial processing is performed. Usually, therefore, the cache function is held in invalid state.

The user, however, may wish to reproduce, while suspending the editorial work, the input image and the processed key image for the purpose of confirmation. In such a case, it is desirable that the cache function is validated to permit high-speed reading of images and smooth continuous reproduction of the same. After the confirmation, the user may re-start the editorial work, while invalidating the cache function to enable the use of the data memory for other editorial processings. It is thus possible to simultaneously achieve both a high-speed and smooth reproduction of images and high efficiency of the editorial processing.

Selection of the cache on/off toggle button 68 by the user by means of the operational input unit 6 causes the processing unit 2 to change-over the state of the cache mode. Namely, if the cache mode has been set to the cache-mode-ON state, the processing unit 2 operates to switch the state of the cache mode to the cache-mode-OFF state, and vice versa. When the cache mode is switched from the cache-mode-ON state to the cache-mode-OFF state, the processing unit 2 deletes all the cache data from the data memory 4, so that the memory area of the data memory 4 can be used for editorial and other processings. The processing unit 2 operates such that, when the cache mode is in the cache-mode-ON state, the button 68 is displayed in a posture pressed down from the normal level.

When the user has selected the current frame cache clear button 69 by means of the operational input unit 6, the processing unit 2 operates so as to delete the cache data corresponding to the current frame. When the user has selected the regional cache clear button 70 by means of the operational input unit 6, the processing unit 2 operates so as to delete the cache data corresponding to a series of frames starting from the frame designated by the starting frame text box 56 down to the frame designated by the ending frame text box 57. When the user has selected the all cache clear button 71 by means of the operational input unit 6, the processing unit 2 operates so as to delete all the cache data. The processing unit 2 thus deletes the cache data to clear memories so that the memories become ready for use for the editing purposes. After finishing the editorial work, the processing unit 2 reads the image data from the external storage unit 7 and stores the same in the data memory 4. Consequently, the cache data is updated if the image read from the external storage unit 7 has been updated.

The clip operating section 53 of the clip control panel includes the following elements: a foreground clip operating portion 710, a background clip operating portion 72, an output clip operating portion 73, a data resize toggle button 74, a data resize change-over button 75, in import button (Import) 76, and an export button (Export) 77. The foreground clip operating portion 710, background clip operating portion 72, and the output clip operating portion 73 respectively correspond to a foreground clip, a background clip and an output clip. Each of these three operating portions has a file name display area 78, a total frame number display area 79, a new clip file button (New) 80, a clip file open button (open) 81, and a clip file close button (Close) 82.

The term "clip" is used to mean an assembly of image files which is constituted by at least one image and which is stored as a file in the external storage unit 7. The foreground clip is a clip which stores data constituting an underdrawing to be used in the generation of a contour curve representing the contour of an object. The background clip is a clip which contains data to be synthesized with the data of the foreground clip by a synthesizing function which will be described later. The output clip is a clip which is used in outputting the key image generated by the processing unit 2.

When the user has set up a clip by operating the new clip file button 80 and the clip file open button 81 by means of the operational input unit 6, the processing unit 2 operates so that the file name of the clip is displayed in the file name display area 78. When no clip has been set up, the processing unit 2 does not execute the processing for displaying a file name.

When the user has set up a clip by operating the new clip file button 80 and the clip file open button 81 by means of the operational input unit 6, the processing unit 2 operates so that the total number of the frames contained in the clip is displayed in the total frame number display area 79. If no clip has been set up, the processing unit 2 does not execute the processing for displaying the total frame number.

When the user has selected the new clip file button 80 by means of the operational input unit 6, the processing unit 2 operates so that a panel (not shown) for allowing designation of a file is displayed. The user can designate a file name and a number of frames on this panel, by means of the operational input unit 6. In response to this operation, the processing unit 2 forms a new clip file and sets this clip file as a foreground clip, a background clip or an output clip.

When the user has selected the clip file open button 81 by means of the operational input unit 6, the processing unit 2 operates so that a panel (not shown) for enabling designation of a file is displayed. The user designates one of the files on the panel by means of the operational input unit 6. The processing unit 2 then sets the designated existing clip file as a foreground clip, background clip or an output clock.

When the user has selected the clip file close button 82 by means of the operational input unit 6, the processing unit 2 dismisses the designation of the clip which has been set as a foreground clip, background clip or an output clock.

In the initial state immediately after the start up of the program, or when the user has selected the clip file close button 82 by means of the operational input unit 6, the processing unit 2 does not designate any clip file as being a foreground clip, background clip or an output clock. In this state, the processing unit 2 operates based on a recognition that the foreground clip and the background clip contain image data of the same color. When the output clip has not been designated, the processing unit 2 does not deliver the key image to any of possible destinations.

When the user has designated any one of the data size toggle button 74, data resize change-over button 75, import button 78 and the export button 77 by means of the operational input unit 6, the processing unit 2 does not perform any processing because the application program implementing the display screen shown in FIG. 39 does not have functions corresponding to these buttons. These functions are not described in detail because they do not constitute any critical portion of the present invention.

A description will now be given of the AutoKey property panel shown in FIG. 40.

The AutoKey property panel is composed of a plurality of pages. Each page contains a plurality of pages. A plurality of buttons, sliders and text boxes are arranged on each page.

More specifically, the AutoKey property panel is composed of a general page (General), editorial page (Edit), tracker page (Tracker), color page (Color) and a test page (Test). Each of these five pages has a tag. The user can point one of these five tags by means of the operational input unit 6 so that the processing unit 2 operates such that the page corresponding to the pointed tag is displayed on the display screen shown in FIG. 40. It is to be understood, however, if the tag pointed by the user is the tag of the page which is now on display, the processing unit 2 does not perform any operation for changing the page on display.

The general page of the AutoKey property panel includes the following elements: an interaction toggle button (Interaction) 91, a new contour curve generating button (Create Chunk) button 92, a contour curve delete button (Delete Chunk) 93, a master frame check box 94, a contour curve synthesizing mode change-over toggle switch 95, a key-output inversion toggle switch 96, a rendering mode change-over switch 97, a key width adjusting slider 98, a key-width adjusting text box 99, a key-offset adjusting slider 100, and a key-offset adjusting text box 101.

Selection of the interaction toggle button 91 by the user by means of the operational input unit 6 causes the processing unit 2 to change-over the state of the interaction mode. Namely, if the interaction mode has been set to the OFF state, the processing unit 2 operates to switch the state of the interaction mode to the ON state, and vice versa. The processing unit 2 operates such that, when the interaction mode is in the ON state, the button 68 is displayed in a posture pressed down from the normal level.

Selection of the new contour curve generation button 92 by the user by means of the operational input unit 6 causes the processing unit 2 to operate such that a new contour curve is generated on the display screen.

Selection of the contour curve delete button 93 by the user by means of the operational input unit 6 causes the processing unit 2 to operate such that any selected contour curve is deleted.

When the user selects the master frame check box 94 by means of the operational input unit 6, if only one contour curve has been selected and if the master frame mode of the sole selected contour curve in the present frame is in the master frame state, the processing unit 2 operates to switch the master frame mode of the contour curve to the non-master frame state. Conversely, if the master frame mode of the sole selected contour curve in the present frame is in the non-master frame state, the processing unit 2 operates to switch the master frame mode of the contour curve to the master frame state. When no contour curve or two or more contour curves have been selected, the processing unit 2 does not conduct the above-described processing. When only one contour curve has been selected and the master frame mode of the sole selected contour curve in the present frame is in the master frame state, the processing unit 2 displays the master frame check box 94 filled with a check mark. Otherwise, the master frame check box 94 is displayed without being filled with a check mark.

When the user selects by means of the operational input unit 6 either one of the AllOR mode and AllAND mode of the contour curve synthesizing mode change-over toggle switch 95, the processing unit 2 changes the contour curve synthesizing mode into the mode corresponding to the selected mode.

When the user selects the key output inversion toggle switch 96 by means of the operational input unit 6, if only one contour curve has been selected and if the reverse mode of the sole contour curve is in the normal state, the processing unit 2 operates to switch the reverse mode of the contour curve to the reverse state. If the reverse mode of the sole selected contour curve has been set to the reverse state, the processing unit changes this mode to the normal state. If two ore more contour curves have been selected, the processing unit 2 does not perform the described processing.

If only one contour curve has been selected and if the frame containing the selected sole contour curve is in the master frame state, the processing unit 2 causes the key output inversion toggle switch 96 with a check mark, otherwise the switch 96 is displayed without any check mark.

As stated before, the rendering mode change-over switch enables the rendering mode over three states of OFF (Input Through), Key Output and Composite Output. Selection of one of these three states by the user causes the processing unit 2 to set the rendering mode to the selected state.

When the user has designated any one of the key width adjusting slider 98, key width text box 99, key offset adjusting slider 100 and the key offset adjusting text box 101 by means of the operational input unit 6, the processing unit 2 does not perform any processing because the application program implementing the display screen shown in FIG. 40 does not have functions corresponding to these buttons. These functions are not described in detail because they do not constitute any critical portion of the present invention.

Figure 43:
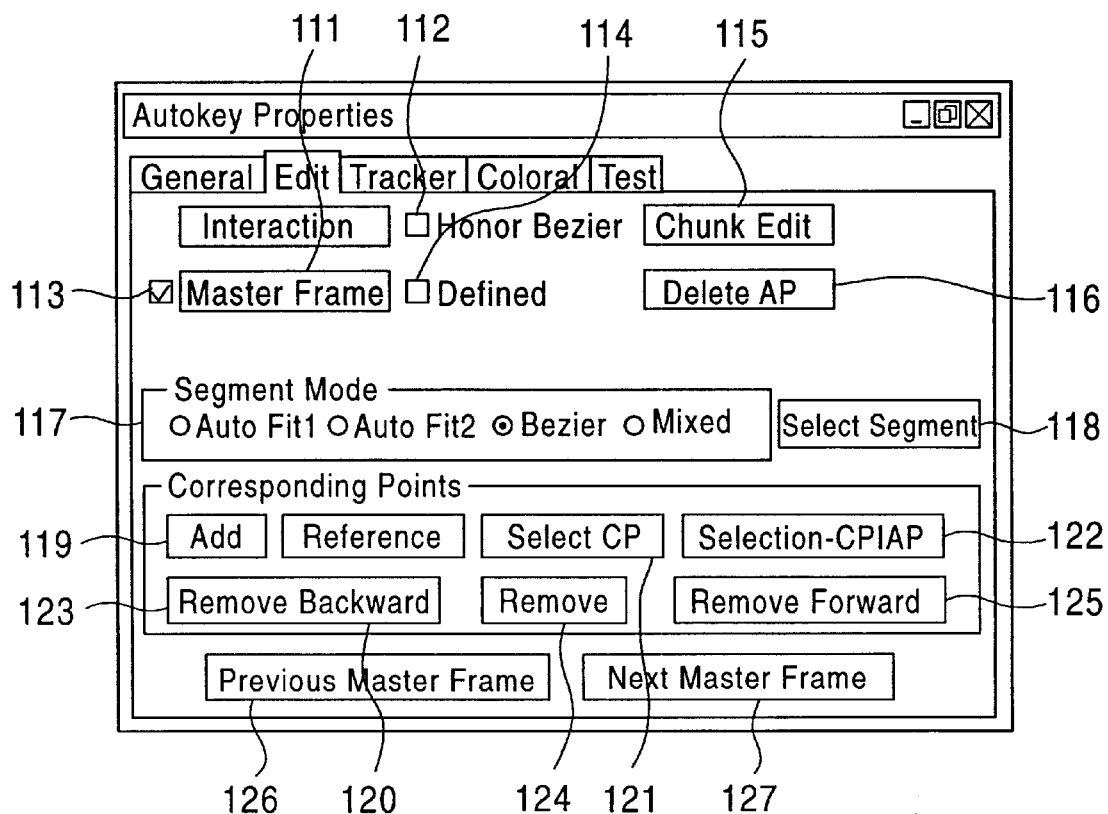
FIG. 43 is an illustration of an edited page of the AutoKey property panel.

As will be seen from FIG. 43, the editorial page of the AutoKey property panel contains the following elements: an interaction toggle button (Interaction) 111, a Bezier preference toggle switch 112, a master frame check box 113, a Defined check box 114, a contour curve edition button (Chunk Edit) 115, an end point (AP) delete button (Delete AP) 116, a segment mode change-over toggle switch 117, a segment selection button (Select segment) 118, an associate point addition button (Add) 119, a reference panel display button (Reference) 120, an associate point (CP) select button (Select CP) 121, a non-associate point select button (Select (non-CP) AP) 122, a backward-associate-point remove button (Remove Backward) 123, an associate point remove button (Remove) 124, a forward-associate-point remove button (Remove Forward) 125, a move-to-previous-master-frame button (Previous Master Frame) 126, and a move-to-next-master-frame button (Next Master Frame) 127.

When the user selects the interaction toggle button 111 by means of the operational input unit 6, the processing unit 2 switches the state of the interaction mode from one to the other. More specifically, if the interaction mode has been in the OFF state, the processing unit 2 changes this state to ON state, and vice versa. When the interaction mode is in the ON state, the processing unit 2 operates so that the interaction toggle button is displayed in a posture pressed down from the normal position.

When the user selects the Bezier preference toggle button 112 by means of the operational input unit 6, the processing unit 2 switches the state of the Bezier preference mode from one to the other. More specifically, if the Bezier preference mode has been in the OFF state, the processing unit 2 switches the Bezier preference mode to ON state, and vice versa. When the Bezier preference mode is in the ON state, the processing unit 2 operates so that the Bezier preference toggle button is displayed in a posture pressed down from the normal position.

When the user selects the master frame check box 113 by means of the operational input unit 6, if only one contour curve has been selected and if the master mode of the sole selected contour curve in the present frame is in the master frame state, the processing unit 2 operates to change the state of the master frame mode of he contour curve to the non-master frame state. Conversely, if the master mode of the sole selected contour curve in the present frame is in the non-master frame state, the processing unit 2 operates to change the state of the master frame mode of the contour curve to the master frame state. When no contour curve or two or more contour curves have been selected, the processing unit 2 does not conduct the above-described processing. When only one contour curve has been selected and the master frame mode of the sole selected contour curve in the present frame is in the master frame state, the processing unit 2 displays the master frame check box 113 filled with a check mark. Otherwise, the master frame check box 113 is displayed without being filled with a check mark.

The function concerning the Defined check box 114 is not loaded on the application program for implementing the display screen shown in FIG. 43. Therefore, no processing is performed by the processing unit 2 even when the Defined check box 114 is selected by the user through the operational input unit 6. This function is not described in detail because it does not constitute any critical portion of the present invention.

The function concerning the contour curve edition button 116 is not loaded on the application program for implementing the display screen shown in FIG. 43. Therefore, no processing is performed by the processing unit 2 even when the contour curve edition button 116 is selected by the user through the operational input unit 6. This function is not described in detail because it does not constitute any critical portion of the present invention.

Selection of the end point delete button 116 by the user through the operational input unit 6 causes the processing unit to delete all the selected end points. Consequently, two segments adjoining each other across a selected end point are consolidated into one segment.

The function concerning the segment mode change-over toggle switch 117 is not loaded on the application program for implementing the display screen shown in FIG. 43. Therefore, no processing is performed by the processing unit 2 even when the segment mode change-over toggle switch 117 is selected by the user through the operational input unit 6. This function is not described in detail because it does not constitute any critical portion of the present invention.

When the user selects the segment select button 118 through the operational input unit 6, the processing unit 2 selects all the segments.

The function concerning the associate point addition button 119 is not loaded on the application program for implementing the display screen shown in FIG. 43. Therefore, no processing is performed by the processing unit 2 even when the associate point addition button 119 is selected by the user through the operational input unit 6. This function is not described in detail because it does not constitute any critical portion of the present invention.

Selection of the reference panel display button 120 by the user through the operational input unit 6 causes the processing unit 2 to operate such that the reference panel is put on the display if this panel has not been displayed. At the same time, the processing unit 2 causes the reference panel to display the frame at the moment of input of the operational input signal by which the reference panel display button 120 has been selected.

Selection of the associate point select button 121 by the user through the operational input unit 6 causes the processing unit 2 to select all the associate points.

Selection of the non-associate point select button 122 by the user through the operational input unit 6 causes the processing unit 2 to select all the end points that are not the associate points.

The function concerning the backward-associate-point remove button 123 is not loaded on the application program for implementing the display screen shown in FIG. 43. Therefore, no processing is performed by the processing unit 2 even when the backward-associate-point remove button 123 is selected by the user through the operational input unit 6. This function is not described in detail because it does not constitute any critical portion of the present invention.

When the user selects the associate point remove button 124 through the operational input unit 6, the processing unit 2 operates so that, when selected end points include end points that are associate points, the associate point mode such end points is changed to non-associate point state. Thus, the operational processing unit 2 removes the selected associate points.

The function concerning the forward-associate-point remove button 125 is not loaded on the application program for implementing the display screen shown in FIG. 43. Therefore, no processing is performed by the processing unit 2 even when the forward-associate-point remove button 125 is selected by the user through the operational input unit 6. This function is not described in detail because it does not constitute any critical portion of the present invention.

Selection of the move-to-previous-master-frame button 126 by the user by means of the operational input unit 6 causes the processing unit 2 so that the frame is moved to the master frame which immediately precedes the selected contour curve. The processing unit 2 does not perform any operation when the present frame is the first master frame so that there is no previous frame. When there are a plurality of selected contour curves preceded by the respective master frames, the processing unit 2 operates so as to move the present frame to one of these preceding master frames which is closest to the present frame. Obviously, the processing unit 2 does not execute the above-described operation when no contour curve has been selected.

Selection of the move-to-next-master-frame button 127 by the user by means of the operational input unit 6 causes the processing unit 2 so that the frame is moved to the master frame which immediately follows the selected contour curve. The processing unit 2 does not perform any operation when the present frame is the last master frame so that there is no following frame. When there are a plurality of selected contour curves followed by the respective master frames, the processing unit 2 operates so as to move the present frame to one of these following master frames which is closest to the present frame. Obviously, the processing unit 2 does not execute the above-described operation when no contour curve has been selected.

Figure 44:
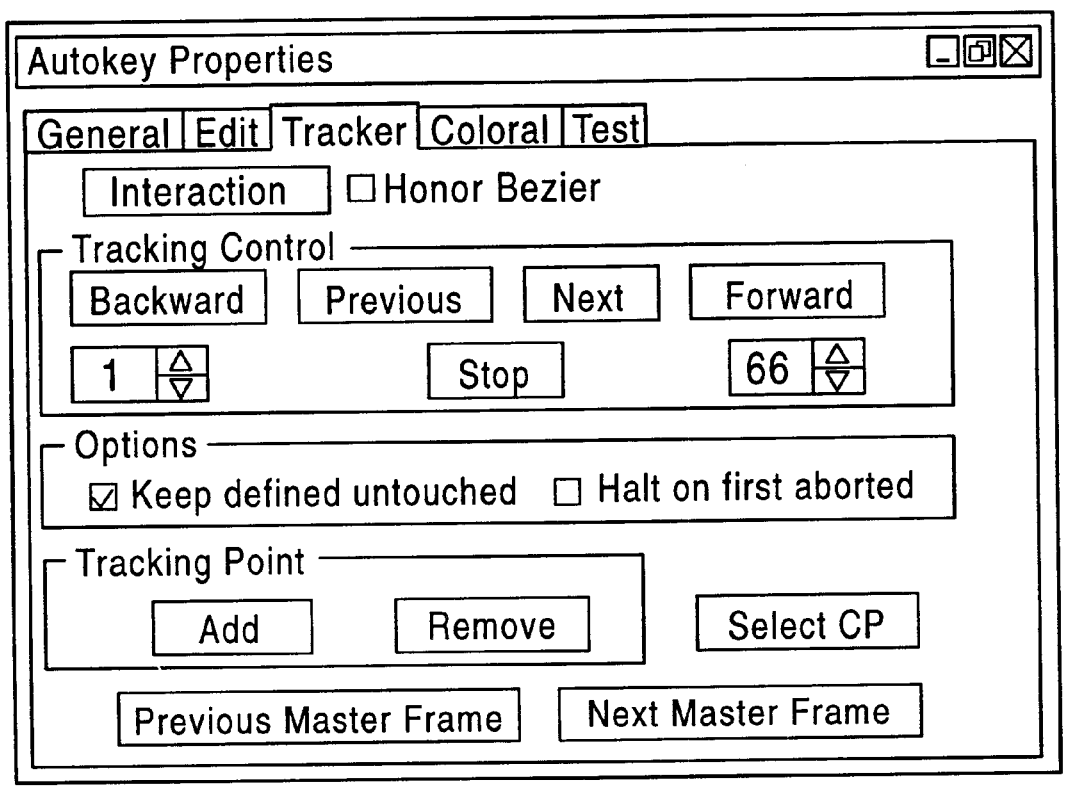
FIG. 44 is an illustration of a tracker page of the AutoKey property panel.

The tracker page of the AutoKey property panel includes various buttons as shown in FIG. 44. The functions of these buttons have not yet been loaded on the application program for implementing the display screen shown in FIG. 44. Therefore, no processing is performed by the processing unit 2 even when any of these buttons is selected by the user through the operational input unit 6. These functions are not described in detail because they not constitute any critical portion of the present invention.

Figure 45:
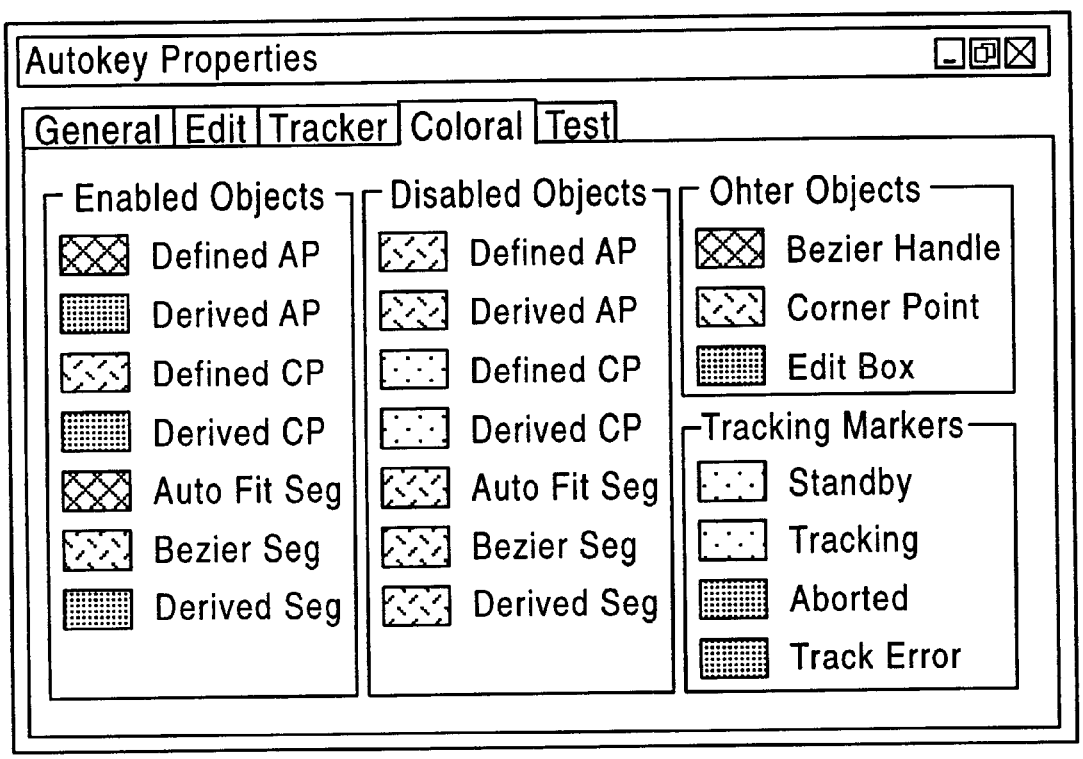
FIG. 45 is an illustration of a color page of the AutoKey property panel.

The color page of the AutoKey property panel includes various buttons as shown in FIG. 45. The functions of these buttons have not yet been loaded on the application program for implementing the display screen shown in FIG. 45. Therefore, no processing is performed by the processing unit 2 even when any of these buttons is selected by the user through the operational input unit 6. These functions are not described in detail because they not constitute any critical portion of the present invention.

Figure 46:
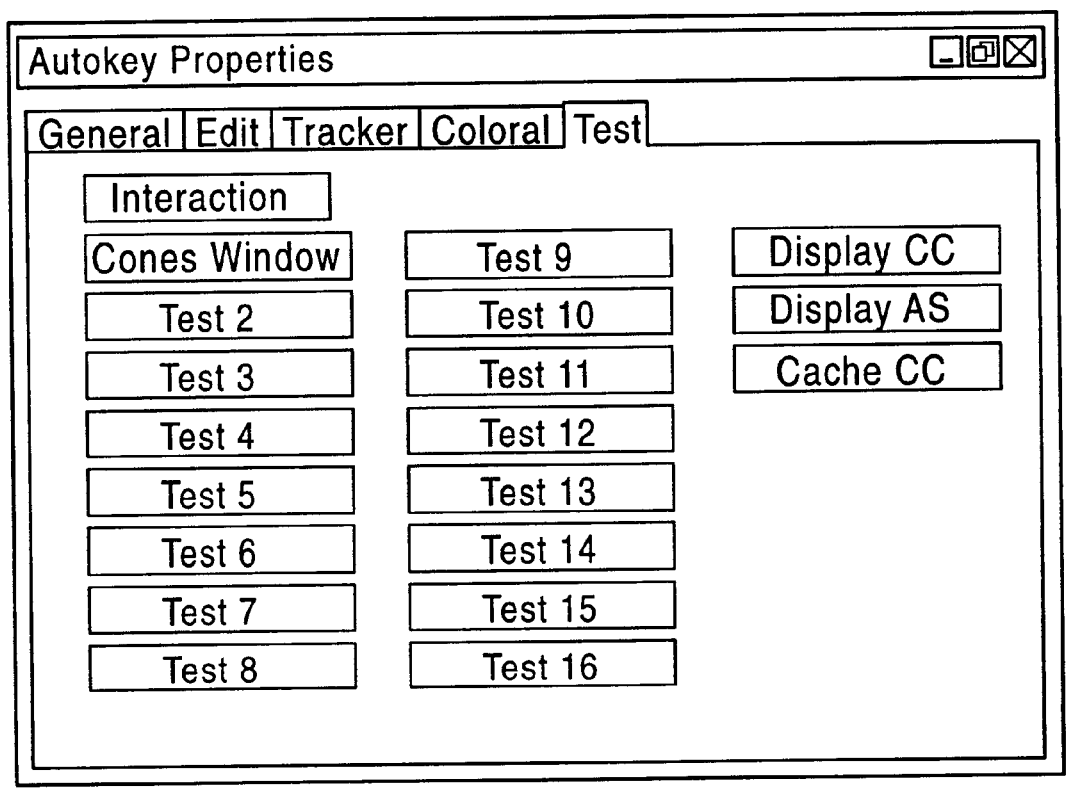
FIG. 46 is an illustration of a test page of the AutoKey property panel.

The test page of the AutoKey property panel includes various buttons as shown in FIG. 46. The functions of these buttons have not yet been loaded on the application program for implementing the display screen shown in FIG. 46. Therefore, no processing is performed by the processing unit 2 even when any of these buttons is selected by the user through the operational input unit 6. These functions are not described in detail because they not constitute any critical portion of the present invention.

Figure 47A:
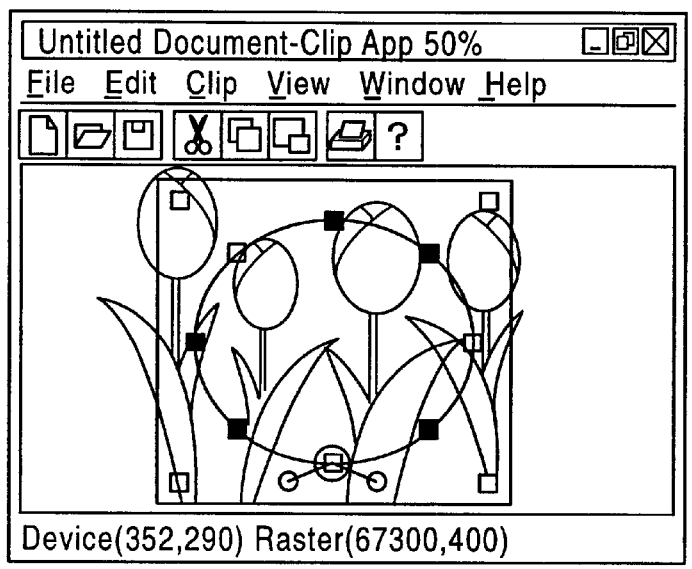
FIG. 47A is an illustration of a main panel in which an image display area displays not only an image but also contour curves.

As will be seen from FIG. 47A. When each frame has a contour curve 141, the processing unit 2 operates such that the display area 36 of the main panel 36 displays not only an image but also the contour curve 141. More specifically, segments 142 are displayed in the forms of curves, and end points 143a that do not constitute any associate points are indicated by small black (solid) squares. End points 143b that constitute associate points are indicated by white (blank) squares, while control points 144 are indicated by circles. The processing unit 2 operates such that an end point 143 that has been selected is encircled by a circle. Similarly, a segment that has been selected is indicated by a thickened curve. The small circles indicating the control points 144 are connected to an end point by straight lines. Resize boxes 145 in the form of small squares painted in different colors are displayed around the contour curves. Further, a bounding box 146 in the form of a large blank square is displayed to surround the resize boxes 145 such that the resize boxes 145 are arranged at four corners of the bounding box 146.

A description will now be given of the processing for editing the above-described contour curve in accordance with operational input signals given through the operational input unit 6.

The description will begin with the operation performed on the operational input unit 6 by the user. When a pointing device such as a mouse is used as the operational input unit 6, the user can perform the following operations: clicking on each end point, clicking of each end point while pressing a shift key on the keyboard, clicking on each segment, clicking on each segment while pressing the shift key, range designation, range designation while pressing the shift key, dragging of each end point, dragging on each end point while pressing the shift key, dragging of each control point, dragging of each control point while pressing the segment, clicking on each segment while pressing a control key on the keyboard, dragging of each segment, dragging of each segment while pressing the shift key, dragging of each resize box, and clicking on portions other than the end points and segments.

When the user clicks on an end point by means of a pointing device such as a mouse used as the operational input unit 6, an operational input signal is generated to cause the processing unit 2 to set the pointed end point to a selected state, while setting other end points and all segments to non-selected state.

Clicking on an end point with simultaneous pressing of the shift key causes the processing unit 2 to invert the selected state of the pointed end point, without changing the states of other end points and all segments.

When the user clicks on a segment, the processing unit 2 operates to set the pointed segment to a selected state, while setting other segments and all end points to non-selected state.

Clicking on a segment with simultaneous pressing of the shift key causes the processing unit 2 to invert the selected state of the pointed segment, without changing the states of other segments and all end points.

Designation of a range is effected within the bounding box by clicking on a point in a area other than the end points, segments and resize boxes, dragging the pointer and then releasing the click. Consequently, a rectangular range is defined by a diagonal line which interconnects the point at which the clicking was made and the point at which the click was released. In response to this operation, the processing unit 2 sets all the end points falling within the area of this rectangle and segments which are at least partially contained in this rectangle to the selected state, while setting all other end points and segments to the non-selected state.

When the range designating operation is performed with simultaneous pressing of the shift key, i.e., when the clicking on a point in an area other than the end points, segments and resize boxes, dragging and releasing of the click are performed while the shift key is kept pressed, the processing unit 2 inverts the selected states of all the end points falling within the area of this rectangle and segments which are at least partially contained in the rectangle defined by the diagonal line interconnecting the clicking and releasing points, without changing the states of all other end points and segments to the non-selected state.

When the user drags the pointer after clicking on an end point, the processing unit 2 operates to set the pointed end point to a selected state, while setting other end points and all segments to non-selected state. At the same time, the processing unit 2 causes the selected end point to move by an amount corresponding to the amount of the drag.

Dragging the pointer after clicking on an end point with simultaneous pressing of the shift key causes the processing unit 2 to invert the selected state of the pointed end point, without changing the states of other end points and all segments. Consequently, the pointed end point, which still is in the selected state, is moved by an amount corresponding to the amount of the drag.

When the user drags the pointer after clicking on a control point, the processing unit 2 operates to set all the end points and segments to the non-selected state, and causes the pointed control point to move a distance corresponding to the amount of the drag.

Dragging the pointer after clicking on a control point with simultaneous pressing of the shift key causes the processing unit 2 to move the pointed control point by a distance corresponding to the amount of the drag, without changing the states of all the end points and segments.

When the user clicks on a segment while pressing the control key, the processing unit 2 divides the segment into two segments at the pointed point, while generating an end point at the position of the above-mentioned point.

When the user drags the pointer after clicking on a segment, the processing unit 2 operates to set the pointed segment to a selected state, while setting other segments and all end points to non-selected state. At the same time, the processing unit 2 causes the selected segment to move by an amount corresponding to the amount of the drag.

Dragging the pointer after clicking on a segment with simultaneous pressing of the shift key causes the processing unit 2 to invert the selected state of the pointed segment, without changing the states of other segments and all end points. At the same time, the pointed segment is moved by an amount corresponding to the amount of the drag.

When the user drags the pointer after clocking on a resize box, the processing unit 2 operates so as to cause the overall size of the contour curve to increase or decrease, by an amount corresponding to the amount of the drag. More specifically, the processing unit 2 decompose the amount of the drag into an x-direction component and a y-direction component, so that the changes of the size in the x-direction and y-direction can be effected independently of each other.

When the user has clicked on a point other than the end points and segments, the operational input unit 2 sets all the end points and the segments into the non-selected state.

A description will now be given of the reference panel which is implemented by the application program executed by the processing unit 2.

Figure 48:
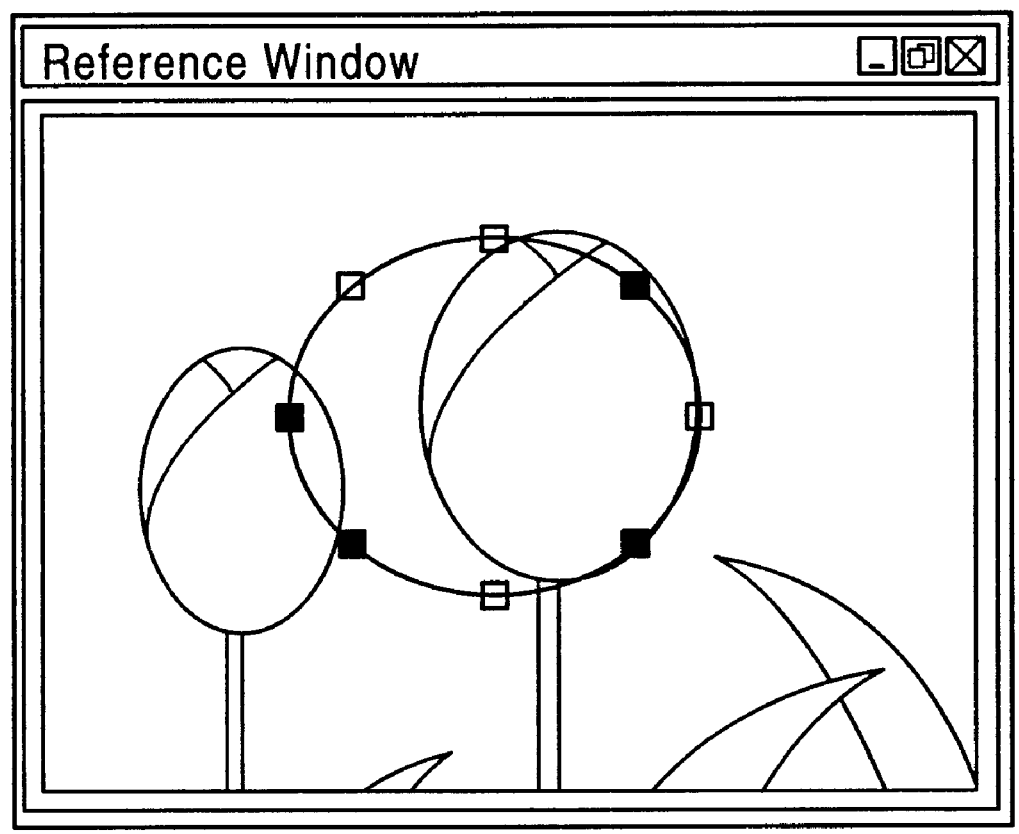
FIG. 48 is an illustration of a reference panel.

The user points the aforementioned reference panel display button 120 on the editorial page of the AutoKey property panel. In response to this operation, the processing unit 2 operates so that the contents, which are the same as those in the image display area 36 of the main panel of the frame number accessed when the button 120 is pressed, are displayed on a panel which is shown in FIG. 48 and which is different from the above-mentioned main panel.

When the reference panel is on the display, the processing unit 2 is allowed only to perform the processing for selecting an end point.

When an end point on the contour curve displayed on the reference panel is selected by the user, the processing unit 2 operates so that an immediately preceding or following master frame of the above-mentioned contour curve is displayed on the main panel. The user then selects an end point on the immediately preceding or following master frame. In response to this operation, the processing unit 2 sets up an association between these two points. This operation for setting up the association between the two points essentially requires that the frames containing these points are different master frames and that there is no other master frame intervening therebetween.

In the above-described associating operation, the user may select a segment on the main panel while pressing the control key, instead of pointing an end point. In such a case, the segment is divided at the position of the designated point into two segments at the designated point on the segment, and the designated point is set to be an end point. In such a case, the association is established between this newly set end point and the point designated on the contour curve displayed on the display panel.

When the user has selected an end point on the contour curve displayed on the reference panel, the processing unit 2 operates such that end points which are candidates of the associate point on the main panel to be associated with the selected end point on the contour curve displayed on the reference panel are indicated by a specific color, e.g., pink color, other than the color of other end points. Similarly, a segment, which is presumed to provide a dividing end point as a new end point to be associated with the selected end point on the reference panel, is displayed in the above-mentioned specific color. All other end points and segments are displayed in a color, e.g., gray color. Thus, the user can recognize that the end points and segments displayed in the specific color contain a candidate associate point which is to be associated with the end point selected on the reference panel. At the same time, the user recognizes that a subsequent clicking operation is to set an associate point to be associated with the end point selected on the reference panel.

The processing unit 2 terminates and cancels the associate point setting processing whenever the user has clicked, after clicking on an end point on the reference panel, on a point in the reference panel other than end points or on a point in the main panel other than the end points and segments.

The above-described process for setting associate points is implemented by the application program executed by the processing unit 2. This process will be described with reference to FIG. 49 which shows a flowchart illustrative of this process.

Figure 49:
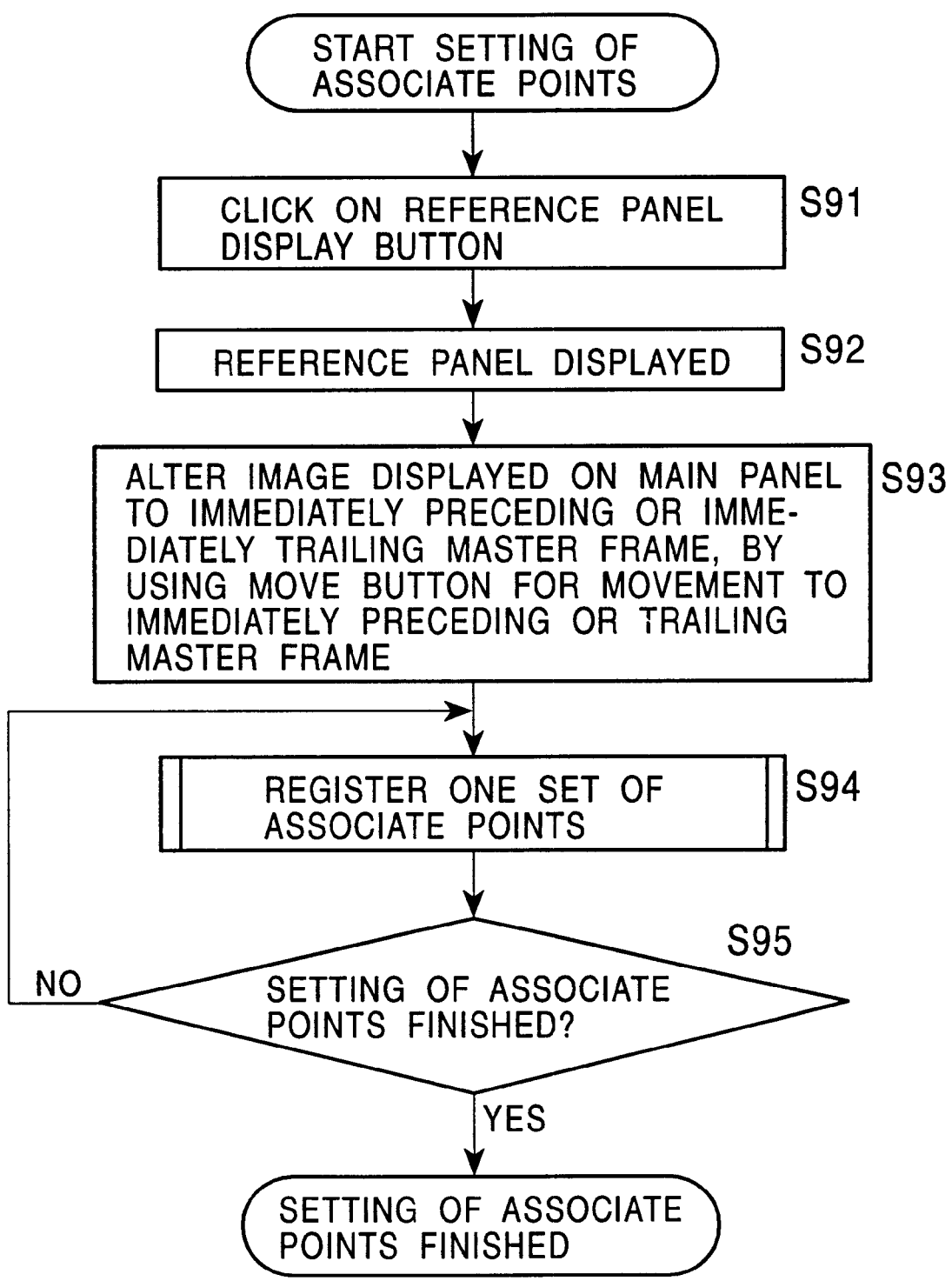
FIG. 49 is a flowchart illustrative of a process performed by a processing unit for setting associate points.

Referring to FIG. 49, in Step S91, the processing unit 2 receives an operational input signal which is generated when the user selects the reference panel display button 120 for displaying the reference panel shown in FIG. 48.

In Step S92, when the reference panel has not yet been displayed, the processing unit 2 operates in response to the above-mentioned operational input signal so that the reference panel of FIG. 48 is put on display. At the same time, the processing unit 2 operates so that the reference panel displays the frame which was on display at the moment at which the operational input signal indicative of the selection of the reference panel display button 120 was received.

Figure 47B:
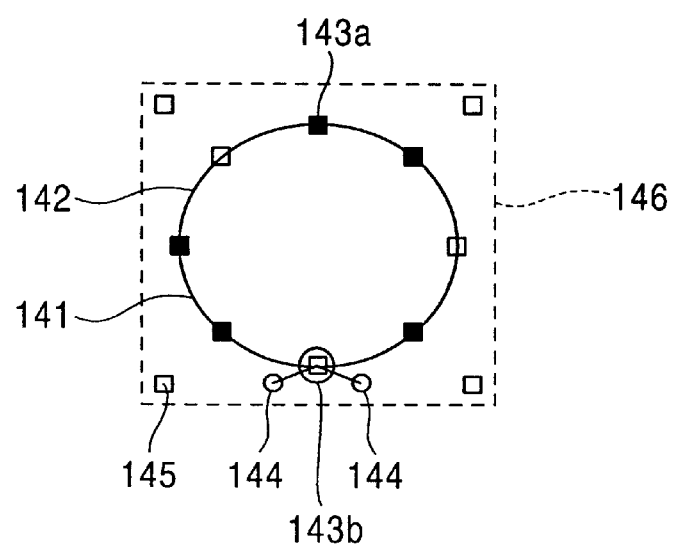
FIG. 47B is an illustration of segments, end points which are not associate points and end points which are associate pints, as displayed on the main panel.

In Step S93, the processing unit 2 operates in response to a selection by the user of either the move-to-previous-master-frame button 126 or the move-to-next-master-frame button 127 shown in FIG. 43, so as to change the frame displayed on the main panel of FIG. 47 to the immediately preceding or immediately following master frame.

Consequently, the processing unit 2 causes the reference panel to display an image which is the object to be processed while causing the main panel to display a master frame which immediately precedes or follows the frame displayed on the reference panel.

Figure 50:
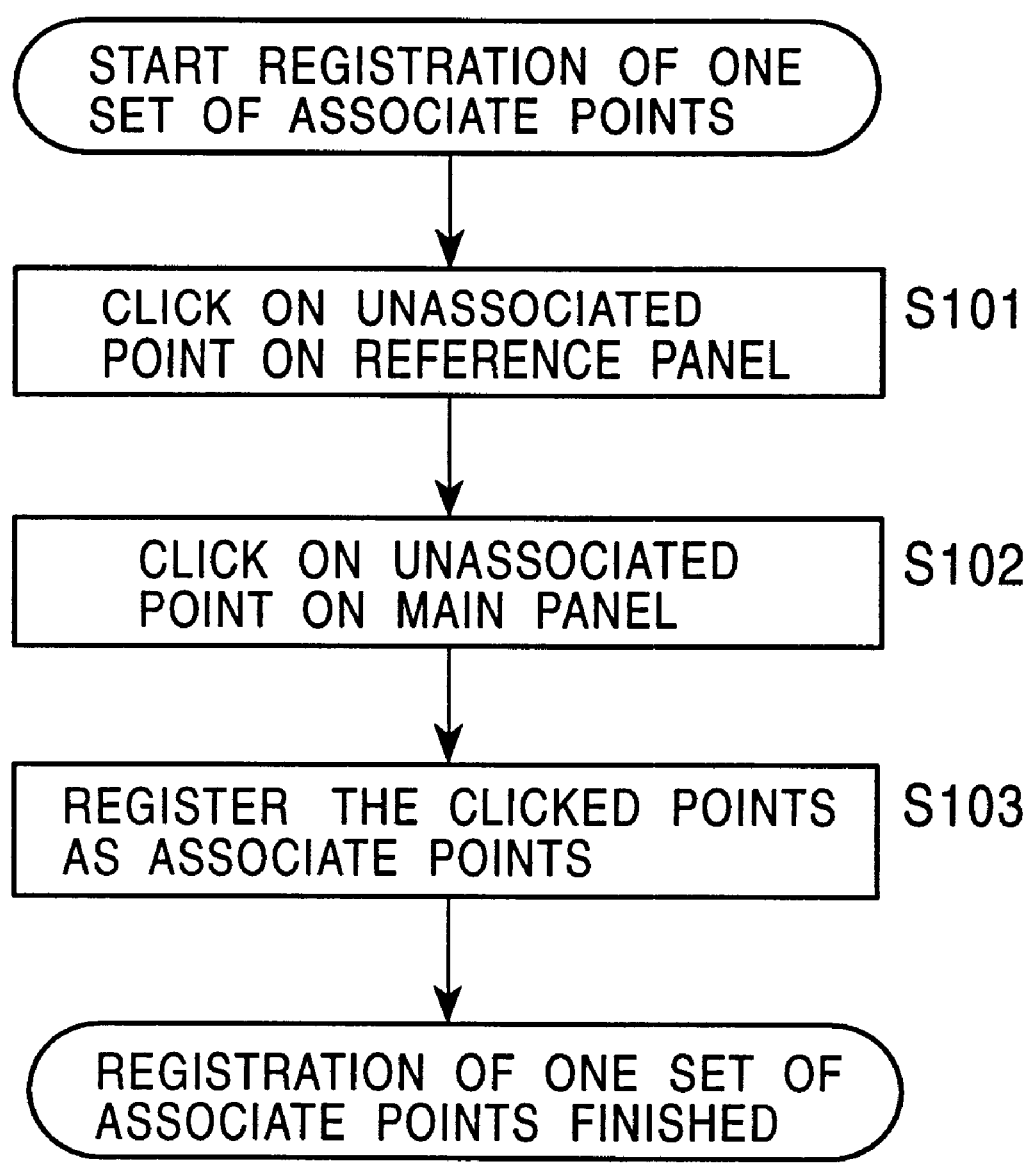
FIG. 50 is a flowchart illustrative of a process performed by a processing unit for registering the associate points.
Figure 51:
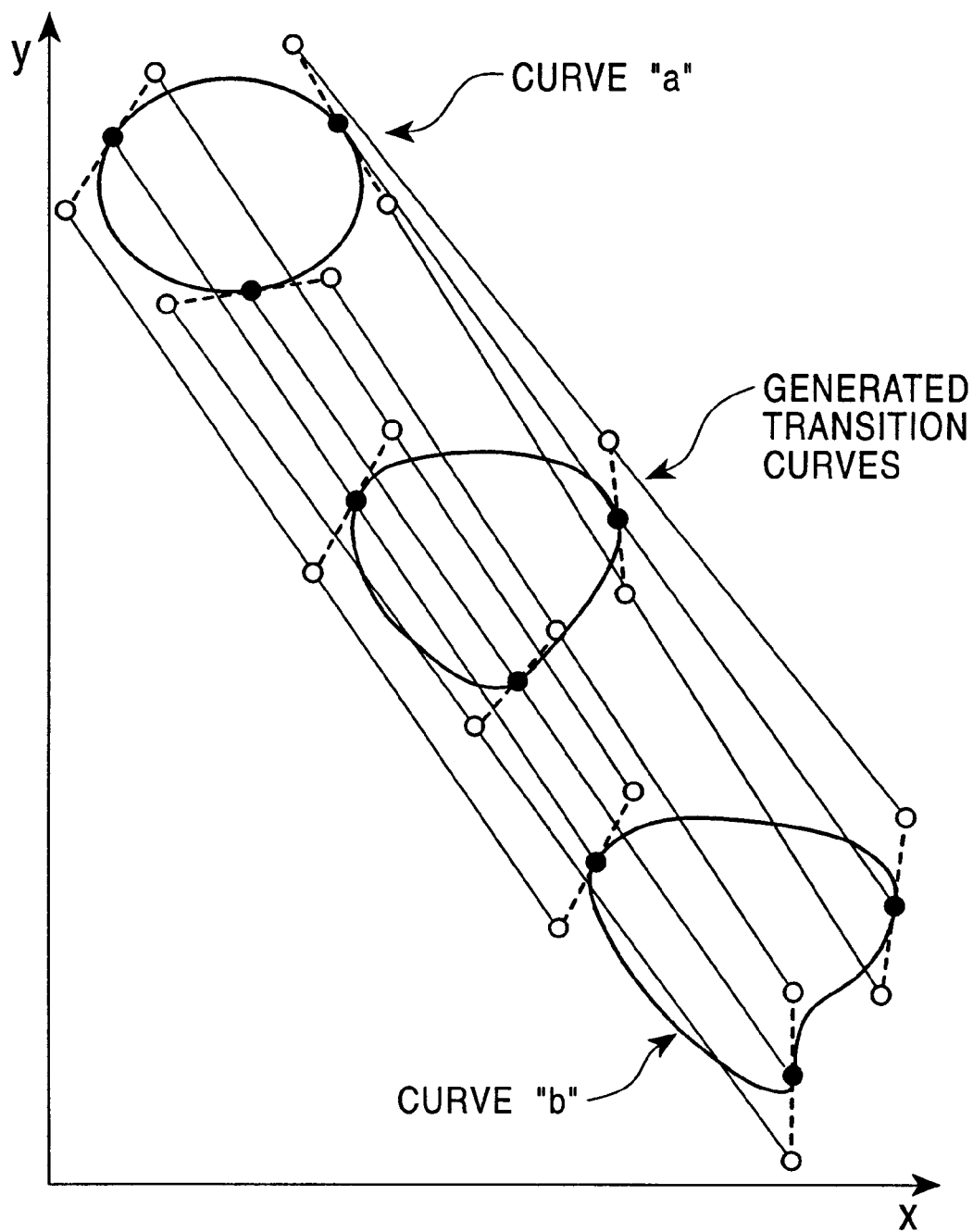
FIG. 51 is n illustration of a concept of generation of a transient curve generated through an interpolation based on a starting frame and an ending frame.
Figure 52:
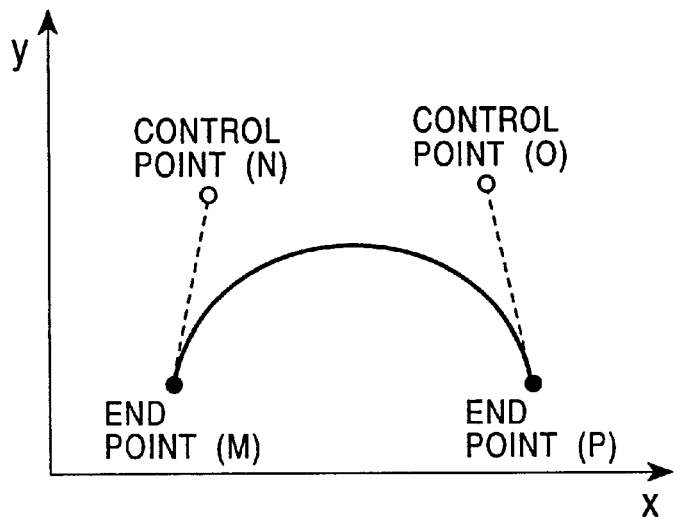
FIG. 52 is an illustration of a third-order Bezier curve lines.
Figure 53:
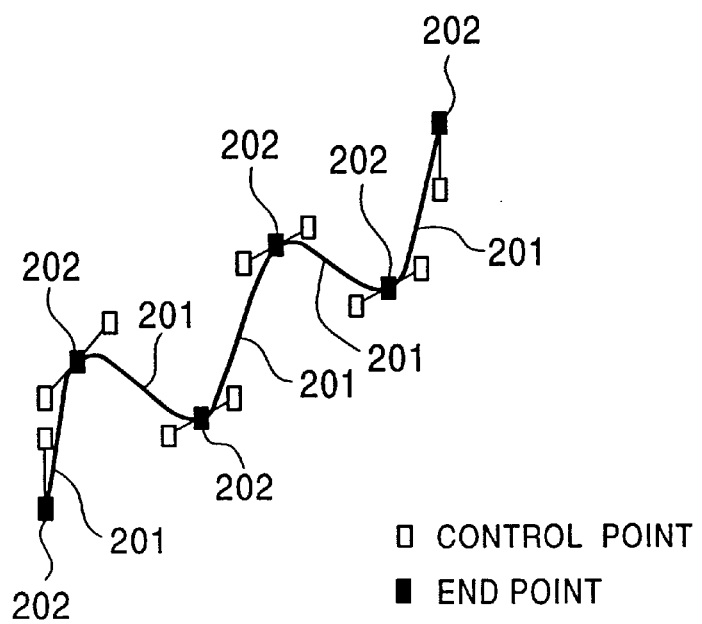
FIG. 53 is an illustration of a plurality of segments constituting a curve.
Figure 54A:
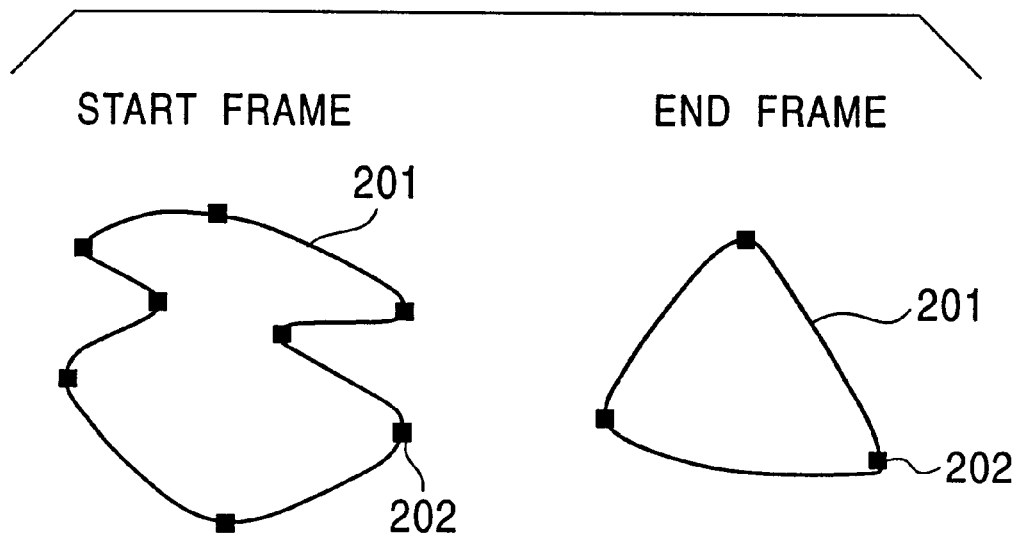
FIGS. 54A and 54B are illustrations of a conventional technique for generating a transient curve, explanatory of the fact that a starting frame and an ending frame must have an equal number of segments.
Figure 54B:
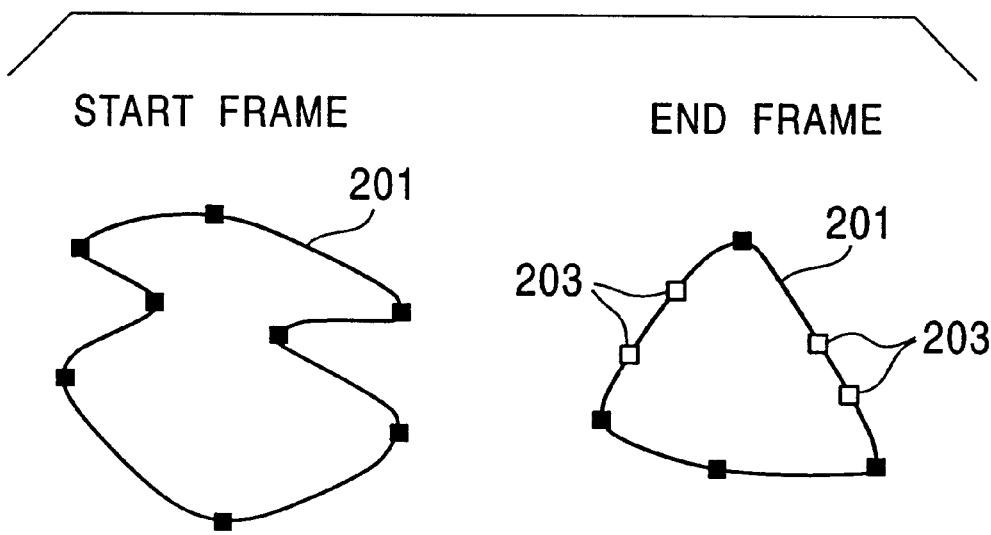
Figure 57:
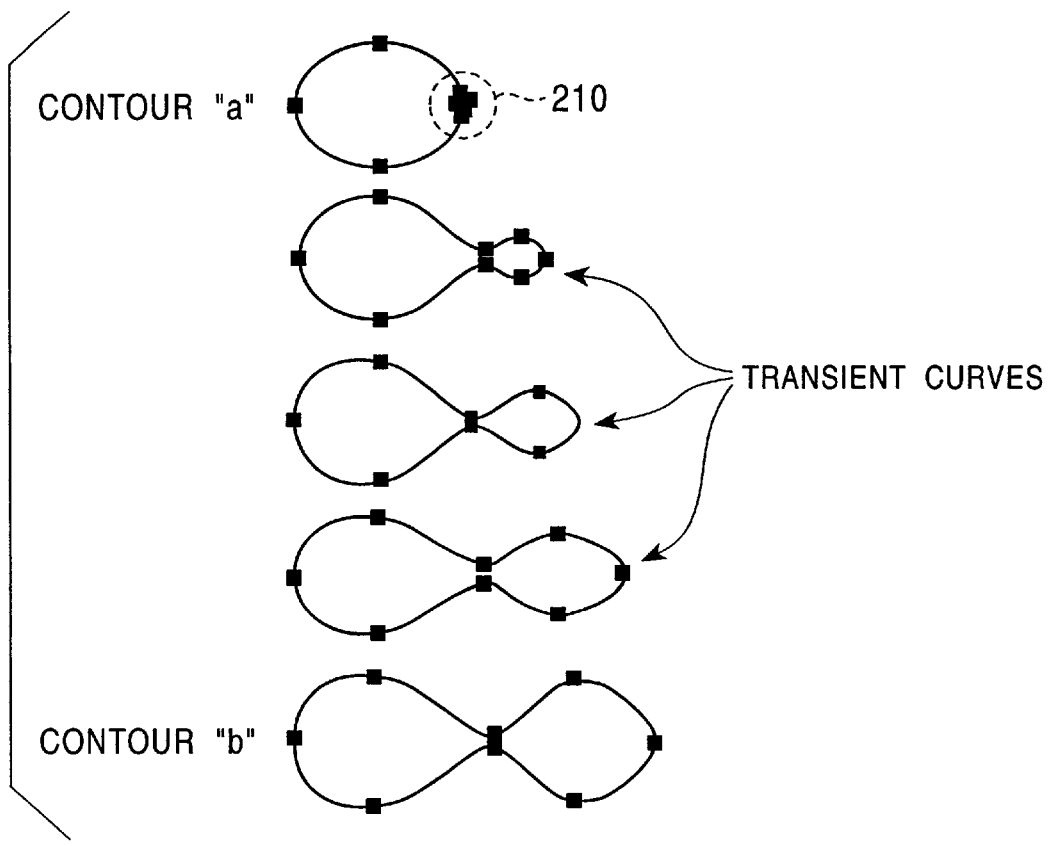
FIG. 57 is an illustration of transient shapes to be generated from the contours "a" and "b"
Figure 58:
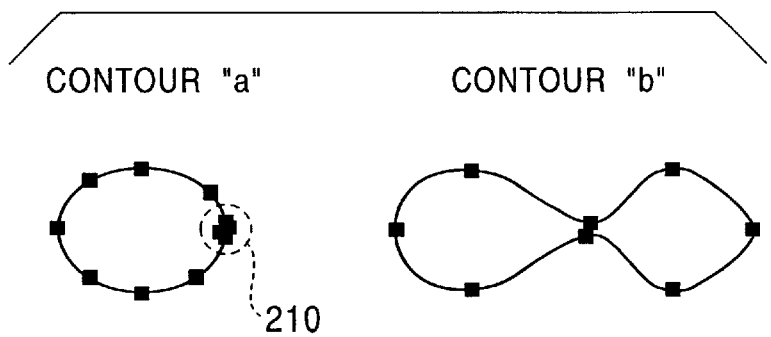
FIG. 58 is an illustration of setting of a plurality of end points on a part of the contour "a".

In Step S94, the processing unit 2 performs an operation for setting up a couple of associate points, based on images that are displayed on the reference panel and the main panel. This is achieved through a process which is shown in FIG. 50. In Step S101 of the flow shown in FIG. 50, an operational input is received indicating that the user has selected an unassociated point on the reference panel. In Step S102, the processing unit 2 receives an operational input signal indicating that the user has selected an unassociated point on the main panel. In the next step S103, the processing unit 2 registers the unassociated point selected in Step S101 and the unassociated point selected in Step S102 as being a set of associate points.

After the registration, the process returns to the flow shown in FIG. 49 to execute Step S95.

In Step S95, the processing unit determines whether the registration of the associate points has been finished. If the registration has not yet been finished, the processing unit 2 executes Step S94 again. The process of FIG. 49 is completed when the registration is finished.

A description will now be given of a process performed by the processing unit 2 for generating a contour curve in a non-master frame.

For the purpose of generating a non-master frame, the processing unit 2 starts the transient shape generating program described before, based on the previous master frame which is closest to the present frame and the following master frame which is closest to the present frame.

Non-master frames preceding the leading end master frame has no previous master frame, although the leading end master frame is available as the following master frame. Likewise, non-master frames following the trailing end master frame have no following master frame, although the trailing end master frame is available as the previous master frame. In such a case, the processing unit 2 copies the contour curve of the available master frame and uses the copied contour curve as the contour curve on the non-master frame.

The processing unit 2 is not able to edit images on non-master frames. In order to enable edition of an image on the non-master frame, the processing unit changes this non-master frame into a master frame, by using the master frame check box 94 contained in the general page and the editorial page of the AutoKey property panel.

A description will now be given of a key-image generating process which is implemented by the application program executed by the processing unit 2.

In displaying the key image, the processing unit 2 operates such that the foreground is displayed by level "1" pixels, e.g., white, while the background is displayed by "0" level pixel, e.g., black. Thus, a white-and-black monochromatic image is formed. In response to an operation of the user on the key output inversion toggle switch 96 appearing on the general page of the AutoKey property panel, the processing unit performs switching between a mode in which the foreground is inside a closed curve and a mode in which the exterior of the closed curve is the foreground.

When there are a plurality of contour curves, the processing unit 2 switches the mode in accordance with the state of the contour curve synthesizing mode change-over toggle switch appearing on the general page of the AutoKey property panel, for the purpose of enabling output of a key image.

When the output clip has been designated by the clip operating section of the clip control panel, the processing unit 2 operates so that the key image which has been formed and displayed is stored in the output click.

A description will now be given of a synthetic image generating process which is implemented by the application program executed by the processing unit 2.

For the purpose of displaying a synthetic image, the processing unit 2 forms a key image and applies the image of the data in the foreground clip to the level "1" area, i.e., white area, of the key image, while applying the image of the data in the background clip to the level "0" area, i.e., black area, of the key image.

When the output clip has been designated by the clip operating section of the clip control panel, the processing unit 2 operates so that the synthetic image which has thus been formed and displayed is stored in the output click.

An application program has been described as an embodiment of the present invention, in which contour curves of consecutive frames are generated based on a curve interpolating method implemented by a transient shape generating program, through selection of items on menus and patterns on the display.

Consequently, the curve generating apparatus 1 of the present invention, having the processing unit 2 having the described functions, automatically generates contour curves of consecutive frames of a motion picture, based on an image which constitutes an underdrawing, without requiring the user to generate a transient contour curve for each of the transient frames, i.e., by generating master frames intermittently and editing the images on these intermittent master frames while automatically generating transient images for other frames by means of the transient shape generating program. It is therefore possible to produce a smooth and high-quality motion picture in a short time.

As will be understood from the foregoing description, the curve generating apparatus and method, as well as the storage medium, of the present invention offers the following advantages.

In accordance with the present invention, sampling points are set on first and second closed curves to enable sampling of these curves, and associate points are set to correlate these curves. Closed curves representing the transient contours, which are to be obtained in the course of the change from the first closed curve to the second closed curve, are generated through interpolation at the sampling points starting from the associate points. Thus, transient contour curves can be produced with high degree of quality even when the closed curves have different number of segments, by virtue of the setting of associate points.

In the associate point setting method of the present invention for setting associate points on first and second closed curves, peak values of the curvatures of both the first and second closed curves are compared with a threshold value. Points on both closed curves where curvature peak values not smaller than the threshold value are exhibited are extracted as detected points. A pair of points, composed of a first point which is one of the detected points on one of two closed curves and a second point which is one of the detected points on the other closed curve and near the first point, are set as being associate points if the curvatures at these first and second points have the same sign of plus or minus. With this method, it is possible to automatically set a plurality of couples of associate points, thus relieving the user from the burden of manually setting many couples of associate points.

Although the invention has been described through its specific forms, it is to be understood that the described embodiment is only illustrative and various changes and modifications may be imparted thereto without departing from the scope of the invention which is limited solely by the appended claims.

What is claimed is:

1. A curve generating apparatus for generating a curve, comprising:

sampling means for setting sampling points on a first closed curve representing the contour of an object contained in an image, and for setting sampling points on a second closed curve which represents the contour of said object after lapse of a predetermined time;

associate point setting means for setting associate points that correlate said first and second closed curves; and interpolating means for effecting interpolation between the sampling points set by said sampling means, starting from said associate points set by said associate points setting means, thereby generating a transient closed curve which is transient in the course of deformation of said first closed curve into said second closed curve.

2. A curve generating apparatus according to claim 1, wherein said sampling means sets an equal number of sampling points both on said fire closed curve and said second closed curve.

3. A curve generating apparatus according to claim 1, further comprising re-sampling means for setting sampling points again on said first and second closed curves on which the sampling points have been set by said sampling means, whereby an equal number of sampling points are set on said first and second closed curves which are constituted by different numbers of segment lines.

4. A curve generating apparatus according to claim 1, further comprising operational input means for generating an operational input signal;

wherein said sampling means sets on said first and second closed curves an equal number of sampling points, starting from associate points which have been set by said associate point setting means, in response to an operational input signal which designates said associate points.

5. A curve generating method comprising:

a sampling step for setting sampling points on a first closed curve representing the contour of an object contained in an image, and for setting sampling points on a second closed curve which shows the contour of said object after lapse of a predetermined time, an associate point setting step for setting associate points that correlate said first and second closed curves; and an interpolating step for effecting interpolation between the sampling points set by said sampling means starting from said associate points set in said associate points setting step, thereby generating a transient closed curve which is transient in the course of deformation of said first closed curve into said second closed curve.

6. A curve generating method according to claim 5, wherein said sampling step sets an equal number of sampling points both on the first closed curve and said second closed curve.

7. A curve generating method according to claim 5, further comprising a re-sampling step for setting sampling points again on said first and second closed curves on which the sampling points have been set by said sampling means so that an equal number of sampling points are set on said first and second closed curves which are constituted by different numbers of segment lines.

8. A curve generating method according to claim 5, wherein said sampling step sets on said first and second closed curves an equal number of sampling points, starting from associate points designated in response to an operational input signal which designates a plurality of said associate points.

9. A storage medium storing a program which executes:

a sampling step for setting sampling points on a first closed curve representing the contour of an object contained in an image, and for setting sampling points on a second closed curve which shows the contour of said object after lapse of a predetermined time; an associate point setting step for setting associate points that correlate said first and second closed curves; and an interpolating step for effecting interpolation between the sampling points set by said sampling means starting from said associate points set in said associate points setting step, thereby generating a transient closed curve which is transient in the course of deformation of said first closed curve into said second closed curve.

10. A storage medium according to claim 9, wherein said sampling step sets an equal number of sampling points both on the first closed curve and said second closed curve.

11. A storage medium according to claim 9, wherein said program executes a stop of setting starting points again on said first and second closed curves which are constituted y different numbers of lines, whereby an equal number of sampling points are set on said first and second closed curves.

12. A storage medium according to claim 9, wherein said program sets an equal number of sampling points both on said first and second closed curves, starting from associate points that have been set in accordance with an operational input signal designating a plurality of associate points.

13. A method of setting associate points, comprising the steps of:

detecting curvatures of a first closed curve representing the contour of an object contained in an image and detecting curvatures of a second closed curve representing the contour of said object after lapse of a predetermined time;

comparing peak values of the curvatures detected on said first closed curve and peak values of the curvatures detected on said second closed curve with a predetermined threshold, and extracting, as detected points, points on said first and second closed curves which exhibit curvature peak values not smaller than the threshold value; and setting, as associate points, one of the detected points on one of said first and second closed curves and one of the detected points on the other closed curve which is in the neighborhood of the moment of detection of said one of the detected points on one of said first and second closed curves, when the curvatures at said detected points on both closed curves have the same sign of plus or minus.

14. A method according to claim 13, wherein an equal number of associate points are set on said first and second closed curves.

* * * * *